US008866715B2

(12) United States Patent
Tsubata

(10) Patent No.: US 8,866,715 B2
(45) Date of Patent: Oct. 21, 2014

(54) ACTIVE MATRIX SUBSTRATE, LIQUID CRYSTAL PANEL, LIQUID CRYSTAL DISPLAY DEVICE, LIQUID CRYSTAL DISPLAY UNIT, AND TELEVISION RECEIVER

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 353 days.

(21) Appl. No.: 13/381,997

(22) PCT Filed: Apr. 15, 2010

(86) PCT No.: PCT/JP2010/002732
§ 371 (c)(1),
(2), (4) Date: Jan. 3, 2012

(87) PCT Pub. No.: WO2011/010417
PCT Pub. Date: Jan. 27, 2011

(65) Prior Publication Data
US 2012/0105735 A1 May 3, 2012

(30) Foreign Application Priority Data

Jul. 22, 2009 (JP) ................................. 2009-171308

(51) Int. Cl.
G09G 3/36 (2006.01)
G02F 1/1343 (2006.01)

(52) U.S. Cl.
CPC ...... *G09G 3/3614* (2013.01); G09G 2300/0426 (2013.01); G09G 2300/0447 (2013.01); G09G 2300/0443 (2013.01); G02F 2001/134345 (2013.01); G09G 2300/0876 (2013.01); G09G 2300/0814 (2013.01); *G09G 3/3659* (2013.01); G09G 2320/028 (2013.01); G09G 2310/0251 (2013.01)

USPC ................. 345/92; 345/87; 345/90; 345/204; 345/205; 349/143; 349/144

(58) Field of Classification Search
USPC .............. 345/85, 104, 204–215; 349/56–166
See application file for complete search history.

(56) References Cited

U.S. PATENT DOCUMENTS 6,031,513 A * 2/2000 Ikeda .............................. 345/92
6,552,707 B1 * 4/2003 Fujiyoshi ........................ 345/98

(Continued)

FOREIGN PATENT DOCUMENTS

JP 10-253987 A 9/1998
JP 2006-39290 A 2/2006

(Continued)

OTHER PUBLICATIONS

Official Communication issued in International Patent Application No. PCT/JP2010/002732, mailed on Jun. 15, 2010.

*Primary Examiner* — Alexander Eisen
*Assistant Examiner* — Sanjiv D Patel
(74) *Attorney, Agent, or Firm* — Keating & Bennett, LLP

(57) ABSTRACT

Each pixel includes two pixel electrodes connected to each other via a capacitor, and in respect to a pixel (101) that belongs to the column of pixels and to the row of pixels, a transistor (12a) connected to one of the two scanning signal lines (16a, 16b) is electrically connected to one of two pixel electrodes (17a, 17b) included in the pixel (101), a transistor (12b) connected to the other one of the two scanning signal lines is electrically connected to the other one of the two pixel electrodes, and each of these transistors (12a, 12b) is electrically connected to an identical data signal line (15x) that is one of the two data signal lines (15x, 15y).

26 Claims, 50 Drawing Sheets

(56) References Cited

U.S. PATENT DOCUMENTS

| | | | |
|---|---|---|---|
| 7,916,244 B2 * | 3/2011 | Hur et al. | 349/106 |
| 8,334,882 B2 * | 12/2012 | Yoshida | 345/690 |
| 2002/0047822 A1 * | 4/2002 | Senda et al. | 345/90 |
| 2003/0169247 A1 * | 9/2003 | Kawabe et al. | 345/204 |
| 2005/0122441 A1 * | 6/2005 | Shimoshikiryoh | 349/38 |
| 2006/0023137 A1 | 2/2006 | Kamada et al. | |
| 2006/0109227 A1 * | 5/2006 | Park | 345/98 |
| 2006/0208984 A1 * | 9/2006 | Kim et al. | 345/90 |

FOREIGN PATENT DOCUMENTS

| | | |
|---|---|---|
| JP | 2006-139288 A | 6/2006 |
| JP | 2008-175987 A | 7/2008 |
| JP | 2009-53589 A | 3/2009 |

* cited by examiner

ACTIVE MATRIX SUBSTRATE, LIQUID CRYSTAL PANEL, LIQUID CRYSTAL DISPLAY DEVICE, LIQUID CRYSTAL DISPLAY UNIT, AND TELEVISION RECEIVER

TECHNICAL FIELD

The present invention relates to (i) an active matrix substrate employing a capacitively-coupled type pixel-division system and (ii) a liquid crystal panel and the like each including the active matrix substrate.

BACKGROUND ART

Patent Literature 1 (refer to FIG. 52) discloses a liquid crystal display device in which two data lines (a left data line and a right data line) are provided for a column of pixels, pixel electrodes in odd-numbered pixels included in a single row of pixels are connected to the left data line and pixel electrodes in even-numbered pixels in this row are connected to the right data line, and two successive scanning signal lines (a scanning signal line connected to an odd-numbered pixel and a scanning signal line connected to an even-numbered pixel) are simultaneously selected so that speed at which a screen is written is increased. Further, for example Patent Literature 2 discloses a liquid crystal display device employing a capacitively-coupled type pixel-division system.

CITATION LIST

Patent Literatures

Patent Literature 1
Japanese Patent Application Publication, Tokukaihei, No. 10-253987 A (Publication Date: Sep. 25, 1998)
Patent Literature 2
Japanese Patent Application Publication, Tokukai, No. 2006-39290 A (Publication Date: Feb. 9, 2006)

SUMMARY OF INVENTION

Technical Problem

The inventor of the present invention has found that, in a case where a liquid crystal panel in which two data signal lines are provided in such a way as to correspond to a column of pixels employs a capacitively-coupled type pixel-division system, a pixel electrode electrically floating in a pixel is likely to have a DC voltage applied thereto, and this causes image sticking in the pixel etc. An object of the present invention is to improve display quality in such a case.

Solution to Problem

An active matrix substrate in accordance with the present invention is an active matrix substrate including pixel areas, wherein: the pixel areas (i) each include two pixel electrodes connected to each other via a capacitor and (ii) are arranged in a row direction and a column direction, the column direction being a direction in which each data signal line extends, two data signal lines are provided in such a way as to correspond to a column of pixel areas and two scanning signal lines are provided in such a way as to correspond to a row of pixel areas, and in respect to a pixel area that belongs to the column of pixel areas and to the row of pixel areas, a transistor connected to one of the two scanning signal lines is electrically connected to one of two pixel electrodes included in the pixel area, a transistor connected to the other one of the two scanning signal lines is electrically connected to the other one of the two pixel electrodes, and each of these transistors is electrically connected to an identical data signal line that is one of the two data signal lines.

Alternatively, an active matrix substrate in accordance with the present invention is an active matrix substrate including pixel areas, wherein: the pixel areas (i) each include two pixel electrodes connected to each other via a capacitor and (ii) are arranged in a row direction and a column direction, the column direction being a direction in which each data signal line extends, two data signal lines are provided in such a way as to correspond to a column of pixel areas and two scanning signal lines are provided in such a way as to correspond to a row of pixel areas, and in respect to a pixel area that belongs to the column of pixel areas and to the row of pixel areas, a transistor connected to one of the two scanning signal lines is electrically connected to one of two pixel electrodes included in the pixel area and to one of the two data signal lines, and a transistor connected to the other one of the two scanning signal lines is electrically connected to the other one of the two pixel electrodes and to a retention capacitor wire.

Alternatively, an active matrix substrate in accordance with the present invention is an active matrix substrate including pixel areas, wherein: the pixel areas (i) each include two pixel electrodes connected to each other via a capacitor and (ii) are arranged in a row direction and a column direction, the column direction being a direction in which each data signal line extends, two data signal lines are provided in such a way as to correspond to a column of pixel areas and two scanning signal lines are provided in such a way as to correspond to a row of pixel areas, and in respect to a pixel area that belongs to the column of pixel areas and to the row of pixel areas, a transistor connected to one of the two scanning signal lines is electrically connected to one of two pixel electrodes included in the pixel area and to one of the two data signal lines, and a transistor connected to the other one of the two scanning signal lines is electrically connected to each of the two pixel electrodes.

Advantageous Effects of Invention

According to the active matrix substrate, first, since two data signal lines are provided in such a way as to correspond to a column of pixel areas, a liquid crystal display device including the active matrix substrate is capable of writing data signals simultaneously to two rows of pixels by simultaneously selecting two scanning signal lines. Further, each of capacitively-coupled two pixel electrodes in each pixel area does not electrically float. This suppresses image sticking in pixels etc. and thus achieves high display quality in the liquid crystal display device including the active matrix substrate.

DESCRIPTION OF EMBODIMENTS

The following description discusses, with reference to FIGS. 1 through 49, examples of embodiments in accordance with the present invention. For convenience of descriptions, in the following, a direction in which data signal lines extend is referred to as a column direction, and a direction in which scanning signal lines extend is referred to as a row direction. Note however that, needless to say, while a liquid crystal display device (or a liquid crystal panel or an active matrix substrate used in the liquid crystal display device) of the present invention is being used (watched), the scanning signal lines may extend in a horizontal direction or in a vertical direction. Further, a pixel area of the active matrix substrate corresponds to a pixel of a liquid crystal panel.

Embodiment 1

Figure 1:
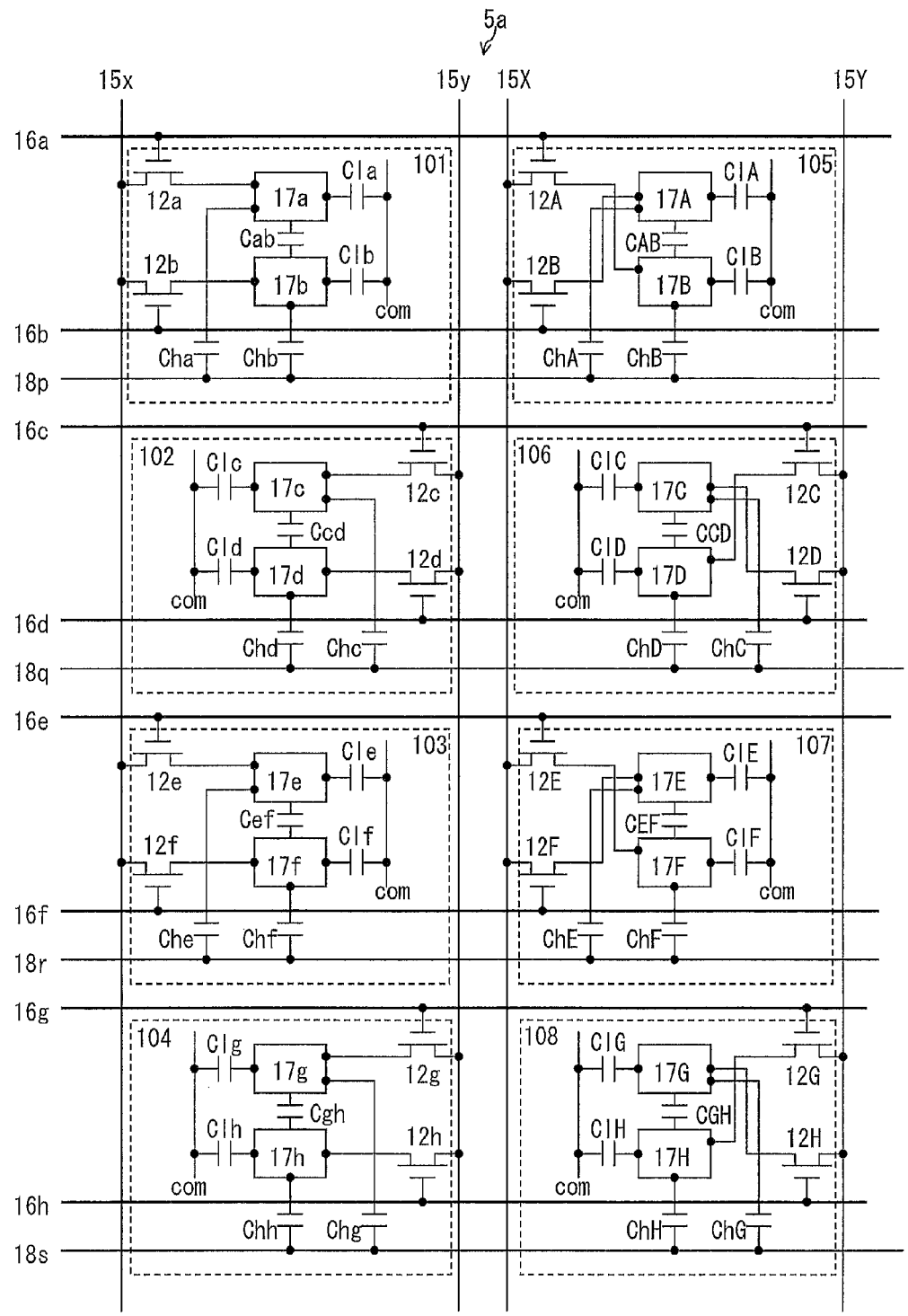
FIG. 1 is a circuit diagram illustrating a configuration of a liquid crystal panel in accordance with Embodiment 1.

FIG. 1 is an equivalent circuit diagram illustrating part of a liquid crystal panel of the present embodiment. As illustrated in FIG. 1, pixels each including two pixel electrodes connected to each other via a capacitor are arranged in a row direction and a column direction, two data signal lines are provided in such a way as to correspond to a column of pixels and two scanning signal lines are provided in such a way as to correspond to a row of pixels, and in respect to a pixel that belongs to the column of pixels and to the row of pixels, a transistor connected to one of the two scanning signal lines is electrically connected to one of the two pixel electrodes included in the pixel, a transistor connected to the other one of the two scanning signal lines is electrically connected to the other one of the two pixel electrodes, and each of these transistors is electrically connected to an identical data signal line that is one of the two data signal lines. Note that two scanning signal lines that correspond to a row of pixels are arranged on both sides of the row or are arranged so as to overlap both edges of the row. Further, (i) a data signal line connected via a transistor to each of pixel electrodes included in one of two pixel areas adjacent to each other in the column direction and (ii) a data signal line connected via a transistor to each of pixel electrodes included in the other one of the two pixel areas are different data signal lines. Further, two pixel electrodes are arranged in the column direction in a pixel; and (i) a transistor electrically connected to one of two pixel electrodes that are included in an identical row of pixels and face diagonally each other and (ii) a transistor electrically connected to the other one of the two pixel electrodes are connected to an identical scanning signal line.

For example, pixels 101 and 105 are arranged in the row direction, pixels 101 to 104 are arranged in the column direction, two data signal lines 15x and 15y are provided in such a way as to correspond to the pixels 101 to 104 which constitute a column of pixels, and two scanning signal lines 16a and 16b are provided in such a way as to correspond to the pixels 101 and 105 which constitute a row of pixels. The two scanning signal lines 16a and 16b are provided on both sides of this row of pixels.

In the pixel 101, two pixel electrodes 17a and 17b which are connected to each other via a capacitor Cab are arranged in the column direction, a drain electrode of a transistor 12a which is connected to the scanning signal line 16a is electrically connected to the pixel electrode 17a, a drain electrode of a transistor 12b which is connected to the scanning signal line 16b is electrically connected to the pixel electrode 17b, and a source electrode of each of the transistors 12a and 12b is electrically connected to an identical data signal line, i.e., the data signal line 15x. Note that a liquid crystal capacitance C1a is defined by the pixel electrode 17a and a common electrode (counter electrode) com, and a liquid crystal capacitance C1b is defined by the pixel electrode 17b and the common electrode (counter electrode) com.

Further, in the pixel 102 which is adjacent to the pixel 101 in the column direction, two pixel electrodes 17c and 17d which are connected to each other via a capacitor Ccd are arranged in the column direction, a drain electrode of a transistor 12c which is connected to a scanning signal line 16c is electrically connected to the pixel electrode 17c, a drain electrode of a transistor 12d which is connected to a scanning signal line 16d is electrically connected to the pixel electrode 17d, and a source electrode of each of the transistors 12c and 12d is electrically connected to an identical data signal line, i.e., a data signal line 15y. Note that a liquid crystal capacitance C1c is defined by the pixel electrode 17c and the common electrode (counter electrode) com, and a liquid crystal capacitance C1d is defined by the pixel electrode 17d and the common electrode (counter electrode) com.

Further, in the pixel 103, two pixel electrodes 17e and 17f which are connected to each other via a capacitor Cef are arranged in the column direction, a drain electrode of a transistor 12e which is connected to a scanning signal line 16e is electrically connected to the pixel electrode 17e, a drain electrode of a transistor 12f which is connected to a scanning signal line 16f is electrically connected to the pixel electrode 17f, and a source electrode of each of the transistors 12e and 12f is electrically connected to an identical data signal line, i.e., the data signal line 15x.

Further, in the pixel 104, two pixel electrodes 17g and 17h which are connected to each other via a capacitor Cgh are arranged in the column direction, a drain electrode of a transistor 12g which is connected to a scanning signal line 16g is electrically connected to the pixel electrode 17g, a drain electrode of a transistor 12h which is connected to a scanning signal line 16h is electrically connected to the pixel electrode 17h, and a source electrode of each of the transistors 12g and 12h is electrically connected to an identical data signal line, i.e., the data signal line 15y.

Further, in the pixel 105 which is adjacent to the pixel 101 in the row direction, two pixel electrodes 17A and 17B which are connected to each other via a capacitor CAB are arranged in the column direction, a drain electrode of a transistor 12A which is connected to the scanning signal line 16a is connected to the pixel electrode 17B which faces diagonally the pixel electrode 17a, a drain electrode of a transistor 12B which is connected to the scanning signal line 16b is connected to the pixel electrode 17A which diagonally faces the pixel electrode 17b, and a source electrode of each of the transistors 12A and 12B is electrically connected to an identical data signal line, i.e., a data signal line 15X. Note that a liquid crystal capacitance C1A is defined by the pixel electrode 17A and the common electrode (counter electrode) com, and a liquid crystal capacitance C1B is defined by the pixel electrode 17B and the common electrode (counter electrode) com.

Further, in the pixel 106 which is adjacent to the pixel 102 in the row direction, two pixel electrodes 17C and 17D which are connected to each other via a capacitor CCD are arranged in the column direction, a drain electrode of a transistor 12C which is connected to the scanning signal line 16c is connected to the pixel electrode 17D which faces diagonally the pixel electrode 17c, a drain electrode of a transistor 12D which is connected to the scanning signal line 16d is connected to the pixel electrode 17C which faces diagonally the pixel electrode 17d, and a source electrode of each of the transistors 12C and 12D is electrically connected to an identical data signal line, i.e., a data signal line 15Y. Note that a liquid crystal capacitance C1C is defined by the pixel electrode 17C and the common electrode (counter electrode) com, and a liquid crystal capacitance C1D is defined by the pixel electrode 17D and the common electrode (counter electrode) com.

Further, in the pixel 107 which is adjacent to the pixel 103 in the row direction, two pixel electrodes 17E and 17F which are connected to each other via a capacitor CEF are arranged in the column direction, a drain electrode of a transistor 12E which is connected to the scanning signal line 16e is connected to the pixel electrode 17F which faces diagonally the pixel electrode 17e, a drain electrode of a transistor 12F which is connected to the scanning signal line 16f is connected to the pixel electrode 17E which faces diagonally the pixel electrode 17f, and a source electrode of each of the transistors 12E and 12F is electrically connected to an identical data signal line, i.e., the data signal line 15X. Note that a liquid crystal capacitance C1E is defined by the pixel electrode 17E and the common electrode (counter electrode) com, and a liquid crystal capacitance C1F is defined by the pixel electrode 17F and the common electrode (counter electrode) com.

Further, in the pixel 108 which is adjacent to the pixel 104 in the row direction, two pixel electrodes 17G and 17H which are connected to each other via a capacitor CGH are arranged in the column direction, a drain electrode of a transistor 12G which is connected to the scanning signal line 16g is connected to the pixel electrode 17H which faces diagonally the pixel electrode 17g, a drain electrode of a transistor 12H which is connected to the scanning signal line 16h is connected to the pixel electrode 17G which faces diagonally the pixel electrode 17h, and a source electrode of each of the transistors 12G and 12H is electrically connected to an identical data signal line, i.e., the data signal line 15Y. Note that a liquid crystal capacitance C1G is defined by the pixel electrode 17G and the common electrode (counter electrode) com, and a liquid crystal capacitance C1H is defined by the pixel electrode 17H and the common electrode (counter electrode) com.

Figure 2:
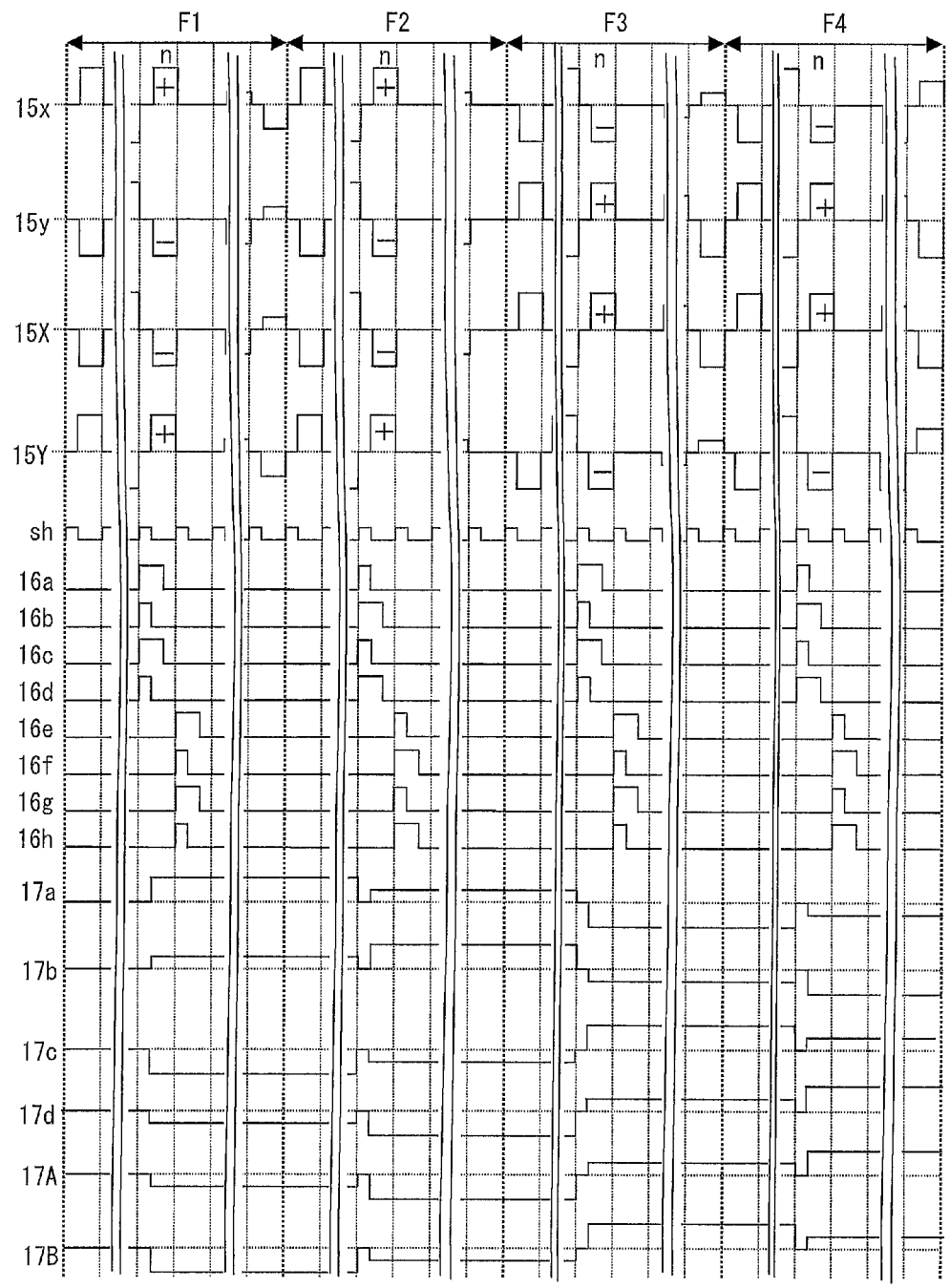
FIG. 2 is a timing chart illustrating a method of driving the liquid crystal panel shown in FIG. 1.
Figure 3:
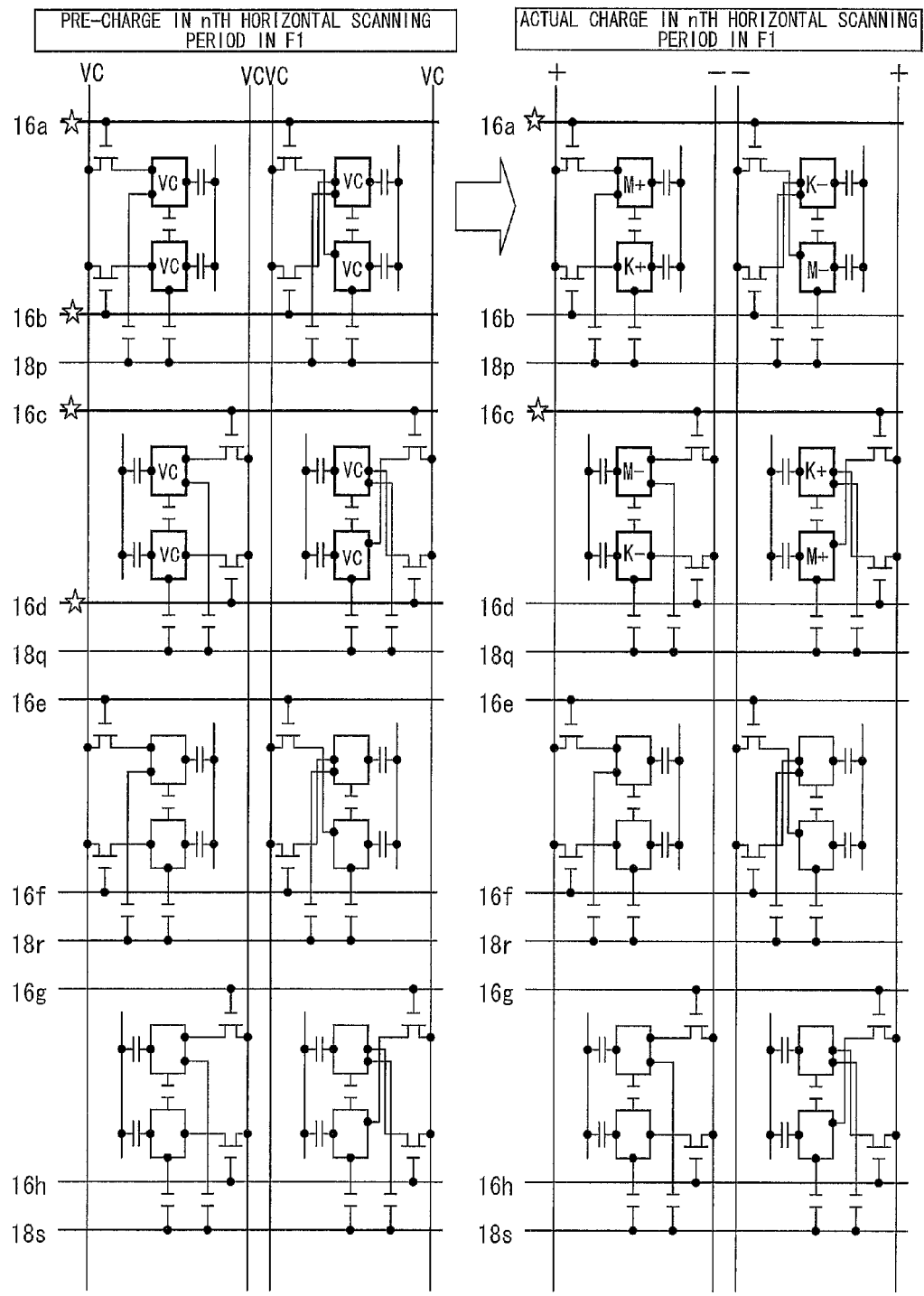
FIG. 3 is a view schematically describing a driving method in F1 (nth horizontal scanning period) in FIG. 2.

FIG. 2 is a timing chart illustrating a method of driving a liquid crystal panel 5a. In FIG. 2, 15x, 15y, 15X and 15Y denote data signals supplied to the data signal lines 15x, 15y, 15X and 15Y, respectively, sh denotes a signal that defines a pre-charge period, 16a to 16h denote signals (active High) supplied to the scanning signal lines 16a to 16h, respectively, and 17a to 17d, and 17A and 17B denote electric potentials of the pixel electrodes 17a to 17d, and 17A and 17B, respectively. Further, FIGS. 3 and 4 each describe a driving in F1 (first frame) in FIG. 2, FIGS. 5 and 6 each describe a driving in F2 (second frame) in FIG. 2, FIGS. 7 and 8 each describe a driving in F3 (third frame) in FIG. 2, and FIGS. 9 and 10 each describe a driving in F4 (fourth frame) in FIG. 2. In FIG. 3 etc., a scanning signal line being selected is marked with ☆.

According to the driving method shown in FIG. 2, in each odd-numbered frame, (i) one of two scanning signal lines that correspond to one of two adjacent rows of pixels and (ii) one of two scanning signal lines that correspond to the other one of the two adjacent rows of pixels are selected simultaneously so that data signals are written simultaneously to the two adjacent rows of pixels. In each even-numbered frame, (a) the other one of the two scanning signal lines that correspond to the foregoing one of the two adjacent rows of pixels and (b) the other one of the two scanning signal lines that correspond to the foregoing other one of the two adjacent rows of pixels are selected simultaneously so that data signals are written simultaneously to the two adjacent rows of pixels. In this case, light and dark of subpixels are switched for every one (1) frame.

For example, in F1 and F3, (i) the scanning signal line 16a, which is one of two scanning signal lines that correspond to a row of pixels including the pixels 101 and 105, and (ii) the scanning signal line 16c, which is one of two scanning signal lines that correspond to a row of pixels including the pixels 102 and 106, are selected simultaneously so that data signals are written simultaneously to the row of pixels including the pixels 101 and 105 and to the row of pixels including the pixels 102 and 106. In F2 and F4, (a) the scanning signal line 16b, which is the other one of the two scanning signal lines that correspond to the row of pixels including the pixels 101 and 105, and (b) the scanning signal line 16d, which is the other one of the two scanning signal lines that correspond to the row of pixels including the pixels 102 and 106, are selected simultaneously so that data signals are written simultaneously to the row of pixels including the pixels 101 and 105 and to the row of pixels including the pixels 102 and 106.

Further, (i) a data signal line connected via a transistor to each of pixel electrodes included in one of two pixels adjacent to each other in the column direction and (ii) a data signal line connected via a transistor to each of pixel electrodes included in the other one of the two pixels are supplied with data signals having respective opposite polarities.

For example, in F1, the data signal line 15x, which is connected via the respective transistors (12a and 12b) to the pixel electrodes (17a and 17b) included in the pixel 101, is supplied with a data signal having a positive polarity, and the data signal line 15y, which is connected via the respective transistors (12c and 12d) to the pixel electrodes (17c and 17d) included in the pixel 102 adjacent to the pixel 101 in the column direction, is supplied with a data signal having a negative polarity.

Further, (i) a data signal line connected via a transistor to each of pixel electrodes included in one of two pixels adjacent to each other in the row direction and (ii) a data signal line connected via a transistor to each of pixel electrodes included in the other one of the two pixels are supplied with data signals having respective opposite polarities.

For example, the data signal line 15x, which is connected via the respective transistors (12a and 12b) to the pixel electrodes (17a and 17b) included in the pixel 101, is supplied with a data signal having a positive polarity, and the data signal line 15X, which is connected via the respective transistors (12A and 12B) to the pixel electrodes (17A and 17B) included in the pixel 105 adjacent to the pixel 101 in the row direction, is supplied with a data signal having a negative polarity.

Further, a polarity of a data signal that is supplied to an identical data signal line is reversed for every two frames. That is, a polarity of each pixel is reversed for every two frames.

For example, in F1 and F2, the data signal lines 15x and 15Y are each supplied with a data signal having a positive polarity and the data signal lines 15y and 15X are each supplied with a data signal having a negative polarity, and, in F3 and F4, the data signal lines 15x and 15Y are each supplied with a data signal having a negative polarity and the data signal lines 15y and 15X are each supplied with a data signal having a positive polarity.

Further, each horizontal scanning period includes a pre-charge period during which a certain electric potential (here, a common electrode electric potential VC) is supplied to each data signal line. During a pre-charge period during simultaneous selection, scanning signal lines, out of four scanning signal lines that correspond to the two rows of pixel areas (to which data signals are to be simultaneously written), that are not being selected simultaneously are each turned ON and OFF.

For example, as illustrated in FIGS. 1 to 3, in the nth horizontal scanning period in F1, during a pre-charge period during which the scanning signal lines 16a and 16c are being selected simultaneously, out of four scanning signal lines (16a, 16b, 16c and 16d) that correspond to the row of pixels including the pixels 101 and 105 and the row of pixels including the pixels 102 and 106, data signal lines (16b and 16d) that are not being selected simultaneously are each turned ON and OFF (i.e., caused to be active and thereafter caused to be inactive). This causes the pixel electrodes 17b and 17A, each of which is connected via a transistor to the scanning signal line 16b, and the pixel electrodes 17d and 17C, each of which is connected via a transistor to the scanning signal line 16d, to be discharged.

Then, after the pre-charge period, data signals are written to the pixel electrodes 17a and 17B, each of which is connected via a transistor to the scanning signal line 16a, and to the pixel electrodes 17c and 17D, each of which is connected via a transistor to the scanning signal line 16c.

As a result, (i) in the pixel 101, a subpixel including the pixel electrode 17a serves as a light subpixel having a positive polarity (M+) and a subpixel including the pixel electrode 17b serves as a dark subpixel having a positive polarity (K+), (ii) in the pixel 105, a subpixel including the pixel electrode 17A serves as a dark subpixel having a negative polarity (K−) and a subpixel including the pixel electrode 17B serves as a light subpixel having a negative polarity (M−), (iii) in the pixel 102, a subpixel including the pixel electrode 17c serves as a light subpixel having a negative polarity (M−) and a subpixel including the pixel electrode 17d serves as a dark subpixel having a negative polarity (K−) and (iv) in the pixel 106, a subpixel including the pixel electrode 17C serves as a dark subpixel having a positive polarity (K+) and a subpixel including the pixel electrode 17D serves as a light subpixel having a positive polarity (M+).

Figure 4:
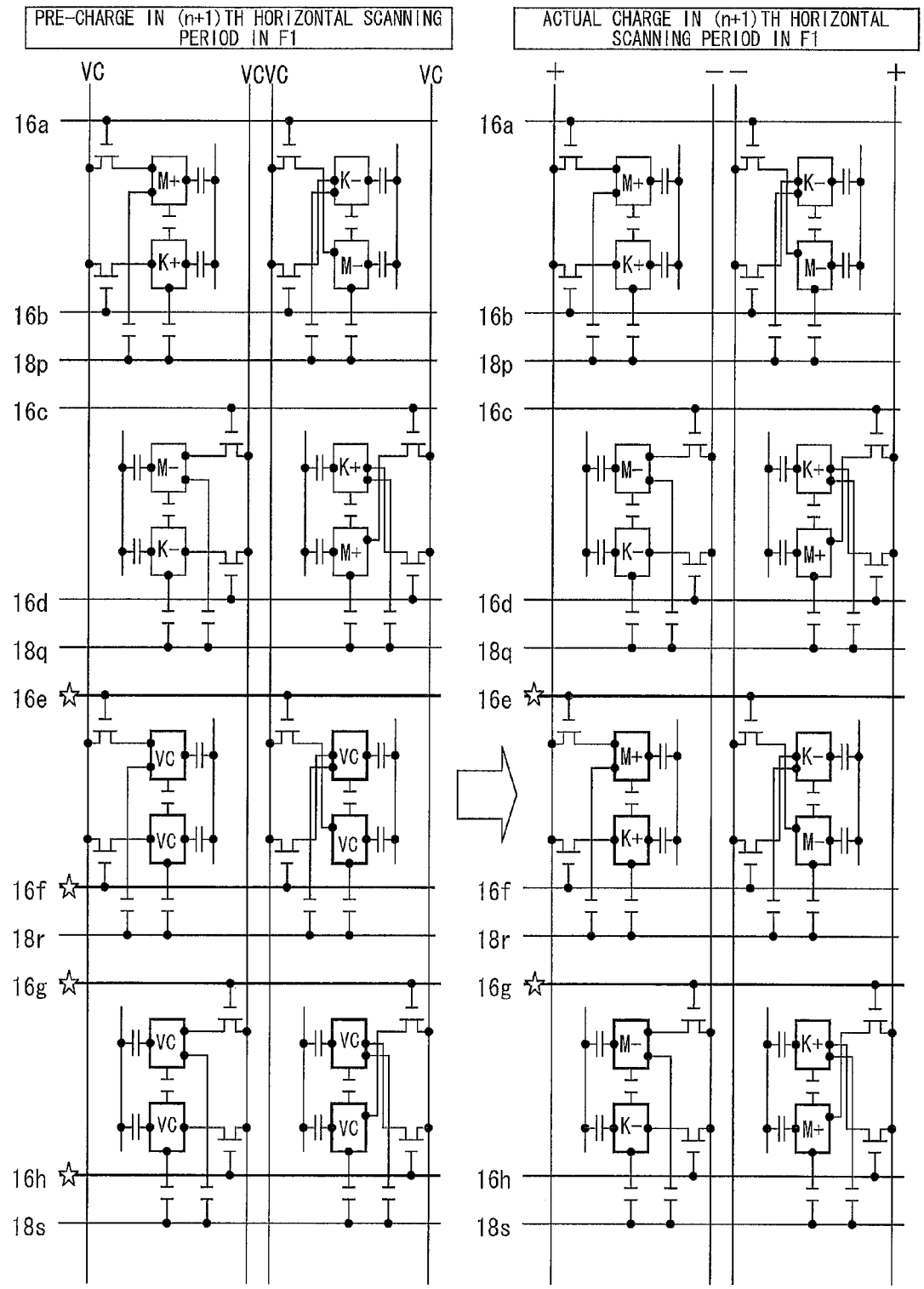
FIG. 4 is a view schematically describing a driving method in F1 ((n+1)th horizontal scanning period) in FIG. 2.

Further, as illustrated in FIGS. 1, 2 and 4, in the (n+1)th horizontal scanning period in F1, during a pre-charge period during which the scanning signal lines 16e and 16g are being selected simultaneously, out of four scanning signal lines (16e, 16f, 16g and 16h) that correspond to a row of pixels including the pixels 103 and 107 and a row of pixels including the pixels 104 and 108, scanning signal lines (16f and 16h) that are not being selected simultaneously are each turned ON and OFF. This causes the pixel electrodes 17f and 17E, each of which is connected via a transistor to the scanning signal line 16f, and the pixel electrodes 17h and 17G, each of which is connected via a transistor to the scanning signal line 16h, to be discharged.

Then, after the pre-charge period, data signals are written to the pixel electrodes 17e and 17F, each of which is connected via a transistor to the scanning signal line 16e, and to the pixel electrodes 17g and 17H, each of which is connected via a transistor to the scanning signal line 16g.

As a result, (i) in the pixel 103, a subpixel including the pixel electrode 17e serves as a light subpixel having a positive polarity (M+) and a subpixel including the pixel electrode 17f serves as a dark subpixel having a positive polarity (K+), (ii) in the pixel 107, a subpixel including the pixel electrode 17E serves as a dark subpixel having a negative polarity (K−) and a subpixel including the pixel electrode 17F serves as a light subpixel having a negative polarity (M−), (iii) in the pixel 104, a subpixel including the pixel electrode 17g serves as a light subpixel having a negative polarity (M−) and a subpixel including the pixel electrode 17h serves as a dark subpixel having a negative polarity (K−) and (iv) in the pixel 108, a subpixel including the pixel electrode 17G serves as a dark subpixel having a positive polarity (K+) and a subpixel including the pixel electrode 17H serves as a light subpixel having a positive polarity (M+).

Figure 5:
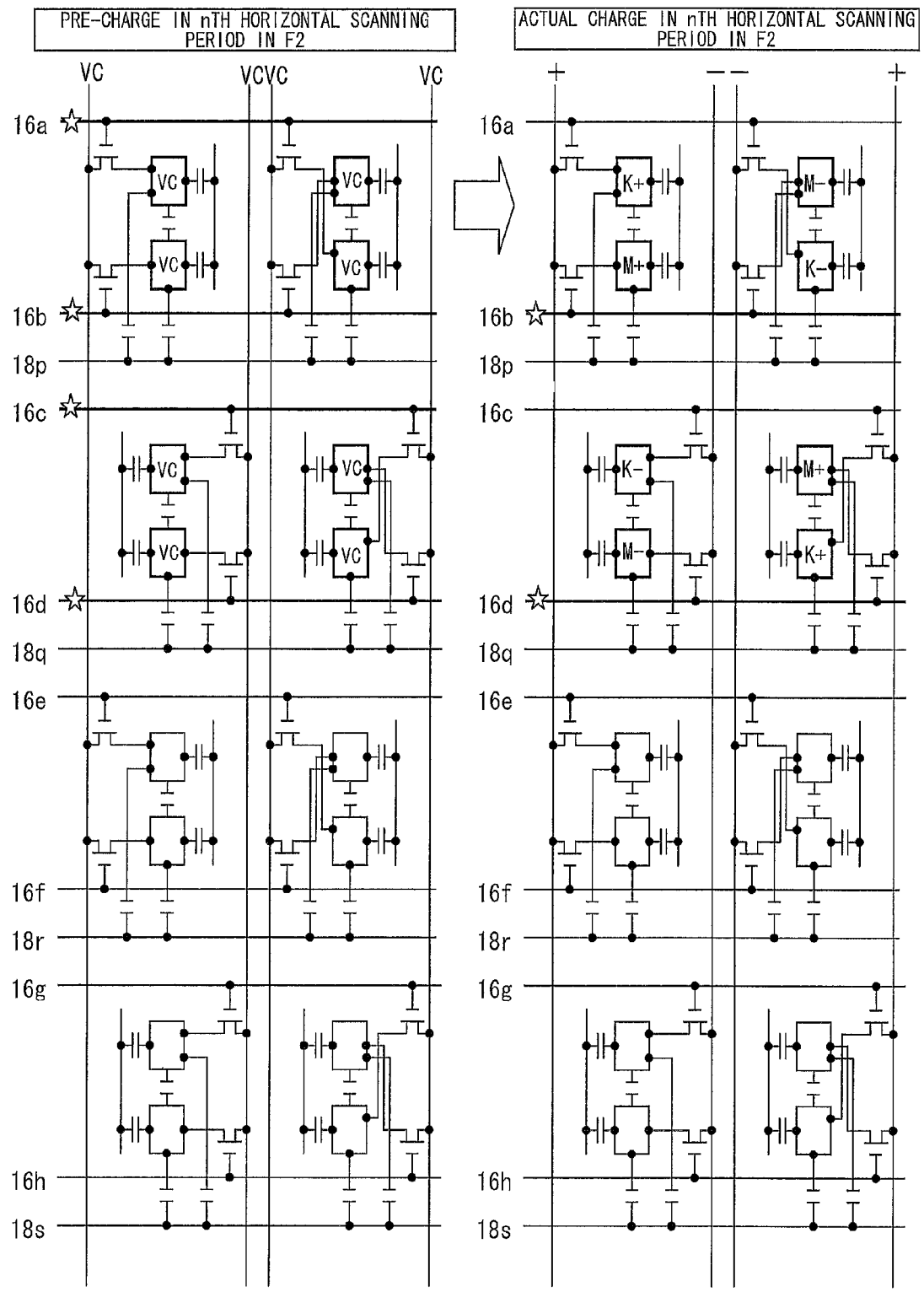
FIG. 5 is a view schematically describing a driving method in F2 (nth horizontal scanning period) in FIG. 2.

Further, as illustrated in FIGS. 1, 2 and 5, in the nth horizontal scanning period in F2, during a pre-charge period during which the scanning signal lines 16b and 16d are being selected simultaneously, out of four scanning signal lines (16a, 16b, 16c and 16d) that correspond to the row of pixels including the pixels 101 and 105 and the row of pixels including the pixels 102 and 106, scanning signal lines (16a and 16c) that are not being selected simultaneously are each turned ON and OFF. This causes the pixel electrodes 17a and 17B, each of which is connected via a transistor to the scanning signal line 16a, and the pixel electrodes 17c and 17D, each of which is connected via a transistor to the scanning signal line 16c, to be discharged.

Then, after the pre-charge period, data signals are written to the pixel electrodes 17b and 17A, each of which is connected via a transistor to the scanning signal line 16b, and to the pixel electrodes 17d and 17C, each of which is connected via a transistor to the scanning signal line 16d.

As a result, (i) in the pixel 101, the subpixel including the pixel electrode 17a serves as a dark subpixel having a positive polarity (K+) and the subpixel including the pixel electrode 17b serves as a light subpixel having a positive polarity (M+), (ii) in the pixel 105, the subpixel including the pixel electrode 17A serves as a light subpixel having a negative polarity (M−) and the subpixel including the pixel electrode 17B serves as a dark subpixel having a negative polarity (K−), (iii) in the pixel 102, the subpixel including the pixel electrode 17c serves as a dark subpixel having a negative polarity (K−) and the subpixel including the pixel electrode 17d serves as a light subpixel having a negative polarity (M−) and (iv) in the pixel 106, the subpixel including the pixel electrode 17C serves as a light subpixel having a positive polarity (M+) and the subpixel including the pixel electrode 17D serves as a dark subpixel having a positive polarity (K+).

Figure 6:
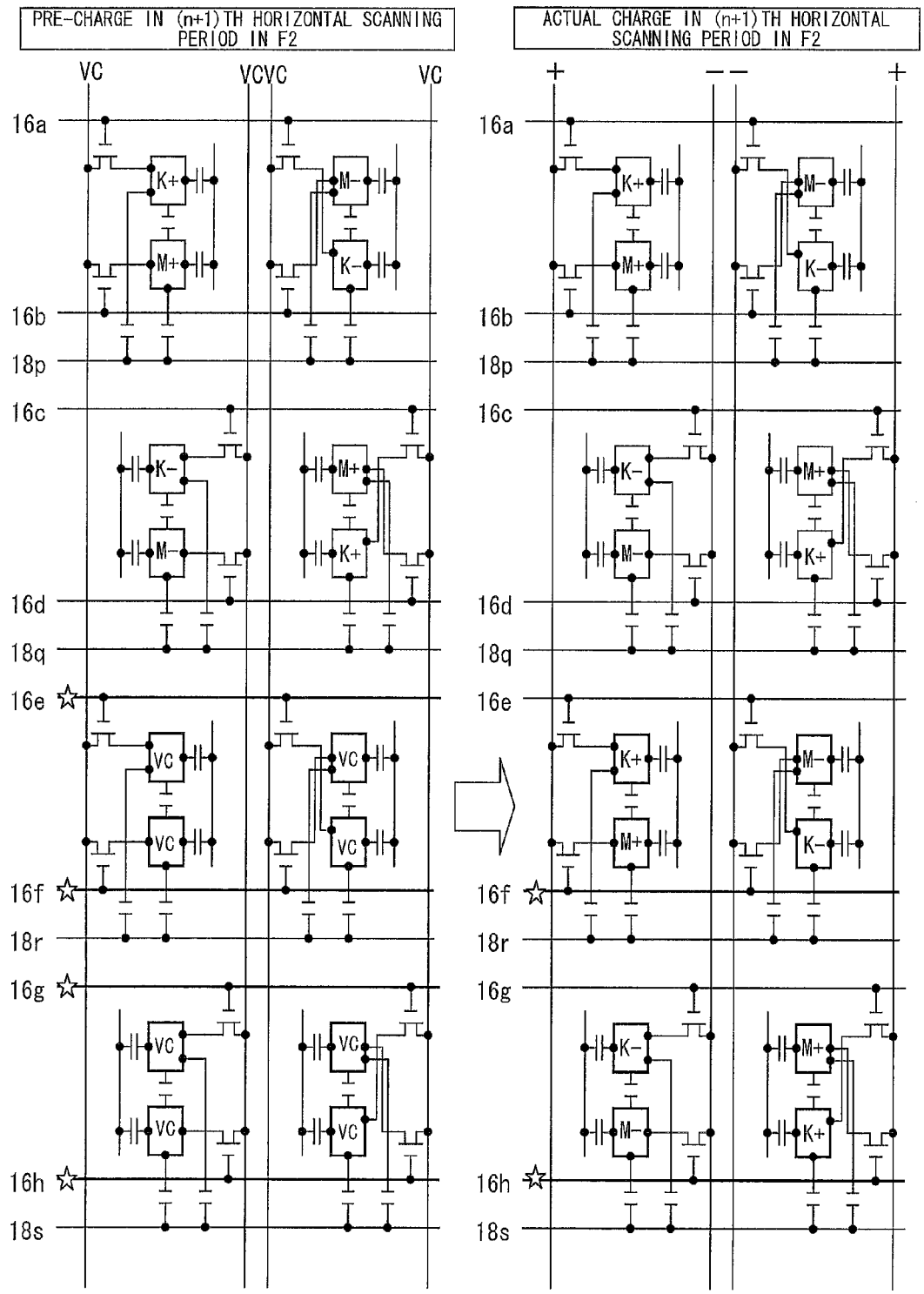
FIG. 6 is a view schematically describing a driving method in F2 ((n+1)th horizontal scanning period) in FIG. 2.
Figure 7:
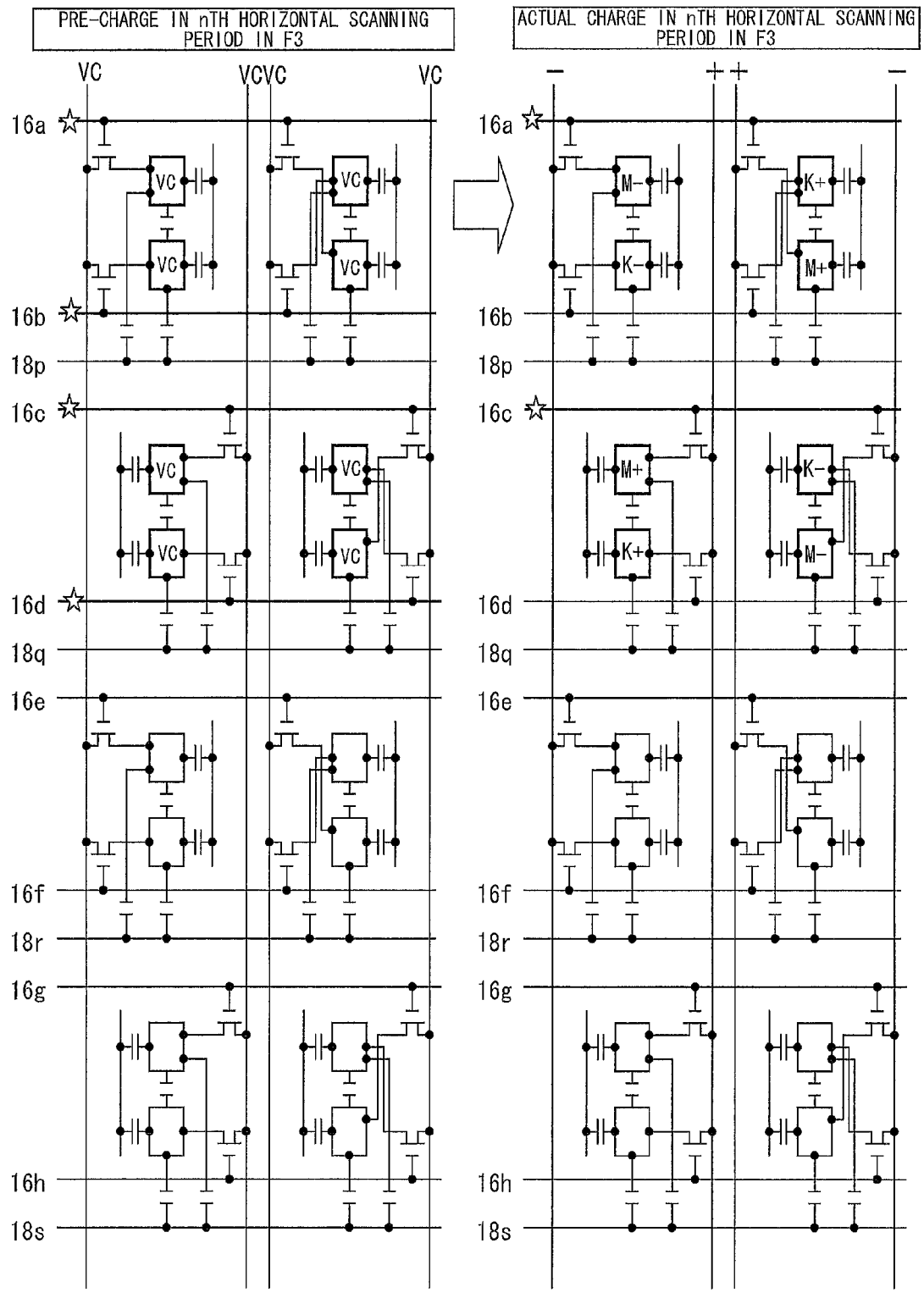
FIG. 7 is a view schematically describing a driving method in F3 (nth horizontal scanning period) in FIG. 2.
Figure 8:
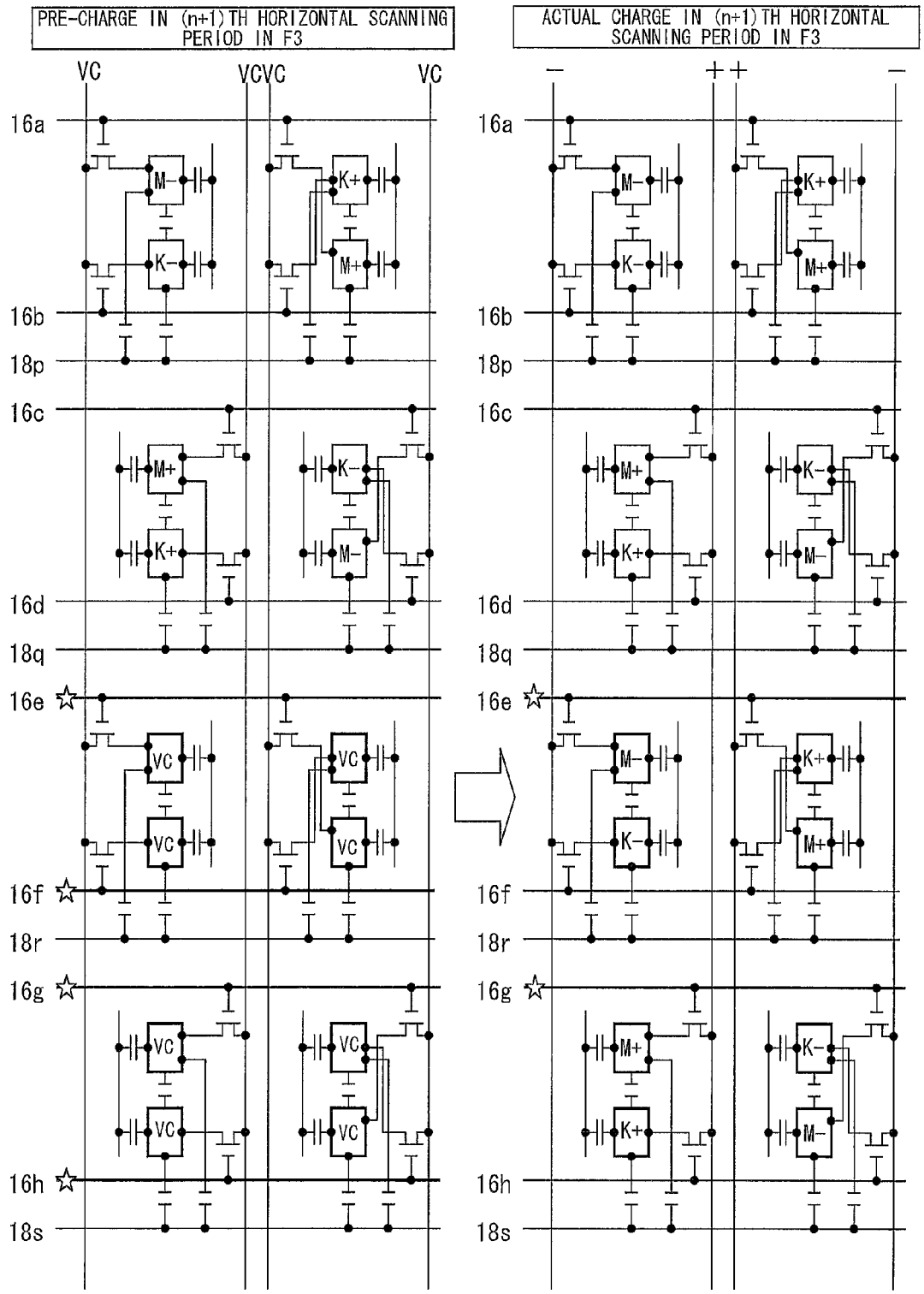
FIG. 8 is a view schematically describing a driving method in F3 ((n+1)th horizontal scanning period) in FIG. 2.
Figure 9:
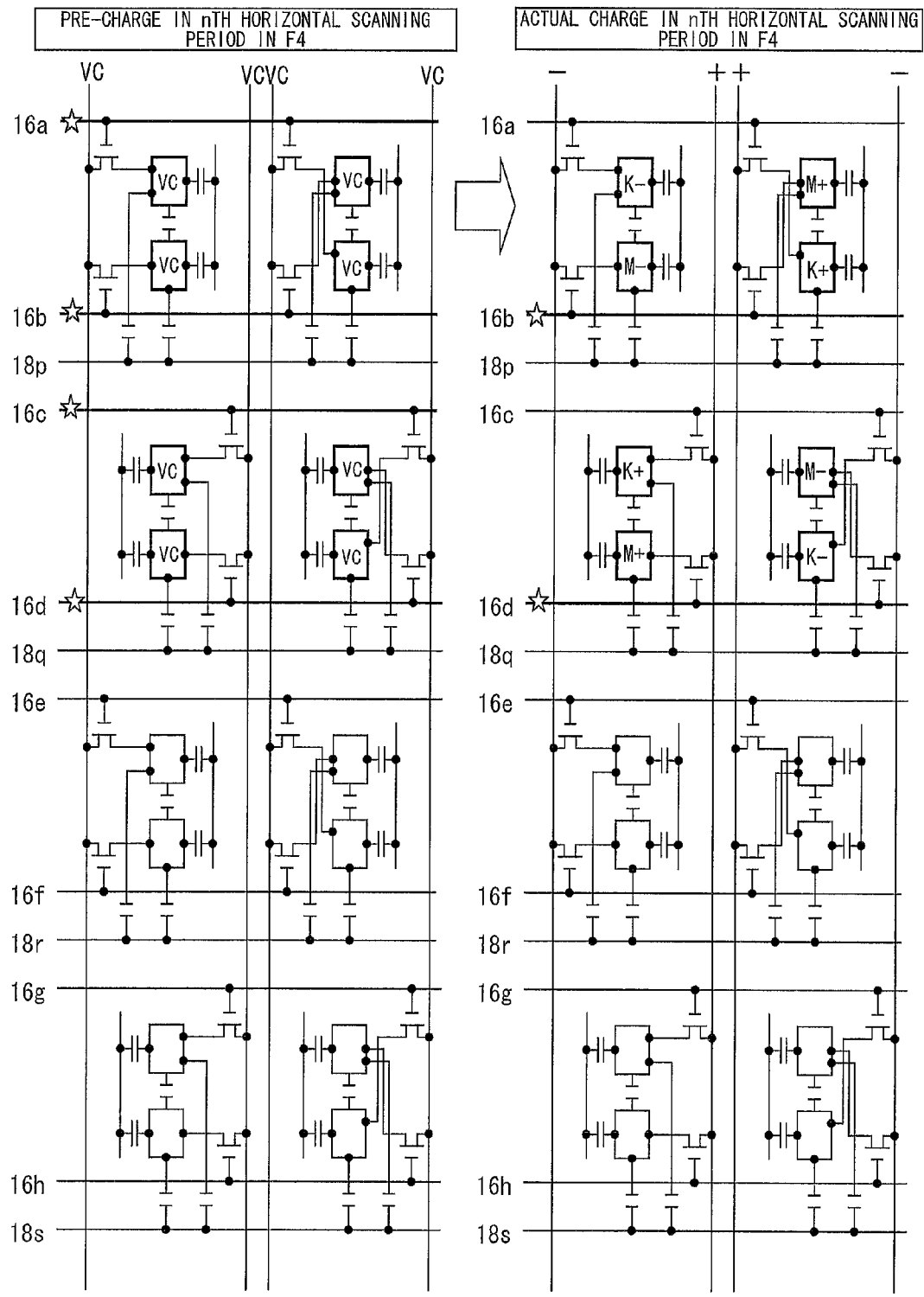
FIG. 9 is a view schematically describing a driving method in F4 (nth horizontal scanning period) in FIG. 2.
Figure 10:
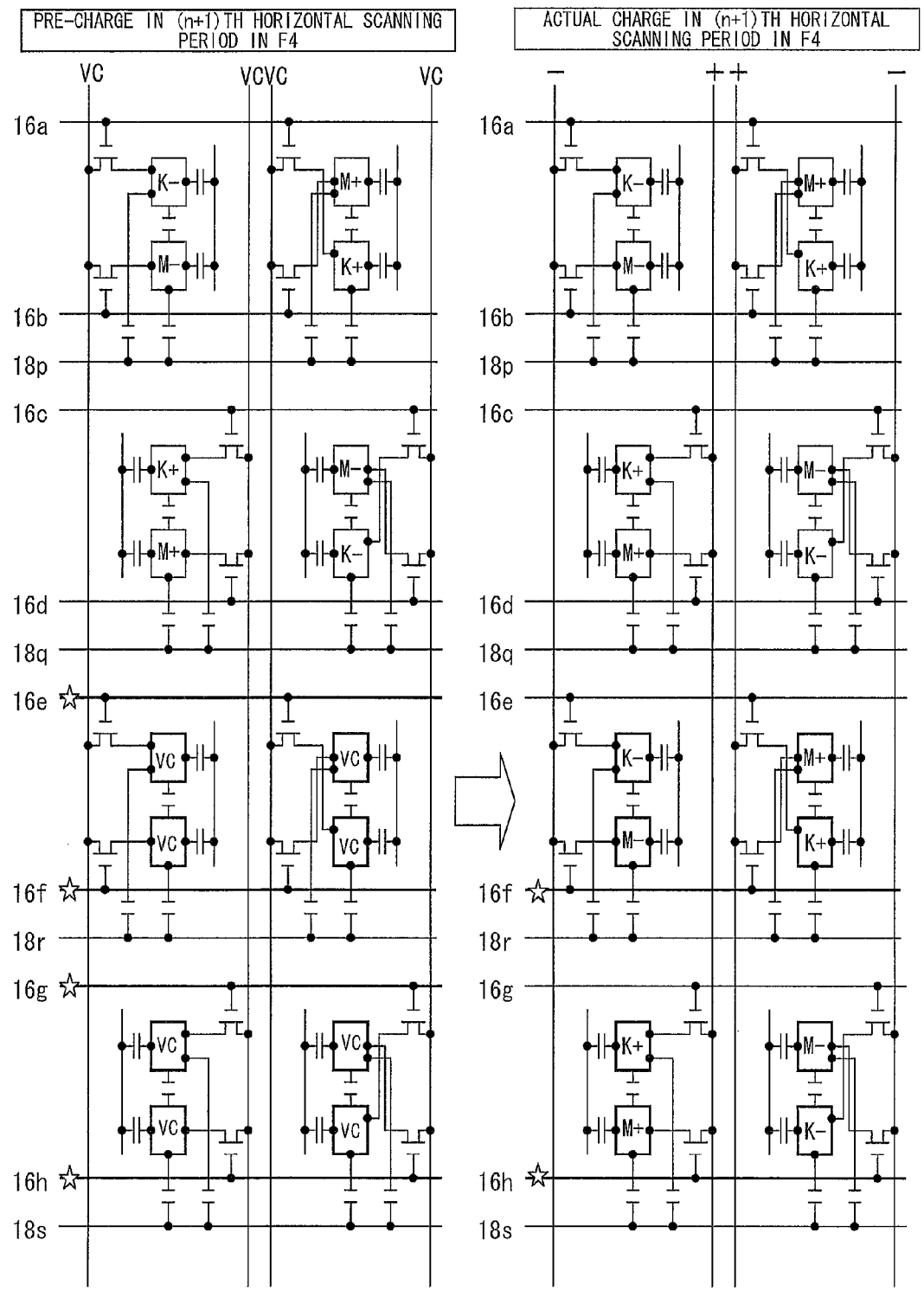
FIG. 10 is a view schematically describing a driving method in F4 ((n+1)th horizontal scanning period) in FIG. 2.

Further, as illustrated in FIGS. 1, 2 and 6, in the (n+1)th horizontal scanning period in F2, during a pre-charge period during which the scanning signal lines 16f and 16h are being selected simultaneously, out of four scanning signal lines (16e, 16f, 16g and 16h) that correspond to the row of pixels including the pixels 103 and 107 and the row of pixels including the pixels 104 and 108, scanning signal lines (16e and 16g) that are not being selected simultaneously are each turned ON and OFF. This causes the pixel electrodes 17e and 17F, each of which is connected via a transistor to the scanning signal line 16e, and the pixel electrodes 17g and 17H, each of which is connected via a transistor to the scanning signal line 16g, to be discharged.

Then, after the pre-charge period, data signals are written to the pixel electrodes 17f and 17E, each of which is connected via a transistor to the scanning signal line 16f, and to the pixel electrodes 17h and 17G, each of which is connected via a transistor to the scanning signal line 16h.

As a result, (i) in the pixel 103, the subpixel including the pixel electrode 17e serves as a dark subpixel having a positive polarity (K+) and the subpixel including the pixel electrode 17f serves as a light subpixel having a positive polarity (M+), (ii) in the pixel 107, the subpixel including the pixel electrode 17E serves as a light subpixel having a negative polarity (M−) and the subpixel including the pixel electrode 17F serves as a dark subpixel having a negative polarity (K−), (iii) in the pixel 104, the subpixel including the pixel electrode 17g serves as a dark subpixel having a negative polarity (K−) and the subpixel including the pixel electrode 17h serves as a light subpixel having a negative polarity (M−) and (iv) in the pixel 108, the subpixel including the pixel electrode 17G serves as a light subpixel having a positive polarity (M+) and the subpixel including the pixel electrode 17H serves as a dark subpixel having a positive polarity (K+).

In F3 and F4, polarities of data signals to be supplied to the data signal lines are reversed, and the same scanning as in F1 and F2 is repeated (refer to FIGS. 7 to 10).

A liquid crystal display device including the liquid crystal panel 5a employs a capacitively-coupled type pixel-division system, and is capable of writing data signals simultaneously to two rows of pixels. Therefore, the liquid crystal display device is good in viewing angle characteristic, and is capable of carrying out high-speed driving (e.g., double-speed driving) at a rewriting frequency of 60 Hz or higher while maintaining pixel charging periods.

Further, since two pixel electrodes included in a pixel are each connected via a transistor to a data signal line (that is, pixel electrodes do not electrically float), it is possible to suppress image sticking in pixels etc. which has been a problem for a capacitively-coupled type pixel-division system. Moreover, since a single subpixel can serve as a light subpixel and serve as a dark subpixel, it is possible to improve viewing angle characteristic as compared to a liquid crystal display device in which a single subpixel fixedly serves as a light subpixel or a dark subpixel. For example, in a case of an MVA liquid crystal display device, it is possible to form 4×2 (light, dark) domains for each subpixel from a time viewpoint. Furthermore, in each frame, since one (a pixel electrode corresponding to a dark subpixel) of two pixel electrodes included in a pixel is discharged before a data signal is written to the other one (a pixel electrode corresponding to a light subpixel) of the two pixel electrodes, it is possible to control luminance of light and dark subpixels appropriately (i.e., without being affected by a data signal having been written to the one of the two pixel electrodes in a previous frame).

Further, since a light subpixel and a dark subpixel are alternately arranged in the row direction and in the column direction (i.e., light and dark subpixels are arranged checkerwise) in each frame, it is possible to achieve a natural-looking display with little feeling of roughness. Furthermore, since a data signal supplied to a single data signal line has an identical polarity over two vertical periods, it is possible to reduce power consumption of a source driver as compared to a case where a polarity of a data signal is reversed for every one (1) horizontal scanning period. Note that, since polarity distribution of data signals to be written in each frame is dot-reversed, it is also possible to suppress flickers on a screen. Moreover, since a pre-charge period is included in each horizontal scanning period, it is possible to reduce variations in waveforms and values of charging rates resulting from a gray scale in an earlier frame (for example, in cases where a gray level 0 changes to a gray level 100 and a gray level 100 changes to a gray level 100 in a 256 gray scale display).

Figure 11:
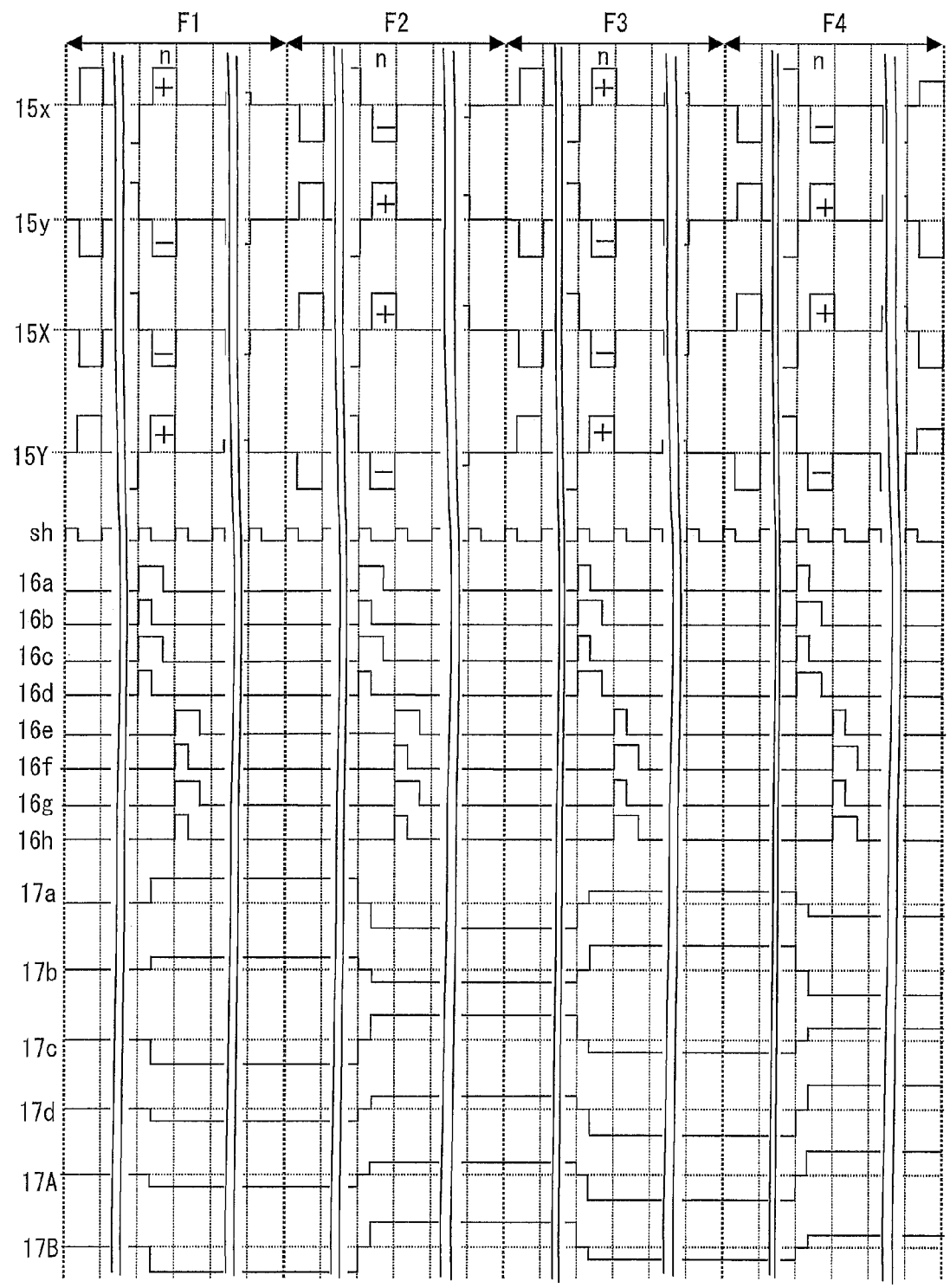
FIG. 11 is a timing chart illustrating another method of driving the liquid crystal panel shown in FIG. 1.

Further, according to the driving method shown in FIG. 2, in an odd-numbered frame, (i) one of two scanning signal lines that correspond to one of two rows of pixel areas and (ii) one of two scanning signal lines that correspond to the other one of the two rows of pixel areas are selected simultaneously; and in an even-numbered frame, (a) the other one of the two scanning signal lines that correspond to said one of the two rows of pixel areas and (b) the other one of the two scanning signal lines that correspond to said other one of the two rows of pixel areas are selected simultaneously, and a polarity of a data signal supplied to an identical data signal line is reversed for every one frame. Note, however, that this does not imply any limitation. For example, as illustrated in FIG. 11, in each of first two successive frames, (i) one of two scanning signal lines that correspond to one of two rows of pixel areas and (ii) one of two scanning signal lines that correspond to the other one of the two rows of pixel areas may be selected simultaneously; and in each of second two successive frames subsequent to the first two successive frames, (a) the other one of the two scanning signal lines that correspond to said one of the two rows of pixel areas and (b) the other one of the two scanning signal lines that correspond to said other one of the two rows of pixel areas may be selected simultaneously, and a polarity of a data signal supplied to an identical data signal line may be reversed for every two frames. In this case, a single subpixel switches between light and dark for every two frames and reverses its polarity for every one (I) frame.

Figure 12:
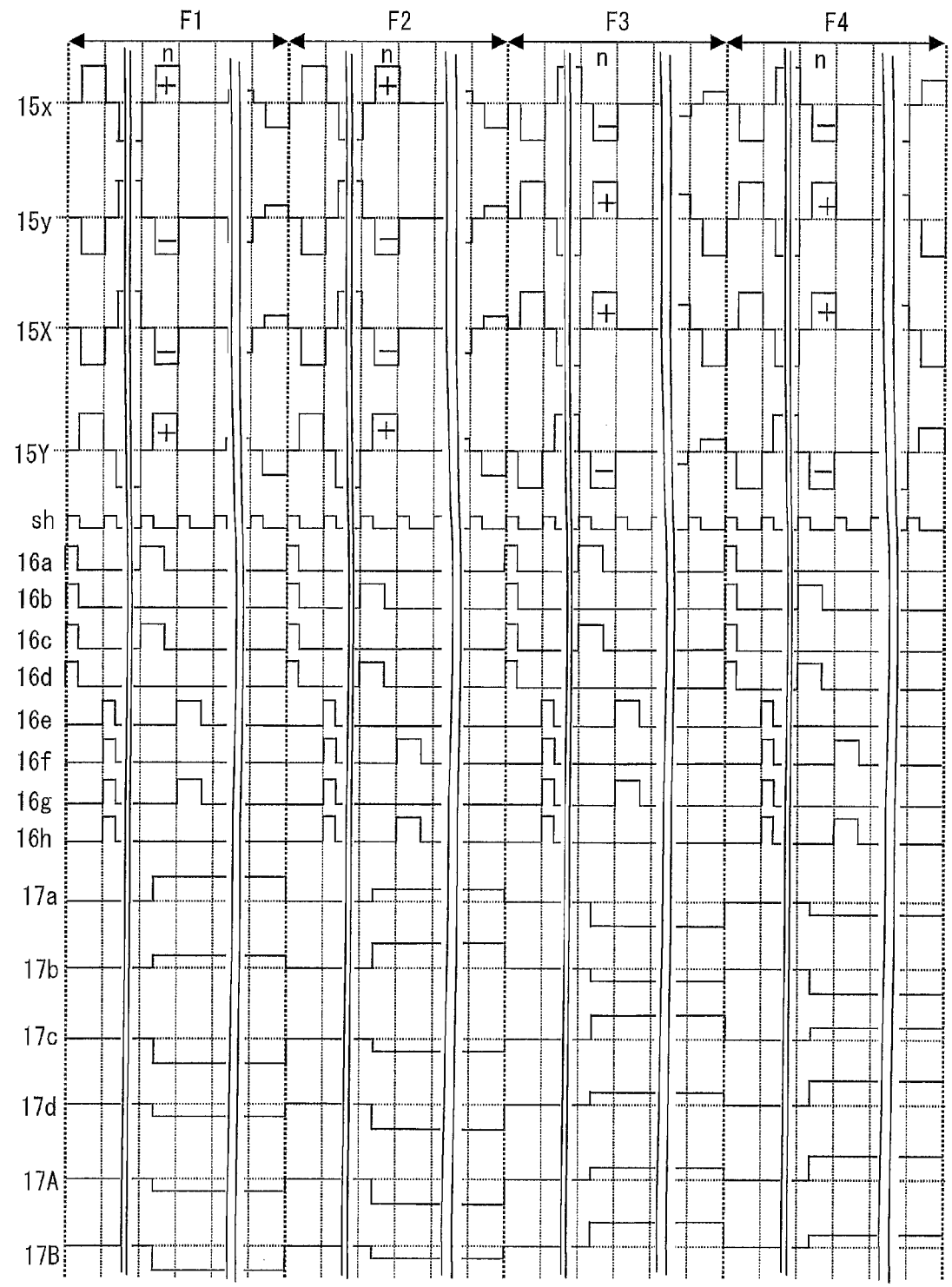
FIG. 12 is a timing chart illustrating a further method of driving the liquid crystal panel shown in FIG. 1.

Further, according to the driving methods shown in FIGS. 2 and 11, during a pre-charge period during simultaneous selection, scanning signal lines, out of four scanning signal lines that correspond to the two rows of pixel areas (to which data signals are to be written simultaneously), that are not being selected simultaneously are each turned ON and OFF. However, this does not imply any limitation. For example, as illustrated in FIG. 12, during a pre-charge period that comes before a start of simultaneous selection, four scanning signal lines that correspond to the two rows of pixel areas (to which data signals are to be written simultaneously) are each turned ON and OFF in synchronization with one another. In such a case, the four scanning signal lines can be turned ON and OFF in synchronization with one another ½ to ⅕ vertical scanning period before the simultaneous selection. This causes a black display in the two rows of pixel areas for ½ to ⅕ vertical scanning period, and thus brings about an effect of so-called black insertion. Accordingly, it is possible to suppress a feeling that a moving image etc. leaves trails.

Figure 13:
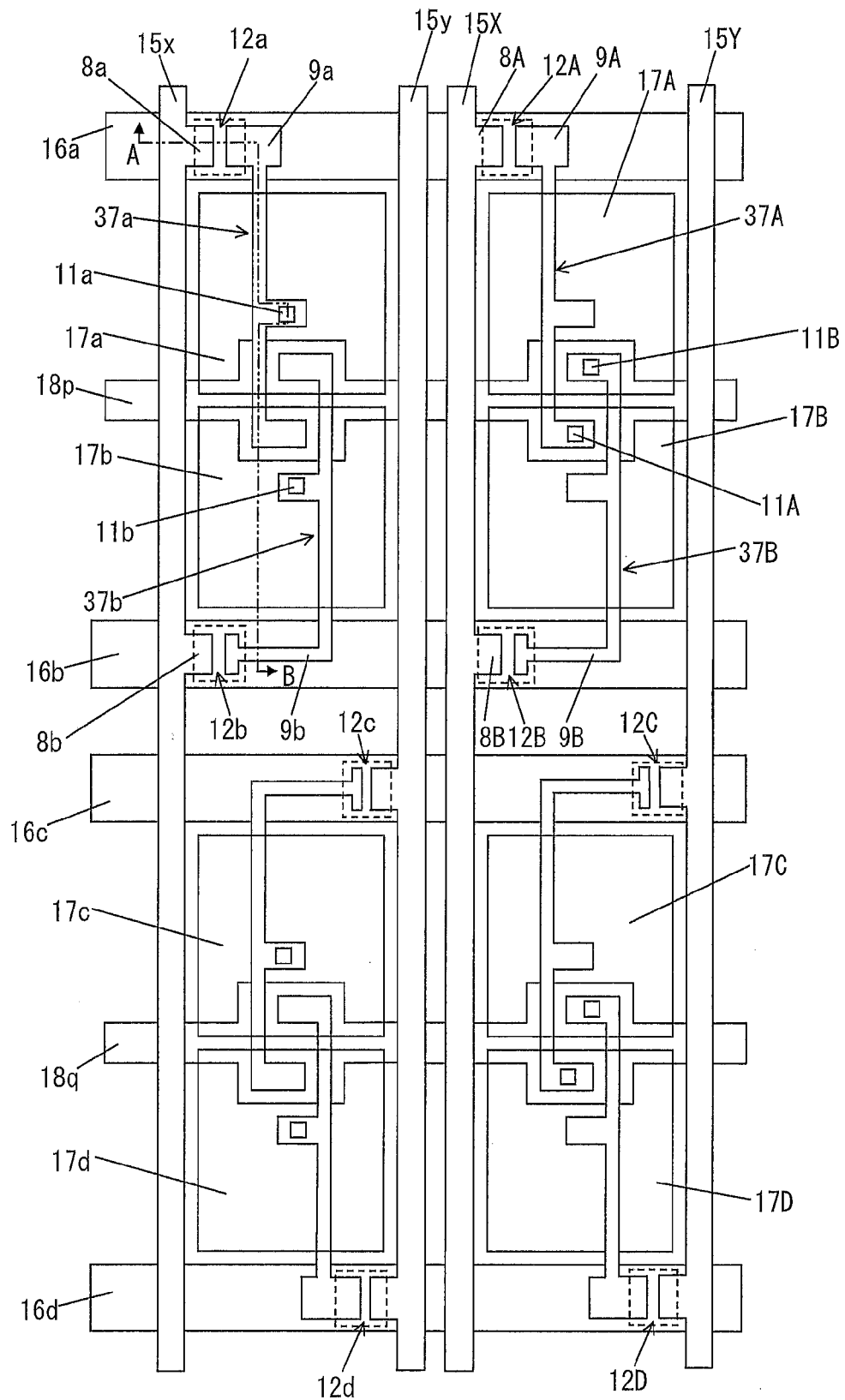
FIG. 13 is a plan view illustrating a configuration of the liquid crystal panel shown in FIG. 1.

FIG. 13 is a plan view illustrating an example of a configuration of part of the liquid crystal panel 5a shown in FIG. 1. As illustrated in FIG. 13, in the liquid crystal panel 5a, the scanning signal lines 16a to 16d each extending in the row direction are arranged in this order, and the data signal lines 15x, 15y, 15X and 15Y each extending in the column direction are arranged in this order. When viewed from above, the pixel electrodes 17a and 17b are arranged in the column direction in an area defined by the scanning signal lines 16a and 16b and the data signal lines 15x and 15y, the pixel electrodes 17A and 17B are arranged in the column direction in an area defined by the scanning signal lines 16a and 16b and the data signal lines 15X and 15Y, the pixel electrodes 17c and 17d are arranged in the column direction in an area defined by the scanning signal lines 16c and 16d and the data signal lines 15x and 15y, and the pixel electrodes 17C and 17D are arranged in the column direction in an area defined by the scanning signal lines 16c and 16d and the data signal lines 15X and 15Y. Further, a retention capacitor wire 18p is provided between the scanning signal lines 16a and 16b, and a retention capacitor wire 18q is provided between the scanning signal lines 16c and 16d.

Note that, the scanning signal line 16a serves as a gate electrode of each of the transistors 12a and 12A, the scanning signal line 16b serves as a gate electrode of each of the transistors 12b and 12B, the scanning signal line 16c serves as a gate electrode of each of the transistors 12c and 12C, and the scanning signal line 16d serves as a gate electrode of each of the transistors 12d and 12D. Further, a source electrode of each of the transistors 12a and 12b is connected to the data signal line 15x, a source electrode of each of the transistors 12c and 12d is connected to the data signal line 15y, a source electrode of each of the transistors 12A and 12B is connected to the data signal line 15X, and a source electrode of each of the transistors 12C and 12D is connected to the data signal line 15Y.

Further, a drain electrode 9a of the transistor 12a is connected to a capacitor electrode 37a, the capacitor electrode 37a and the pixel electrode 17a are connected to each other via a contact hole 11a, and the capacitor electrode 37a has a part that overlaps the retention capacitor wire 18p via a gate insulation film and a part that overlaps the pixel electrode 17b via an inter-layer insulation film. It should be noted that a border between the drain electrode 9a and the capacitor electrode 37a lies above an edge of the scanning signal line 16a. On the other hand, a drain electrode 9b of the transistor 12b is connected to a capacitor electrode 37b, the capacitor electrode 37b and the pixel electrode 17b are connected to each other via a contact hole 11b, and the capacitor electrode 37b has a part that overlaps the retention capacitor wire 18p via a gate insulation film and a part that overlaps the pixel electrode 17a via an inter-layer insulation film. It should be noted that a border between the drain electrode 9b and the capacitor electrode 37b lies above an edge of the scanning signal line 16b.

It should be noted here that a coupling capacitor Cab (refer to FIG. 1) is formed in a part where the capacitor electrode 37a and the pixel electrode 17b overlap each other and in a part where the capacitor electrode 37b and the pixel electrode 17a overlap each other, most of a retention capacitor Cha (refer to FIG. 1) is formed in a part where the capacitor electrode 37a and the retention capacitor wire 18p overlap each other, and most of a retention capacitor Chb (refer to FIG. 1) is formed in a part where the capacitor electrode 37b and the retention capacitor wire 18p overlap each other. Since a capacitor formed in the part where the capacitor electrode 37a and the pixel electrode 17b overlap each other and a capacitor formed in the part where the capacitor electrode 37b and the pixel electrode 17a overlap each other are connected in parallel to each other like above, it is possible to increase the value of the coupling capacitor Cab.

Further, the capacitor electrode 37a and the capacitor electrode 37b are arranged symmetrically with respect to a point at the center of a pixel, and the drain electrodes 9a and 9b are arranged such that the area of the drain electrode 9a and the area of the drain electrode 9b are equal to each other. This makes it possible to carry out an identical display in (i) a frame during which the subpixel including the pixel electrode 17a serves as a light subpixel and the subpixel including the pixel electrode 17b serves as a dark subpixel and (ii) a frame during which the subpixel including the pixel electrode 17a serves as a dark subpixel and the subpixel including the pixel electrode 17b serves as a light subpixel.

Further, a drain electrode 9A of the transistor 12A is connected to a capacitor electrode 37A, the capacitor electrode 37A and the pixel electrode 17B are connected to each other via a contact hole 11A, and the capacitor electrode 37A has a part that overlaps the retention capacitor wire 18p via a gate insulation film and a part that overlaps the pixel electrode 17A via an inter-layer insulation film. It should be noted that a border between the drain electrode 9A and the capacitor electrode 37A lies above an edge of the scanning signal line 16a. On the other hand, a drain electrode 9B of the transistor 12B is connected to a capacitor electrode 37B, the capacitor electrode 37B and the pixel electrode 17A are connected to each other via a contact hole 11B, and the capacitor electrode 37B has a part that overlaps the retention capacitor wire 18p via a gate insulation film and a part that overlaps the pixel electrode 17B via an inter-layer insulation film. It should be noted that a border between the drain electrode 9B and the capacitor electrode 37B lies above an edge of the scanning signal line 16b.

It should be noted here that a coupling capacitor CAB (refer to FIG. 1) is formed in a part where the capacitor electrode 37A and the pixel electrode 17A overlap each other and in a part where the capacitor electrode 37B and the pixel electrode 17B overlap each other, most of a retention capacitor ChA (refer to FIG. 1) is formed in a part where the capacitor electrode 37B and the retention capacitor wire 18p overlap each other, and most of a retention capacitor ChB (refer to FIG. 1) is formed in a part where the capacitor electrode 37A and the retention capacitor wire 18p overlap each other. Since a capacitor formed in the part where the capacitor electrode 37A and the pixel electrode 17A overlap each other and a capacitor formed in the part where the capacitor electrode 37B and the pixel electrode 17B overlap each other are connected in parallel to each other like above, it is possible to increase a value of the coupling capacitor CAB.

Further, the capacitor electrode 37A and the capacitor electrode 37B are arranged symmetrically with respect to a point at the center of a pixel, and the drain electrodes 9A and 9B are arranged such that the area of the drain electrode 9A and the area of the drain electrode 9B are equal to each other. This makes it possible to carry out an identical display in (i) a frame during which the subpixel including the pixel electrode 17A serves as a light subpixel and the subpixel including the pixel electrode 17B serves as a dark subpixel and (ii) a frame during which the subpixel including the pixel electrode 17A serves as a dark subpixel and the subpixel including the pixel electrode 17B serves as a light subpixel.

Figure 14:
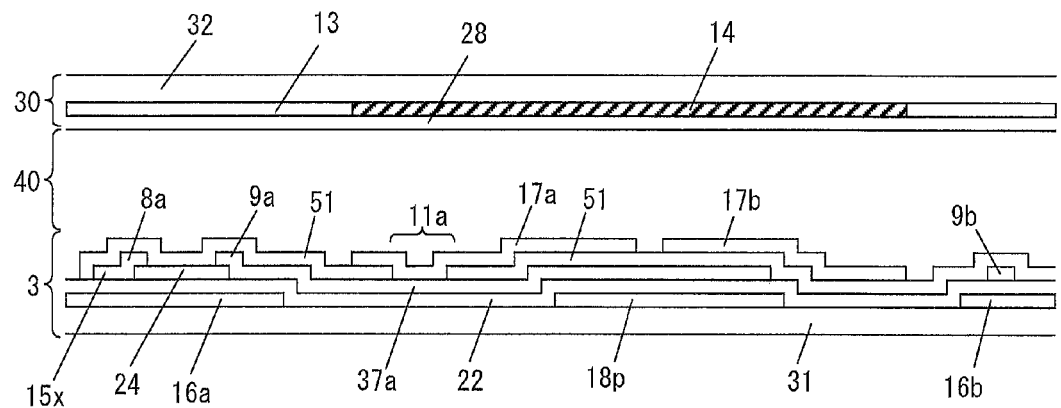
FIG. 14 is a cross-sectional view taken along line A-B in FIG. 13 (in a case where an inter-layer insulation film is thin).

FIG. 14 is a cross-sectional view taken along line A-B in FIG. 13. As illustrated in FIG. 14, the liquid crystal panel 5a includes an active matrix substrate 3, a color filter substrate 30 facing the active matrix substrate 3, and a liquid crystal layer 40 provided between these substrates (3 and 30).

The active matrix substrate 3 is constituted by a glass substrate 31, the scanning signal lines 16a and 16b and the retention capacitor wire 18p which are provided on the glass substrate 31, and a gate insulation film 22 which is provided so as to cover the scanning signal lines 16a and 16b and the retention capacitor wire 18p. On the gate insulation film 22, a semiconductor layer 24 (i layer and n+ layer), a source electrode 8a in contact with the n+ layer, the drain electrodes 9a and 9b, and the capacitor electrode 37a are provided, and an inter-layer insulation film 51 is provided so as to cover these layer and electrodes. On the inter-layer insulation film 51, the pixel electrodes 17a and 17b are provided, and an alignment film (not illustrated) is further provided so as to cover these electrodes (pixel electrodes 17a and 17b). Note here that, the inter-layer insulation film 51 is hollowed out to have the contact hole 11a, via which the pixel electrode 17a and the capacitor electrode 37a are connected to each other. Further, an end portion of the capacitor electrode 37a overlaps the pixel electrode 17b via the inter-layer insulation film 51 so as to form part of the coupling capacitor Cab (refer to FIG. 1). Further, an end portion of the capacitor electrode 37a overlaps the retention capacitor wire 18p via the gate insulation film 22 so as to form part of the retention capacitor Cha (refer to FIG. 1).

On the other hand, the color filter substrate 30 is constituted by: a glass substrate 32; a black matrix 13 and a colored layer 14 which are provided on the glass substrate 32; a common electrode (com) 28 which is provided on the black matrix 13 and the colored layer 14; and an alignment film (not illustrated) provided so as to cover the common electrode 28.

The following description discusses a method of producing a liquid crystal panel of the present embodiment. The method of producing the liquid crystal panel includes a step of producing an active matrix substrate, a step of producing a color filter substrate, and an assembling step for bonding these substrates and filling it with liquid crystal.

First, a film (1000 Å to 3000 Å in thickness) such as a metal film made of titanium, chromium, aluminum, molybdenum, tantalum, tungsten, copper or the like, a film of an alloy of any of these metals, or a film stack of any of these metals is formed by sputtering on a substrate made of glass or plastic etc. After that, the film is patterned by photolithography (Photo Engraving Process, note that this process includes an etching process and is hereinafter referred to as "PEP") to form scanning signal lines (gate electrode of each transistor) and retention capacitor wires.

Next, on an entire substrate on which the scanning signal lines have been formed, an inorganic insulation film (approximately 3000 Å to 5000 Å in thickness) made of for example silicon nitride or silicon oxide is formed by CVD (Chemical Vapor Deposition) and a photoresist is removed to form a gate insulation film.

Subsequently, on the gate insulation film (entire substrate), an intrinsic amorphous silicon film (1000 Å to 3000 Å in thickness) and an n+ amorphous silicon film (400 Å to 700 Å in thickness) to which phosphorus is added are sequentially formed by CVD. After that, the films are patterned by PEP and a photoresist is removed to form, on the gate electrode, an island-shaped silicon stack made of an intrinsic amorphous silicon layer and n+ amorphous silicon layer.

Subsequently, on the entire substrate on which the silicon stack has been formed, a film (1000 Å to 3000 Å in thickness) such as a metal film made of titanium, chromium, aluminum, molybdenum, tantalum, tungsten, copper or the like, a film of alloy of any of these metals, or a film stack of any of these metals is formed by sputtering. After that, the film is patterned by PEP to form data signal lines, source and drain electrodes of each transistor, and capacitor electrodes (to form a metal layer). In this process, a resist is removed if needed.

Further, (i) the n+ amorphous silicon layer which constitutes the silicon stack is etched and removed by using as a mask the photoresist used in forming the foregoing metal wires or by using as a mask the source electrodes and drain electrodes and (ii) the photoresist is removed, thereby a channel of each transistor is formed. Note here that, although a semiconductor layer can be formed from the amorphous silicon film like above, a polysilicon film can be formed and/or laser annealing can be carried out with respect to the amorphous silicon film and the polysilicon film to improve crystallinity. This allows electrons to move faster in the semiconductor layer, and thus makes it possible to improve characteristics of each transistor (TFT).

Next, an inter-layer insulation film is formed on the entire substrate on which the data signal lines etc. have been formed. Specifically, with use of a mixed gas made up of $SiH_4$ gas, $NH_3$ gas and $N_2$ gas, an inorganic insulation film (passivation film) made of SiNx approximately 3000 Å thick is formed by CVD so as to cover an entire surface of the substrate.

After that, the inter-layer insulation film is etched and removed by PEP to make a contact hole.

Subsequently, a transparent conductive film (1000 Å to 2000 Å in thickness) made of ITO (Indium Tin Oxide), IZO (Indium Zinc Oxide), zinc oxide, and/or tin oxide etc. is formed by sputtering on the entire substrate, which has thereon the inter-layer insulation film in which the contact hole has been made. After that, the transparent conductive film is patterned by PEP and a resist is removed to thereby form each pixel electrode.

Lastly, polyimide resin is printed so as to be 500 Å to 1000 Å in thickness on the entire substrate on which the pixel electrodes have been formed. After that, the polyimide resin is baked and subjected to rubbing in a single direction with a rotating cloth to form an alignment film. In this way, the active matrix substrate is produced.

The following description discusses the step of producing a color filter substrate.

First, a chrome thin film or a film of resin containing a black pigment is formed on a substrate (entire substrate) made of glass or plastic etc. After that, the film is patterned by PEP to from a black matrix. Next, patterns of a color filter layer (approximately 2 μm in thickness) of red, green and blue are formed in gaps in the black matrix by for example a pigment dispersion method.

Subsequently, a transparent conductive film (approximately 1000 Å in thickness) made of ITO, IZO, zinc oxide, and/or tin oxide etc. is formed on the entire substrate on which the color filter layer has been formed. In this way, a common electrode (com) is formed.

Lastly, polyimide resin is printed so as to be 500 Å to 1000 Å in thickness on the entire substrate on which the common electrode has been formed. After that, the polyimide resin is baked and subjected to rubbing in a single direction with a rotating cloth to form an alignment film. In this way, the color filter substrate can be produced.

The following description discusses the assembling step.

First, a sealing material made of thermosetting epoxy resin etc. is applied by screen printing to one of the active matrix and color filter substrates so as to be in the form of a frame that lacks a portion for injection of liquid crystal. To the other one of these substrates, spherical spacers made of plastic or silica and each having a diameter equivalent to the thickness of a liquid crystal layer are dispersed. Note that, instead of being dispersed, spacers can be formed on BM of a CF substrate or on the metal wires of the active matrix substrate by PEP.

Next, the active matrix substrate and the color filter substrate are bonded together, and the sealing material is cured.

Lastly, a liquid crystal material is injected by a pressure reduction method into a space enclosed by the active matrix substrate, the color filter substrate and the sealing material. After that, UV-curable resin is applied to the portion for injection of liquid crystal, and is subjected to UV irradiation to seal the liquid crystal material and to thereby form the liquid crystal layer. In this way, the liquid crystal panel is produced.

It should be noted that, in a case of an MVA (multi domain vertical alignment) liquid crystal panel, for example, a slit for controlling orientation is provided to each pixel electrode of the active matrix substrate and a rib (liner protrusion) for controlling orientation is provided to the color filter substrate. Note that, instead of the rib, a slit for controlling orientation can be provided to the common electrode of the color filter substrate.

Figure 15:
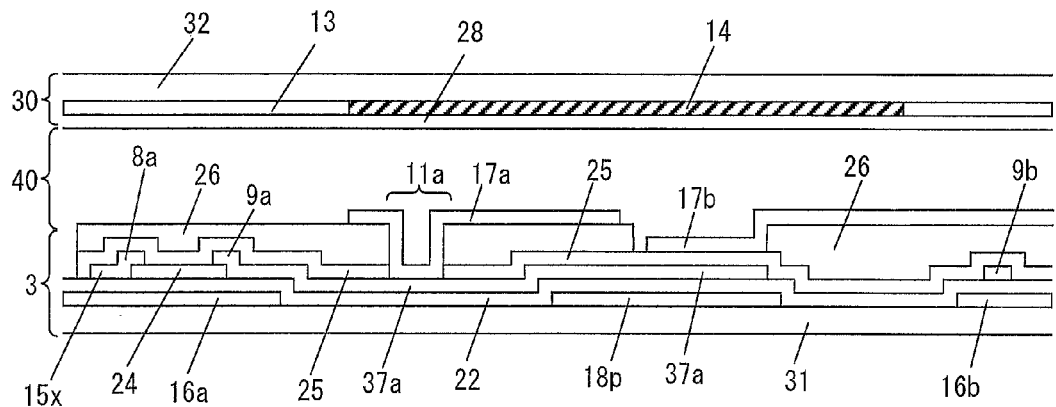
FIG. 15 is a cross-sectional view taken along line A-B in FIG. 13 (in a case where an inter-layer insulation film is thick).
Figure 16:
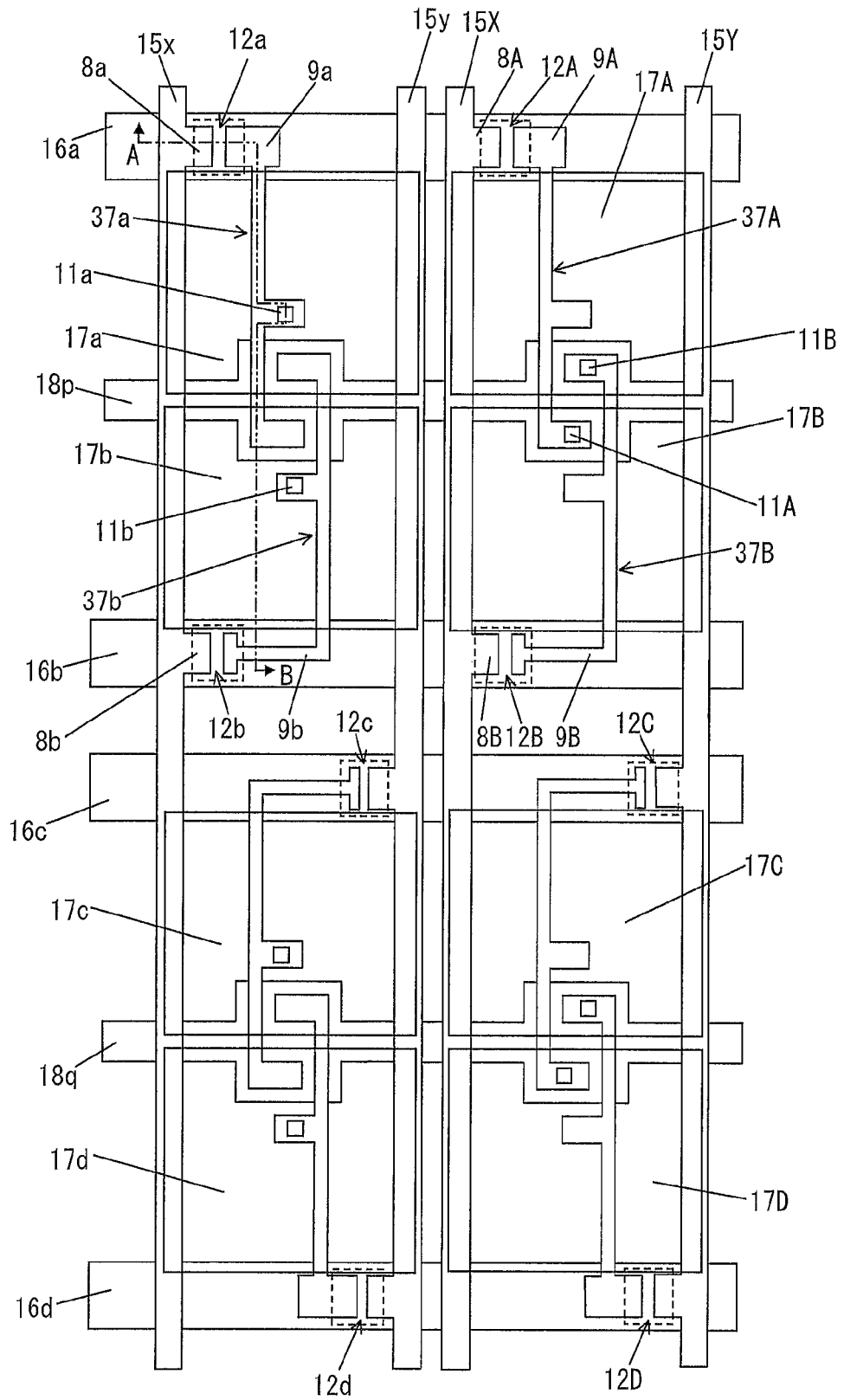
FIG. 16 is a plan view illustrating another configuration of the liquid crystal panel shown in FIG. 1.
Figure 17:
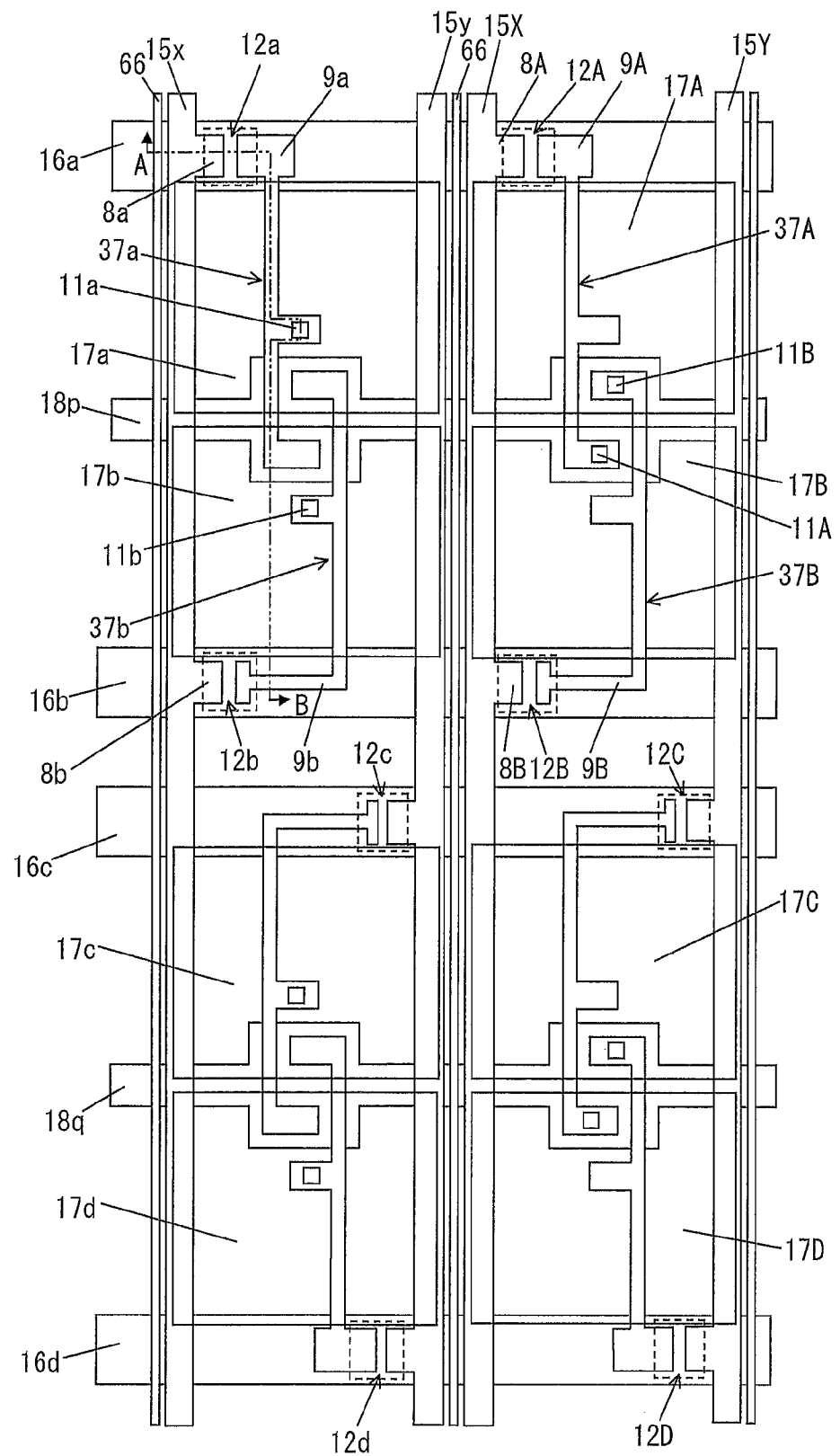
FIG. 17 is a plan view illustrating a modification of the liquid crystal panel shown in FIG. 16.
Figure 18:
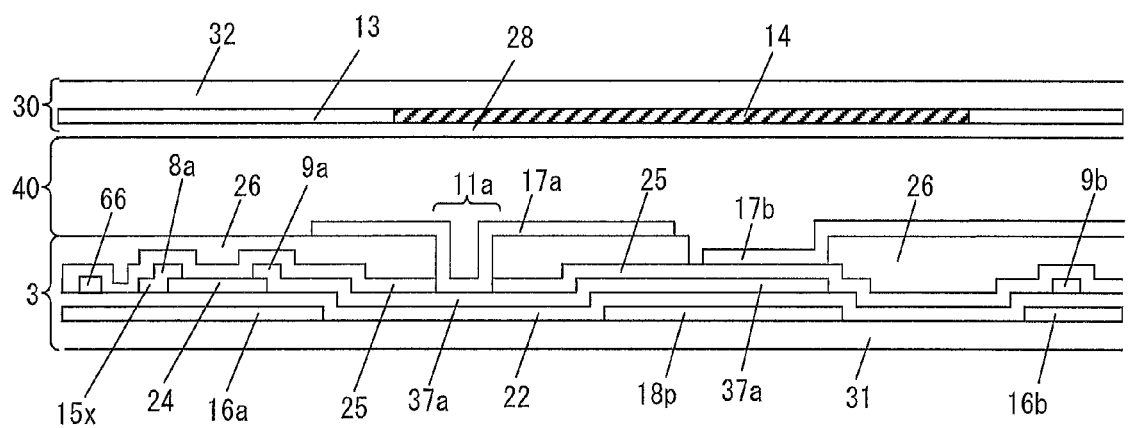
FIG. 18 is a cross-sectional view taken along line A-B in FIG. 17 (in a case where an inter-layer insulation film is thick).

It should be noted that the inter-layer insulation film (channel protection film) of the active matrix substrate can be constituted by an inorganic insulation film 25 and an organic insulation film 26 (see FIG. 15). This reduces various parasitic capacitances and prevents a short circuit between wires. It is preferable in the organic insulation film 26 that a part where the capacitor electrode 37a and the pixel electrode 17b overlap each other be hollowed out as shown in FIG. 15 or be made so as to be thinner than its surroundings. This makes it possible to increase a capacitance value of the coupling capacitor Cab (refer to FIG. 1). In a case where the inter-layer insulation film is formed so as to be thick like above, it is also possible to cause edge portions of each pixel electrode to overlap data signal lines and scanning signal lines (see FIG. 16) to improve aperture ratio. Further, in the configuration shown in FIG. 16, an intermediate wire to be supplied with a signal other than a data signal can be provided in (in the same layer as the data signal lines) or above (in the same layer as the pixel electrodes) a gap between two adjacent data signal lines that correspond to respective different columns of pixel areas. For example, as illustrated in FIG. 17, an intermediate wire 66 is provided in a gap between the data signal lines 15y and 15X (refer to FIG. 18, which is a cross-sectional view of FIG. 17). This makes it possible to suppress for example cross talk between the data signal line 15X and the pixel electrode 17a and cross talk between the data signal line 15y and the pixel electrode 17A.

Figure 19:
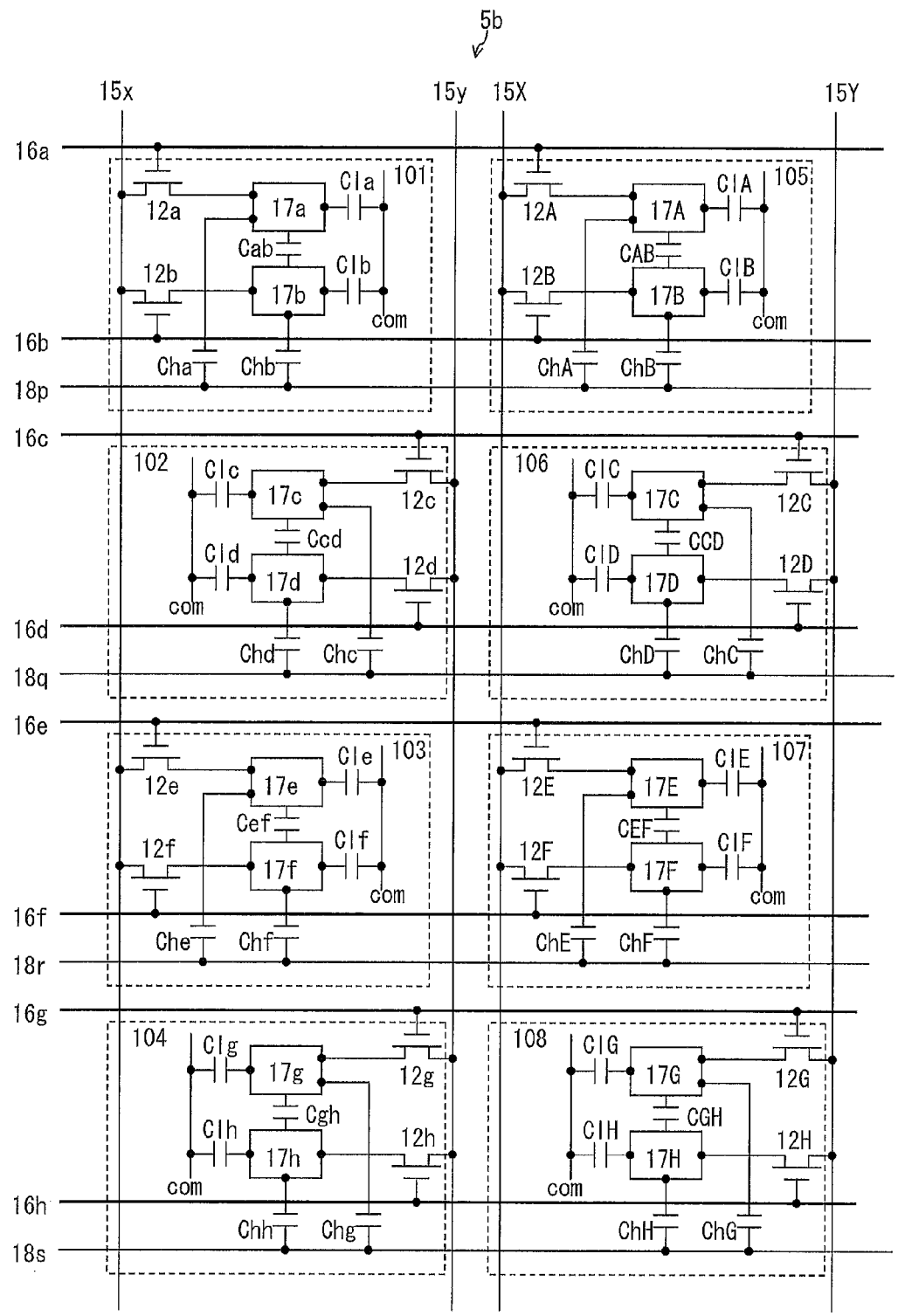
FIG. 19 is a circuit diagram illustrating another configuration of a liquid crystal panel in accordance with Embodiment 1.

FIG. 19 is a circuit diagram illustrating a configuration of a liquid crystal panel 5b of the present embodiment. The liquid crystal panel 5b is different from the liquid crystal panel 5a (refer to FIG. 1) in that (i) a transistor electrically connected to one of two pixel electrodes adjacent to each other in the row direction in a single row of pixels and (ii) a transistor electrically connected to the other one of the two pixel electrodes are connected to an identical scanning signal line.

For example, in the pixel 105 which is adjacent to the pixel 101 in the row direction, the two pixel electrodes 17A and 17B which are connected to each other via the capacitor CAB are arranged in the column direction, the drain electrode of the transistor 12A which is connected to the scanning signal line 16a is connected to the pixel electrode 17A which is adjacent to the pixel electrode 17a in the row direction, the drain electrode of the transistor 12B which is connected to the scanning signal line 16b is connected to the pixel electrode 17B which is adjacent to the pixel electrode 17b in the row direction, and the source electrode of each of the transistors 12A and 12B is electrically connected to an identical data signal line, i.e., the data signal line 15X.

Further, in the pixel 106 which is adjacent to the pixel 102 in the row direction, the two pixel electrodes 17C and 17D which are connected to each other via the capacitor CCD are arranged in the column direction, the drain electrode of the transistor 12C which is connected to the scanning signal line 16c is connected to the pixel electrode 17C which is adjacent to the pixel electrode 17c in the row direction, the drain electrode of the transistor 12D which is connected to the scanning signal line 16d is connected to the pixel electrode 17D which is adjacent to the pixel electrode 17d in the row direction, and the source electrode of each of the transistors 12C and 12D is electrically connected to an identical data signal line, i.e., the data signal line 15Y.

Figure 20:
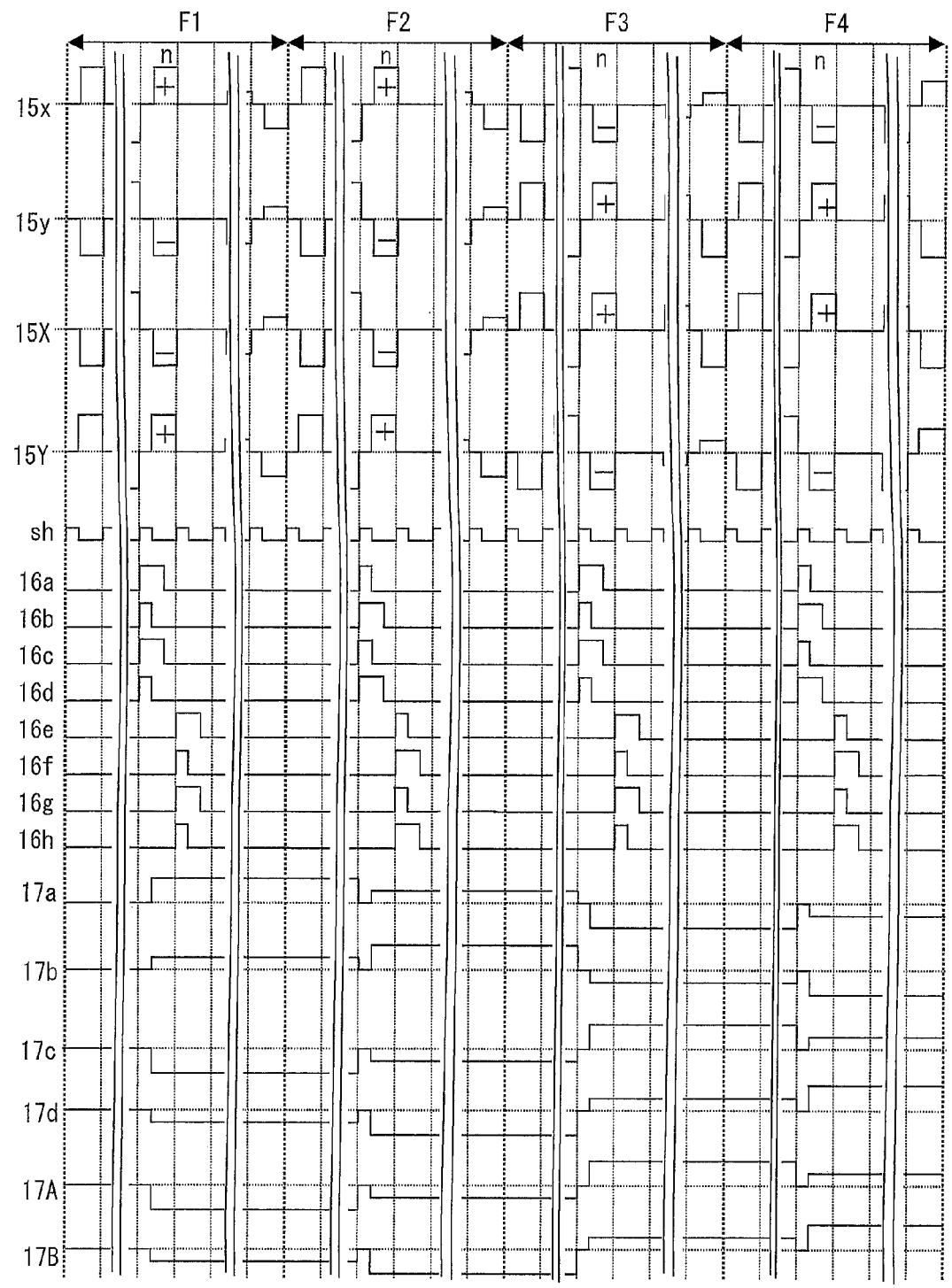
FIG. 20 is a timing chart illustrating a method of driving the liquid crystal panel shown in FIG. 19.

FIG. 20 is a timing chat illustrating a method of driving the liquid crystal panel 5b. In FIG. 20, 15x, 15y, 15X and 15Y denote data signals supplied to the data signal lines 15x, 15y, 15X and 15Y, respectively, sh denotes a signal that defines a pre-charge period, 16a to 16h denote signals (active High) supplied to the scanning signal lines 16a to 16h, respectively, and 17a to 17d, and 17A and 17B denote electric potentials of the pixel electrodes 17a to 17d, and 17A and 17B, respectively. The liquid crystal panel 5b is driven in the same manner as in the liquid crystal panel 5a except that, when the liquid crystal panel 5b is being driven, (i) a subpixel including one of two pixel electrodes adjacent to each other in the row direction in a single row of pixels and (ii) a subpixel including the other one of the two pixel electrodes both serve as light subpixels or both serve as dark subpixels.

Figure 21:
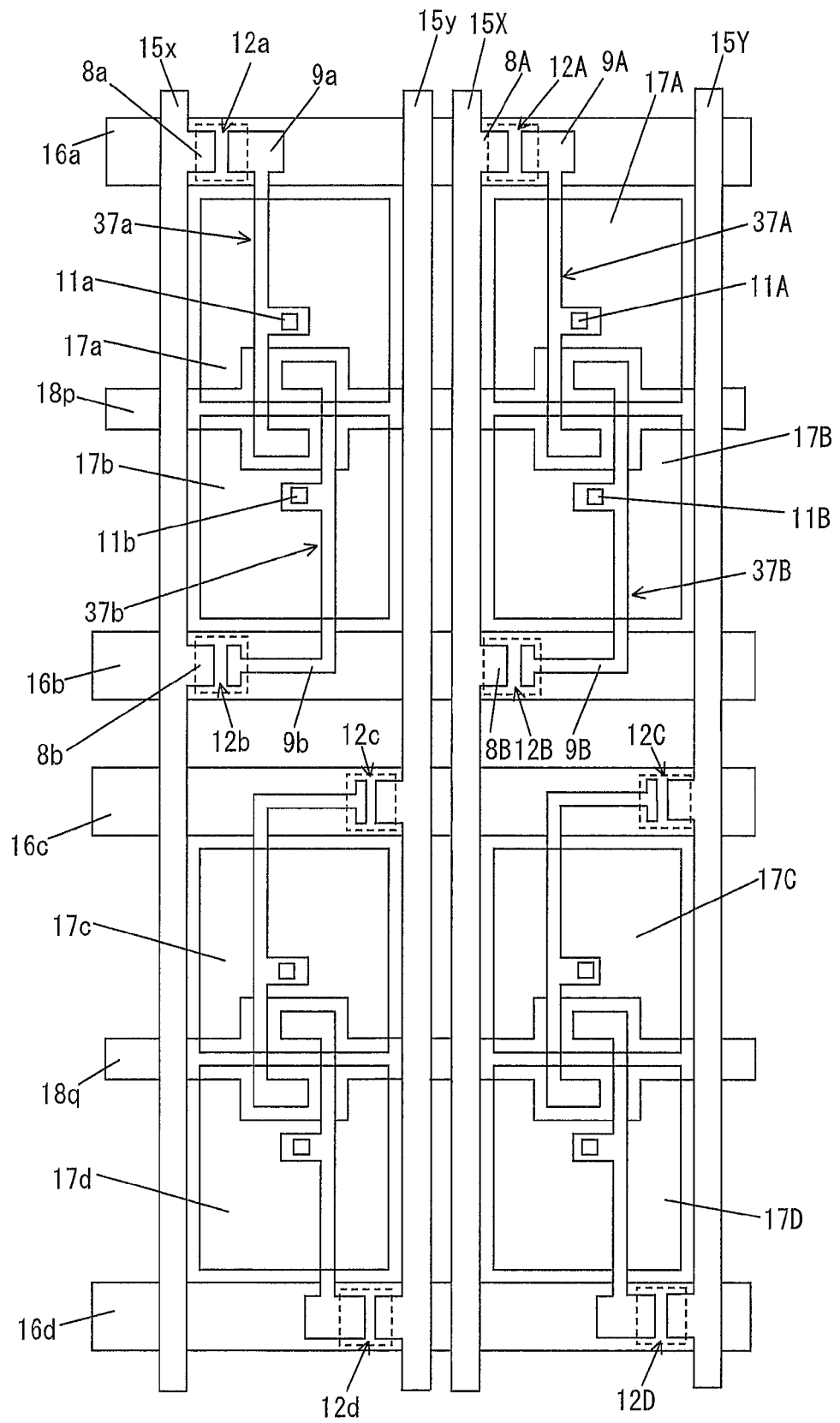
FIG. 21 is a plan view illustrating a configuration of the liquid crystal panel shown in FIG. 19.

FIG. 21 is a plan view illustrating a specific example of the liquid crystal panel 5b shown in FIG. 17. The configurations of each data signal line, each scanning signal line and each retention capacitor wire and each transistor in FIG. 21 are the same as those in FIG. 13. The drain electrode 9a of the transistor 12a is connected to the capacitor electrode 37a, the capacitor electrode 37a and the pixel electrode 17a are connected to each other via the contact hole 11a, and the capacitor electrode 37a has a part that overlaps the retention capacitor wire 18p via a gate insulation film and a part that overlaps the pixel electrode 17b via an inter-layer insulation film. Note that a border between the drain electrode 9a and the capacitor electrode 37a lies above an edge of the scanning signal line 16a. On the other hand, the drain electrode 9b of the transistor 12b is connected to the capacitor electrode 37b, the capacitor electrode 37b and the pixel electrode 17b are connected to each other via the contact hole 11b, and the capacitor electrode 37b has a part that overlaps the retention capacitor wire 18p via a gate insulation film and a part that overlaps the pixel electrode 17a via an inter-layer insulation film. Note that a border between the drain electrode 9b and the capacitor electrode 37b lies above an edge of the scanning signal line 16b. Further, the capacitor electrode 37a and the capacitor electrode 37b are arranged symmetrically with respect to a point at the center of a pixel, and the drain electrodes 9a and 9b are arranged such that the area of the drain electrode 9a and the area of the drain electrode 9b are equal to each other.

Further, the drain electrode 9A of the transistor 12A is connected to the capacitor electrode 37A, the capacitor electrode 37A and the pixel electrode 17A are connected to each other via the contact hole 11A, and the capacitor electrode 37A has a part that overlaps the retention capacitor wire 18p via a gate insulation film and a part that overlaps the pixel electrode 17B via an inter-layer insulation film. Note that a border between the drain electrode 9A and the capacitor electrode 37A lies above an edge of the scanning signal line 16a. On the other hand, the drain electrode 9B of the transistor 12B is connected to the capacitor electrode 37B, the capacitor electrode 37B and the pixel electrode 17B are connected to each other via the contact hole 11B, and the capacitor electrode 37B has a part that overlaps the retention capacitor wire 18p via a gate insulation film and a part that overlaps the pixel electrode 17A via an inter-layer insulation film. Note that a border between the drain electrode 9B and the capacitor electrode 37B lies above an edge of the scanning signal line 16b. Further, the capacitor electrode 37A and the capacitor electrode 37B are arranged symmetrically with respect to a point at the center of a pixel, and the drain electrodes 9A and 9B are arranged such that the area of the drain electrode 9A and the area of the drain electrode 9B are equal to each other.

Figure 22:
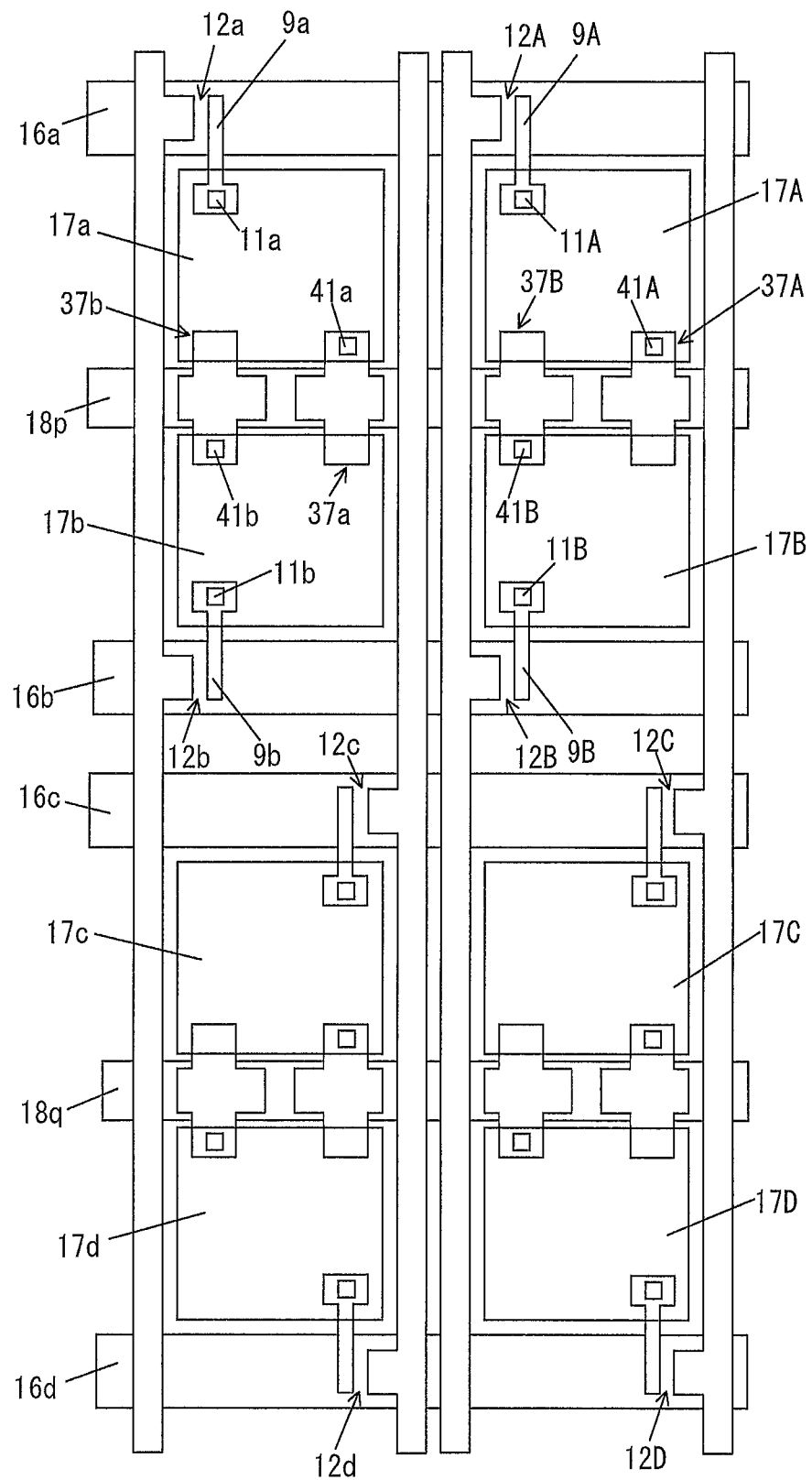
FIG. 22 is a plan view illustrating another configuration of the liquid crystal panel shown in FIG. 19.

FIG. 22 is a plan view illustrating another specific example of the liquid crystal panel 5b shown in FIG. 19. The configurations of each data signal line, each scanning signal line, each retention capacitor wire and each transistor in FIG. 20 are the same as those in FIG. 13. The drain electrode 9a of the transistor 12a is connected to the pixel electrode 17a via a drain extraction electrode and the contact hole 11a, and the capacitor electrode 37a connected via a contact hole 41a to the pixel electrode 17a has a part that overlaps the retention capacitor wire 18p via a gate insulation film and a part that overlaps the pixel electrode 17b via an inter-layer insulation film. Further, the drain electrode 9b of the transistor 12b is connected to the pixel electrode 17b via a drain extraction electrode and the contact hole 11b, and the capacitor electrode 37b connected via a contact hole 41b to the pixel electrode 17b has a part that overlaps the retention capacitor wire 18p via a gate insulation film and a part that overlaps the pixel electrode 17a via an inter-layer insulation film.

It should be noted here that a coupling capacitor Cab (refer to FIG. 19) is formed in a part where the capacitor electrode 37a and the pixel electrode 17b overlap each other and in a part where the capacitor electrode 37b and the pixel electrode 17a overlap each other, a retention capacitor Cha (refer to FIG. 19) is formed in a part where the capacitor electrode 37a and the retention capacitor wire 18p overlap each other, and a retention capacitor Chb (refer to FIG. 19) is formed in a part where the capacitor electrode 37b and the retention capacitor wire 18p overlap each other. Since a capacitor formed in the part where the capacitor electrode 37a and the pixel electrode 17b overlap each other and a capacitor formed in the part where the capacitor electrode 37b and the pixel electrode 17a overlap each other are connected in parallel to each other like above, it is possible to increase a value of the coupling capacitor Cab.

Further, the capacitor electrode 37a and the capacitor electrode 37b are arranged symmetrically with respect to a point at the center of a pixel, and the drain electrodes 9a and 9b are arranged such that the area of the drain electrode 9a and the area of the drain electrode 9b are equal to each other. This makes it possible to carry out an identical display in (i) a frame during which the subpixel including the pixel electrode 17a serves as a light subpixel and the subpixel including the pixel electrode 17b serves as a dark subpixel and (ii) a frame during which the subpixel including the pixel electrode 17a serves as a dark subpixel and the subpixel including the pixel electrode 17b serves as a light subpixel.

Further, the drain electrode 9A of the transistor 12A is connected to the pixel electrode 17A via a drain extraction electrode and the contact hole 11A, and the capacitor electrode 37A connected via a contact hole 41A to the pixel electrode 17A has a part that overlaps the retention capacitor wire 18p via a gate insulation film and a part that overlaps the pixel electrode 17B via an inter-layer insulation film. Further, the drain electrode 9B of the transistor 12B is connected to the pixel electrode 17B via a drain extraction electrode and the contact hole 11B, and the capacitor electrode 37B connected via a contact hole 41B to the pixel electrode 17B has a part that overlaps the retention capacitor wire 18p via a gate insulation film and a part that overlaps the pixel electrode 17A via an inter-layer insulation film.

It should be noted here that a coupling capacitor CAB (refer to FIG. 19) is formed in a part where the capacitor electrode 37A and the pixel electrode 17B overlap each other and in a part where the capacitor electrode 37B and the pixel electrode 17A overlap each other, a retention capacitor ChA (refer to FIG. 19) is formed in a part where the capacitor electrode 37A and the retention capacitor wire 18p overlap each other, and a retention capacitor ChB (refer to FIG. 19) is formed in a part where the capacitor electrode 37B and the retention capacitor wire 18p overlap each other. Since a capacitor formed in the part where the capacitor electrode 37A and the pixel electrode 17B overlap each other and a capacitor formed in the part where the capacitor electrode 37B and the pixel electrode 17A overlap each other are connected in parallel to each other like above, it is possible to increase a value of the coupling capacitor CAB.

Further, the capacitor electrode 37A and the capacitor electrode 37B are arranged symmetrically with respect to a point at the center of a pixel, and the drain electrodes 9A and 9B are arranged such that the area of the drain electrode 9A and the area of the drain electrode 9B are equal to each other. This makes it possible to carry out an identical display in (i) a frame during which the subpixel including the pixel electrode 17A serves as a light subpixel and the subpixel including the pixel electrode 17B serves as a dark subpixel and (ii) a frame during which the subpixel including the pixel electrode 17A serves as a dark subpixel and the subpixel including the pixel electrode 17B serves as a light subpixel.

Embodiment 2

Figure 23:
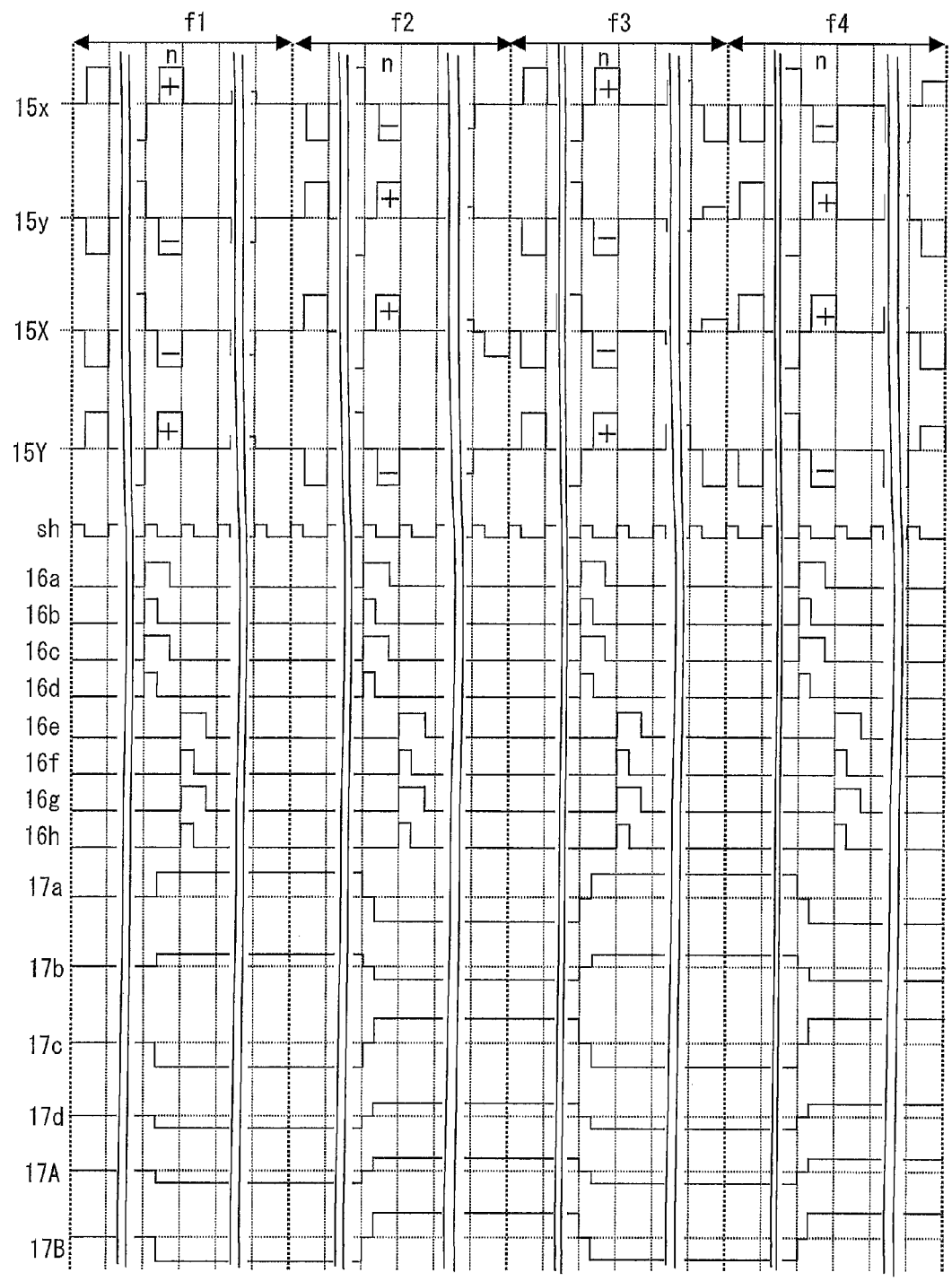
FIG. 23 is a timing chart illustrating a driving method (in a case of the liquid crystal panel shown in FIG. 1) of Embodiment 2.

In Embodiment 2, the liquid crystal panel 5a shown in FIG. 1 is driven in such a manner as shown in FIG. 23. In FIG. 23, 15x, 15y, 15X and 15Y denote data signals supplied to the data signal lines 15x, 15y, 15X and 15Y, respectively, sh denotes a signal that defines a pre-charge period, 16a to 16h denote signals (active High) supplied to the scanning signal lines 16a to 16h, respectively, and 17a to 17d, and 17A and 17B denote electric potentials of the pixel electrodes 17a to 17d, and 17A and 17B, respectively. Further, FIGS. 24 and 25 each describe a driving in f1 (first frame) in FIG. 23, and FIGS. 26 and 27 each describe a driving in f2 (second frame) in FIG. 23.

According to the driving method shown in FIG. 23, in each frame, (i) one of two scanning signal lines that correspond to one of two adjacent rows of pixels and (ii) one of two scanning signal lines that correspond to the other one of the two adjacent rows of pixels are selected simultaneously (the same two scanning signal lines are selected in each frame) so that data signals are written simultaneously to the two rows of pixels. In this case, light and dark of each subpixel are not switched.

Further, (i) a data signal line connected via a transistor to each of pixel electrodes included in one of two pixels adjacent to each other in the column direction and (ii) a data signal line connected via a transistor to each of pixel electrodes included in the other one of the two pixels are supplied with data signals having respective opposite polarities.

For example, in f1, the data signal line 15x, which is connected via the respective transistors (12a and 12b) to the pixel electrodes (17a and 17b) included in the pixel 101, is supplied with a data signal having a positive polarity, and the data signal line 15y, which is connected via the respective transistors (12c and 12d) to the pixel electrodes (17c and 17d) included in the pixel 102 adjacent to the pixel 101 in the column direction, is supplied with a data signal having a negative polarity.

Further, (i) a data signal line connected via a transistor to each of pixel electrodes included in one of two pixels adjacent to each other in the row direction and (ii) a data signal line connected via a transistor to each of pixel electrodes included in the other one of the two pixels are supplied with data signals having respective opposite polarities.

For example, the data signal line 15x, which is connected via the respective transistors (12a and 12b) to the pixel electrodes (17a and 17b) included in the pixel 101, is supplied with a data signal having a positive polarity, and the data signal line 15X, which is connected via the respective transistors (12A and 12B) to the pixel electrodes (17A and 17B) included in the pixel 105 adjacent to the pixel 101 in the row direction, is supplied with a data signal having a negative polarity.

Further, a polarity of a data signal that is supplied to an identical data signal line is reversed for every one (I) frame. That is, a polarity of each pixel is reversed for every one (I) frame.

For example, in f1, the data signal lines 15x and 15Y are each supplied with a data signal having a positive polarity and the data signal lines 15y and 15X are each supplied with a data signal having a negative polarity, and, in f2, the data signal lines 15x and 15Y are each supplied with a data signal having a negative polarity and the data signal lines 15y and 15X are each supplied with a data signal having a positive polarity.

Further, each horizontal scanning period includes a pre-charge period during which a certain electric potential (here, a common electrode electric potential VC) is supplied to each data signal line. During a pre-charge period during simultaneous selection, scanning signal lines, out of four scanning signal lines that correspond to the two rows of pixel areas (to which data signals are to be written simultaneously), that are not being selected simultaneously are each turned ON and OFF.

Figure 24:
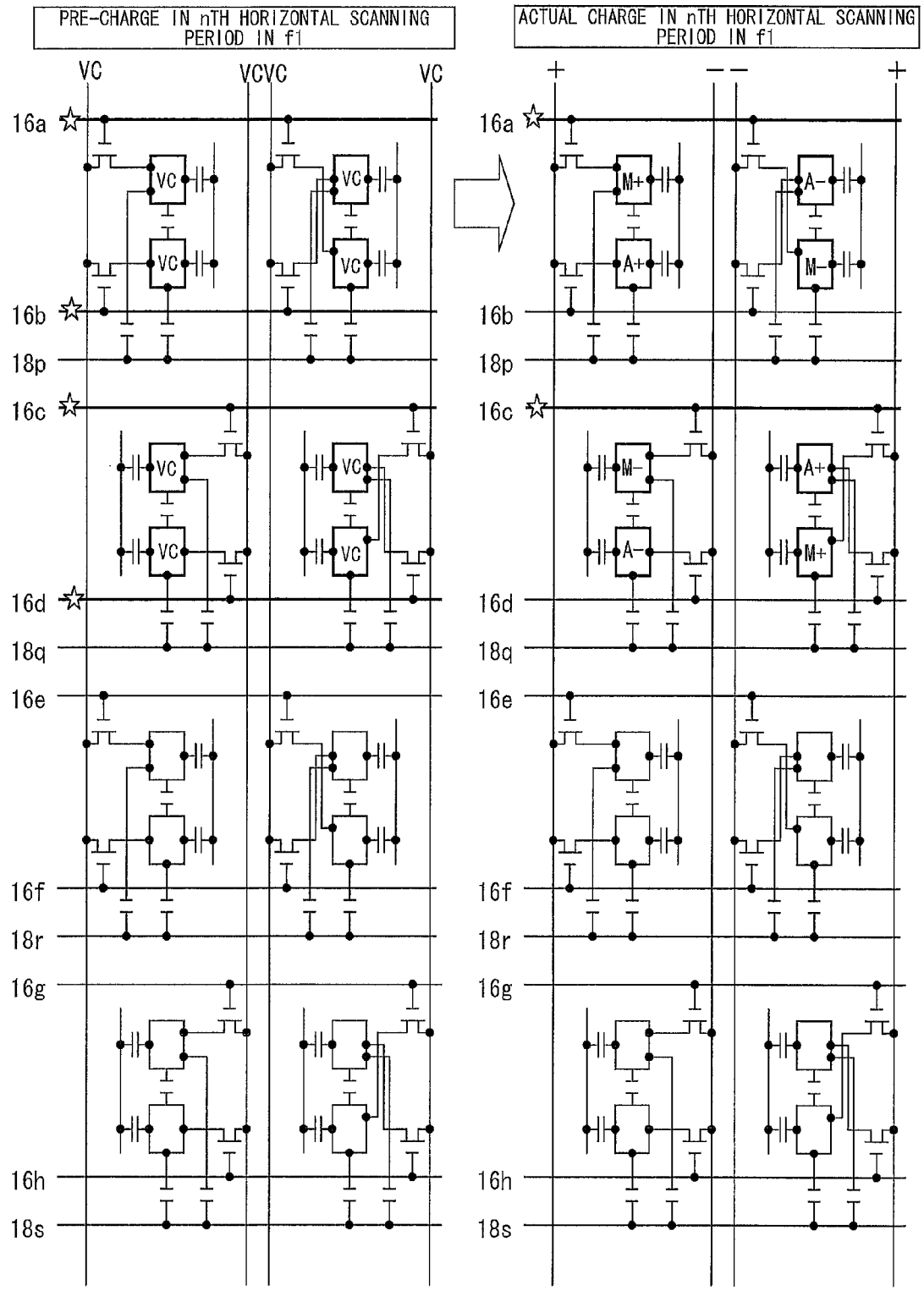
FIG. 24 is a view schematically describing a driving method in f1 (nth horizontal scanning period) in FIG. 23.

For example, as illustrated in FIGS. 22 to 24, in the nth horizontal scanning period in f1, during a pre-charge period during which the scanning signal lines 16a and 16c are being selected simultaneously, out of four scanning signal lines (16a, 16b, 16c and 16d) that correspond to the row of pixels including the pixels 101 and 105 and the row of pixels including the pixels 102 and 106, scanning signal lines (16*b* and 16*d*) that are not being selected simultaneously are each turned ON and OFF (i.e., caused to be active and thereafter caused to be inactive). This causes the pixel electrodes 17*b* and 17A, each of which is connected via a transistor to the scanning signal line 16*b*, and the pixel electrodes 17*d* and 17C, each of which is connected via a transistor to the scanning signal line 16*d*, to be discharged.

Then, after the pre-charge period, data signals are written to the pixel electrodes 17*a* and 17B, each of which is connected via a transistor to the scanning signal line 16*a*, and to the pixel electrodes 17*c* and 17D, each of which is connected via a transistor to the scanning signal line 16*c*.

As a result, (i) in the pixel 101, the subpixel including the pixel electrode 17*a* serves as a light subpixel having a positive polarity (M+) and the subpixel including the pixel electrode 17*b* serves as a dark subpixel having a positive polarity (A+), (ii) in the pixel 105, the subpixel including the pixel electrode 17A serves as a dark subpixel having a negative polarity (A−) and the subpixel including the pixel electrode 17B serves as a light subpixel having a negative polarity (M−), (iii) in the pixel 102, the subpixel including the pixel electrode 17*c* serves as a light subpixel having a negative polarity (M−) and the subpixel including the pixel electrode 17*d* serves as a dark subpixel having a negative polarity (A−) and (iv) in the pixel 106, the subpixel including the pixel electrode 17C serves as a dark subpixel having a positive polarity (A+) and the subpixel including the pixel electrode 17D serves as a light subpixel having a positive polarity (M+).

Figure 25:
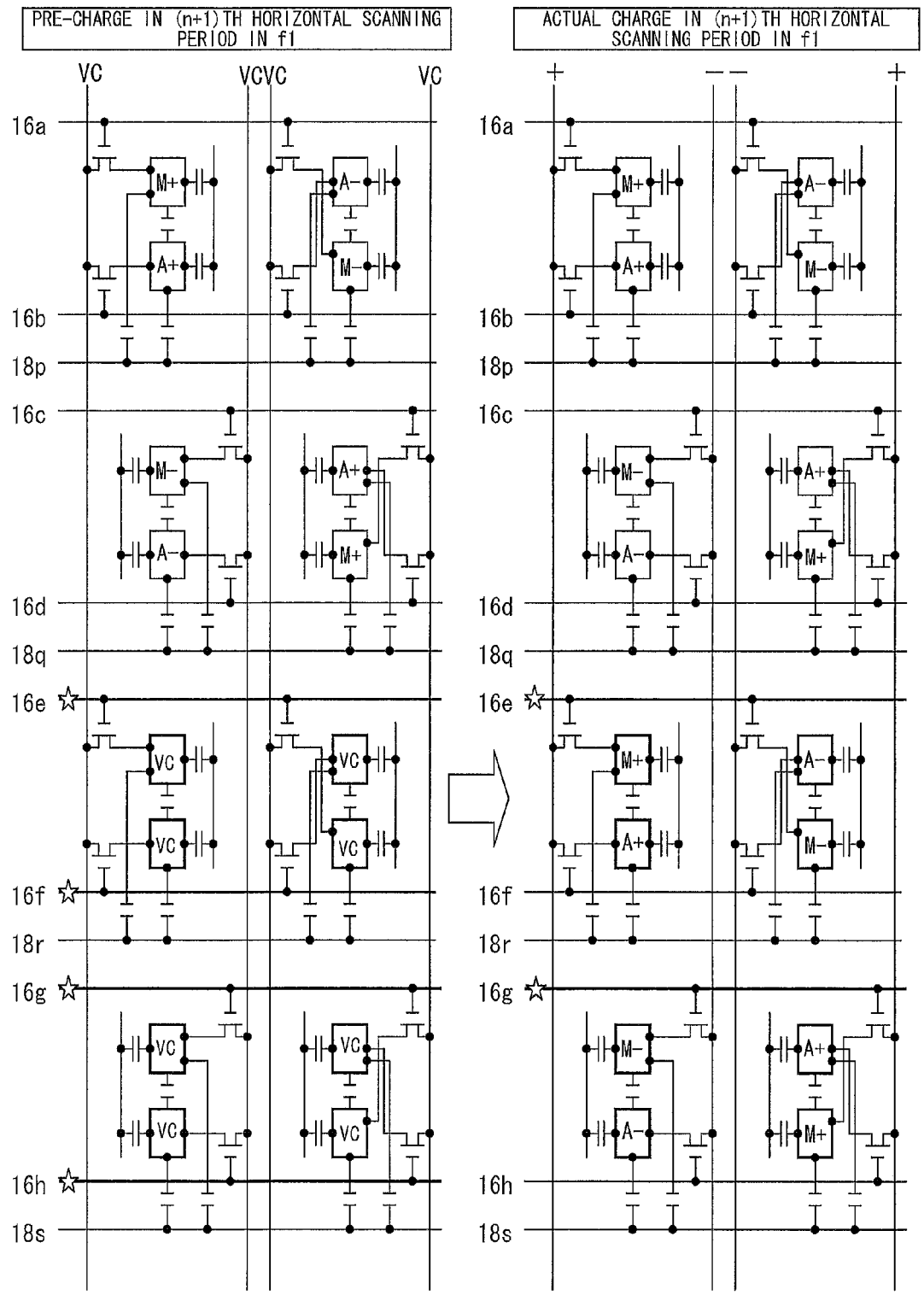
FIG. 25 is a view schematically describing a driving method in f1 ((n+1)th horizontal scanning period) in FIG. 23.

Further, as illustrated in FIGS. 22, 23 and 25, in the (n+1)th horizontal scanning period in f1, during a pre-charge period during which the scanning signal lines 16*e* and 16*g* are being selected simultaneously, out of four scanning signal lines (16*e*, 16*f*, 16*g* and 16*h*) that correspond to the row of pixels including the pixels 103 and 107 and the row of pixels including the pixels 104 and 108, scanning signal lines (16*f* and 16*h*) that are not being selected simultaneously are each turned ON and OFF. This causes the pixel electrodes 17*f* and 17E, each of which is connected via a transistor to the scanning signal line 16*f*, and the pixel electrodes 17*h* and 17G, each of which is connected via a transistor to the scanning signal line 16*h*, to be discharged.

Then, after the pre-charge period, data signals are written to the pixel electrodes 17*e* and 17F, each of which is connected via a transistor to the scanning signal line 16*e*, and to the pixel electrodes 17*g* and 17H, each of which is connected via a transistor to the scanning signal line 16*g*.

As a result, (i) in the pixel 103, the subpixel including the pixel electrode 17*e* serves as a light subpixel having a positive polarity (M+) and the subpixel including the pixel electrode 17*f* serves as a dark subpixel having a positive polarity (A+), (ii) in the pixel 107, the subpixel including the pixel electrode 17E serves as a dark subpixel having a negative polarity (A−) and the subpixel including the pixel electrode 17F serves as a light subpixel having a negative polarity (M−), (iii) in the pixel 104, the subpixel including the pixel electrode 17*g* serves as a light subpixel having a negative polarity (M−) and the subpixel including the pixel electrode 17*h* serves as a dark subpixel having a negative polarity (A−) and (iv) in the pixel 108, the subpixel including the pixel electrode 17G serves as a dark subpixel having a positive polarity (A+) and the subpixel including the pixel electrode 17H serves as a light subpixel having a positive polarity (M+).

In f2, polarities of data signals to be supplied to the data signal lines are reversed, and the same scanning as in f1 is repeated.

Figure 26:
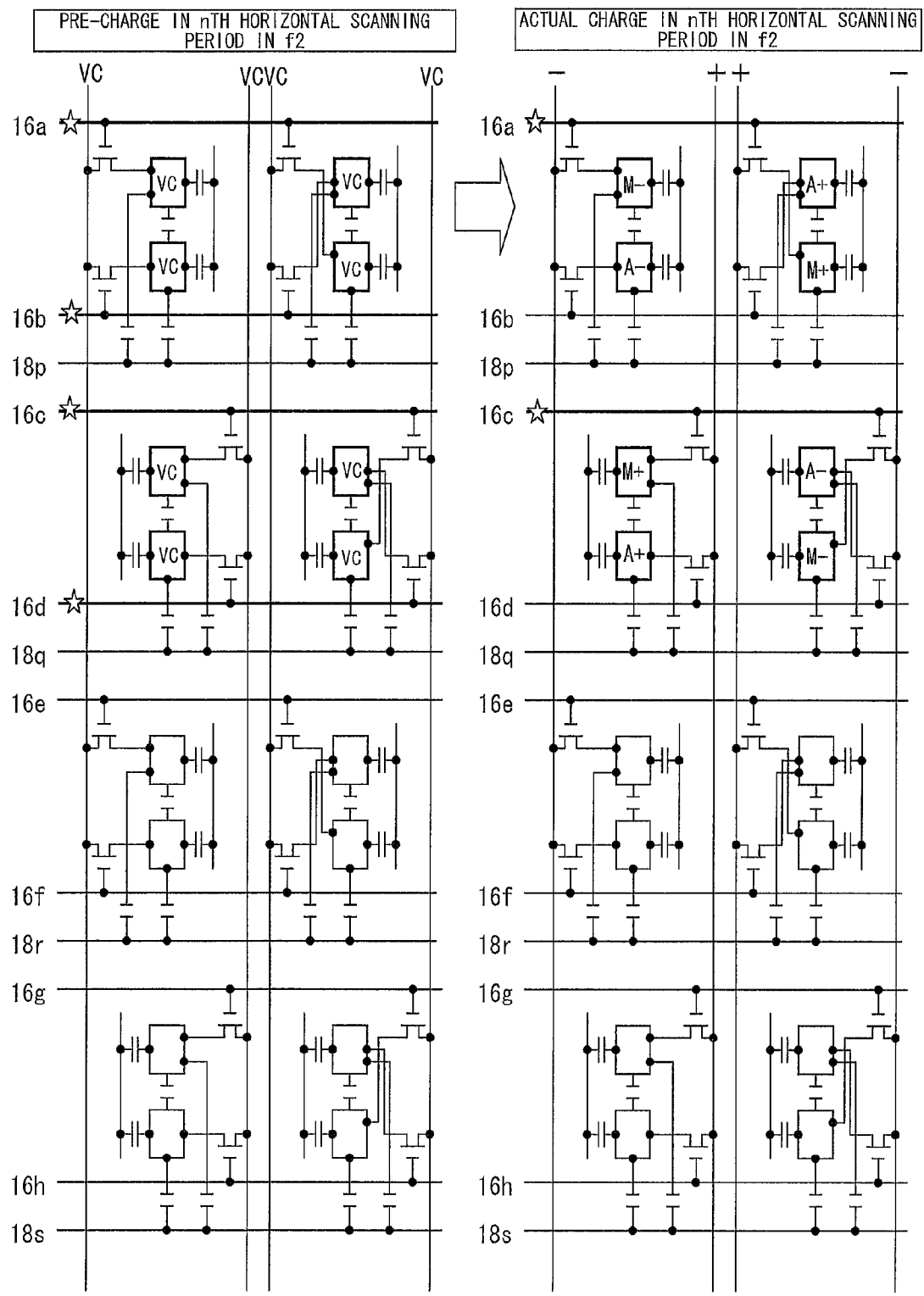
FIG. 26 is a view schematically describing a driving method in f2 (nth horizontal scanning period) in FIG. 23.

Specifically, as illustrated in FIGS. 22, 23 and 26, in the nth horizontal scanning period in f2, during a pre-charge period during which the scanning signal lines 16*a* and 16*c* are being selected simultaneously, out of four scanning signal lines (16*a*, 16*b*, 16*c* and 16*d*) that correspond to the row of pixels including the pixels 101 and 105 and the row of pixels including the pixels 102 and 106, scanning signal lines (16*b* and 16*d*) that are not being selected simultaneously are each turned ON and OFF (i.e., caused to be active and thereafter caused to be inactive). This causes the pixel electrodes 17*b* and 17A, each of which is connected via a transistor to the scanning signal line 16*b*, and the pixel electrodes 17*d* and 17C, each of which is connected via a transistor to the scanning signal line 16*d*, to be discharged.

Then, after the pre-charge period, data signals are written to the pixel electrodes 17*a* and 17B, each of which is connected via a transistor to the scanning signal line 16*a*, and to the pixel electrodes 17*c* and 17D, each of which is connected via a transistor to the scanning signal line 16*c*.

Figure 27:
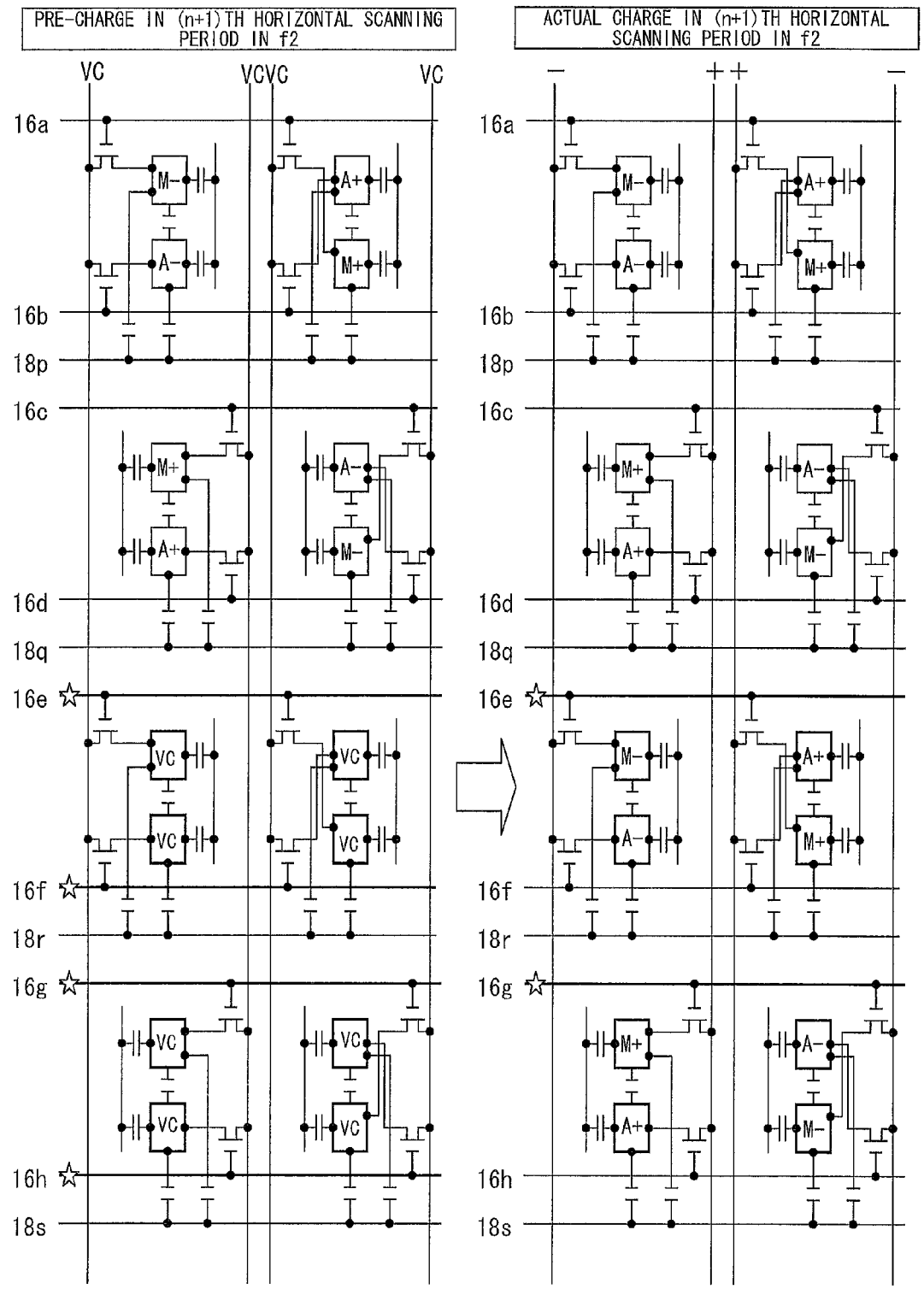
FIG. 27 is a view schematically describing a driving method in f2 ((n+1)th horizontal scanning period) in FIG. 23.

Further, as illustrated in FIGS. 22, 23 and 27, in the (n+1)th horizontal scanning period in f2, during a pre-charge period during which the scanning signal lines 16*e* and 16*g* are being selected simultaneously, out of four scanning signal lines (16*e*, 16*f*, 16*g* and 16*h*) that correspond to the row of pixels including the pixels 103 and 107 and the row of pixels including the pixels 104 and 108, scanning signal lines (16*f* and 16*h*) that are not being selected simultaneously are each turned ON and OFF. This causes the pixel electrodes 17*f* and 17E, each of which is connected via a transistor to the scanning signal line 16*f*, and the pixel electrodes 17*h* and 17G, each of which is connected via a transistor to the scanning signal line 16*h*, to be discharged.

Then, after the pre-charge period, data signals are written to the pixel electrodes 17*e* and 17F, each of which is connected via a transistor to the scanning signal line 16*e*, and to the pixel electrodes 17*g* and 17H, each of which is connected via a transistor to the scanning signal line 16*g*.

Also in Embodiment 2, since two pixel electrodes included in a pixel are each connected via a transistor to a data signal line (that is, pixel electrodes do not electrically float), it is possible to suppress image sticking in pixels etc. which has been a problem for a capacitively-coupled type pixel-division system.

Further, since a light subpixel and a dark subpixel are alternately arranged in the row direction and in the column direction (i.e., light and dark subpixels are arranged checkerwise) in each frame, it is possible to achieve a natural-looking display with little feeling of roughness. Furthermore, since a data signal supplied to a single data signal line has an identical polarity over two vertical periods, it is possible to reduce power consumption of a source driver as compared to a case where a polarity of a data signal is reversed for every one (1) horizontal scanning period. Note that, since polarity distribution of data signals to be written in each frame is dot-reversed, it is also possible to suppress flickers on a screen. Moreover, since a pre-charge period is included in each horizontal scanning period, it is possible to reduce variations in waveforms and values of charging rates resulting from a gray scale in an earlier frame (for example, in cases where a gray level 0 changes to a gray level 100 and a gray level 100 changes to a gray level 100 in a 256 gray scale display).

Figure 44:
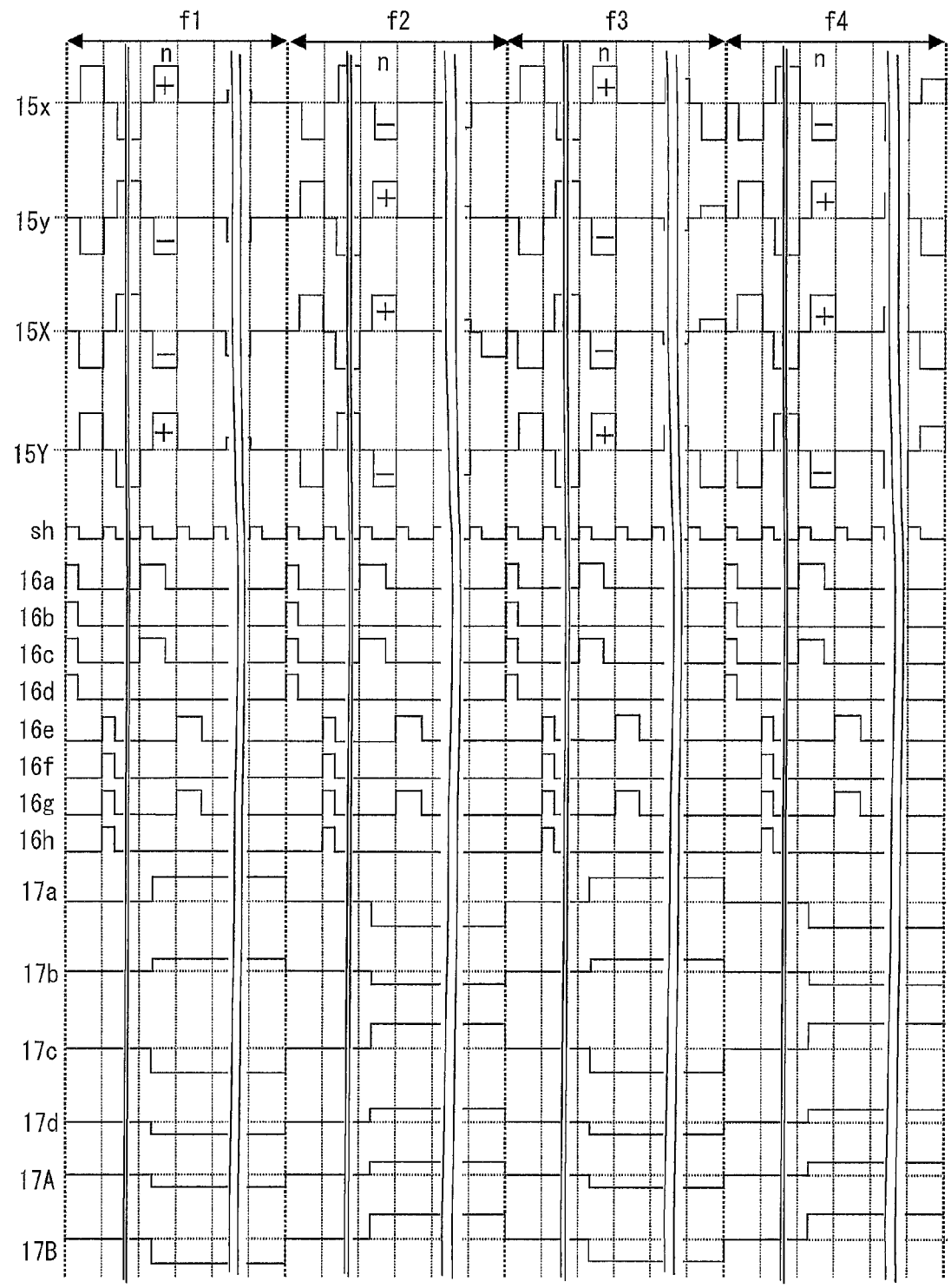
FIG. 44 is a timing chart illustrating another driving method for Embodiments 2 through 4.

According to the driving method shown in FIG. 23, during a pre-charge period during simultaneous selection, scanning signal lines, out of four scanning signal lines that correspond to the two rows of pixel areas, that are not being selected simultaneously are each turned ON and OFF. However, this does not imply any limitation. For example, as illustrated in FIG. 44, during a pre-charge period that comes before a start of simultaneous selection, four scanning signal lines that correspond to the two rows of pixel areas may be each turned ON and OFF in synchronization with one another. In this case, the four scanning signal lines can be each turned ON and OFF in synchronization with one another ½ to ⅕ vertical scanning period before the simultaneous selection. This causes a black display in the two rows of pixel areas for ½ to ⅕ vertical scanning period, and thus brings about an effect of so-called black insertion. Accordingly, it is possible to suppress a feeling that a moving image etc. leaves trails.

Figure 28:
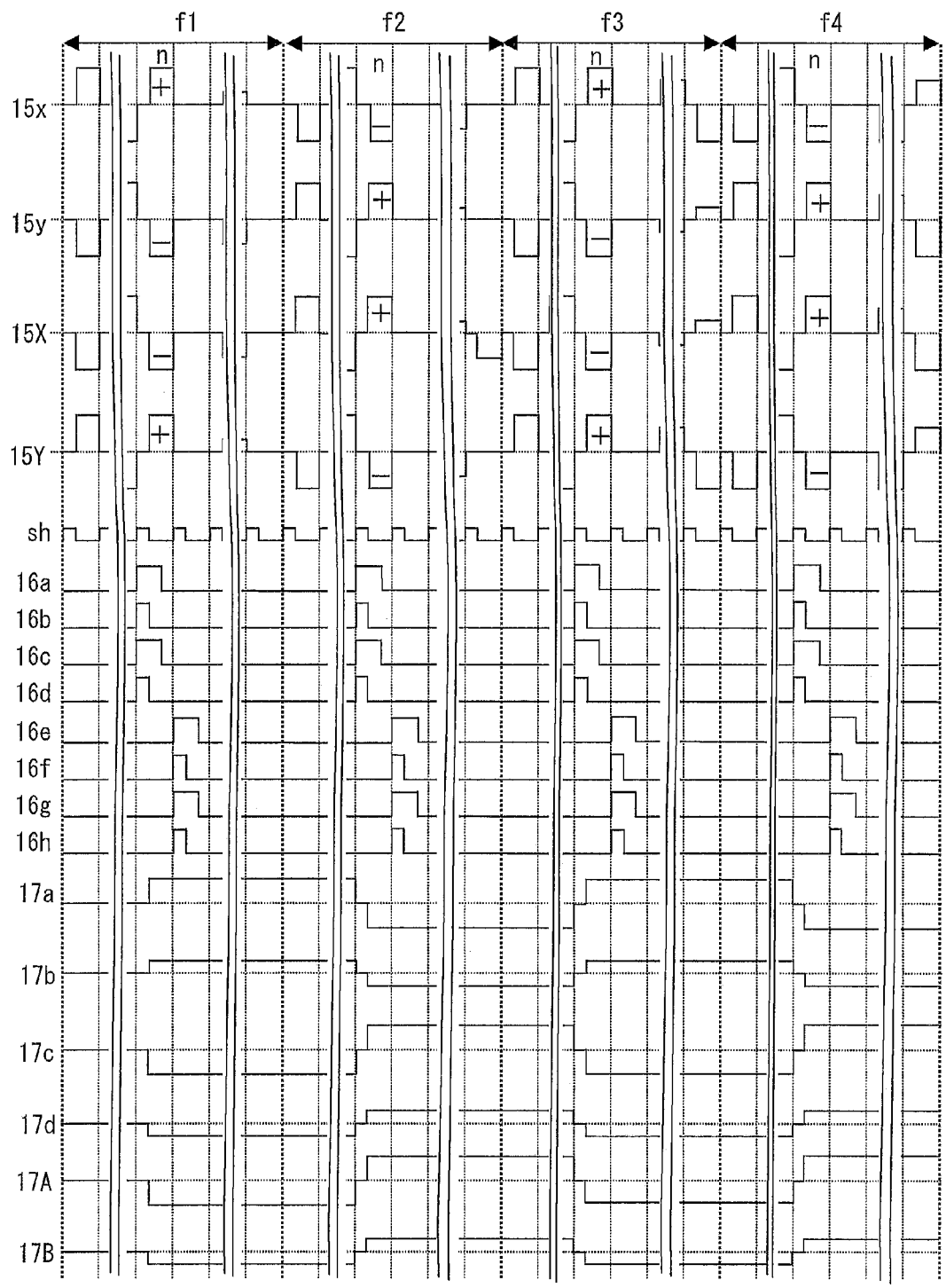
FIG. 28 is a timing chart illustrating a driving method (in a case of the liquid crystal panel shown in FIG. 19) of Embodiment 2.
Figure 45:
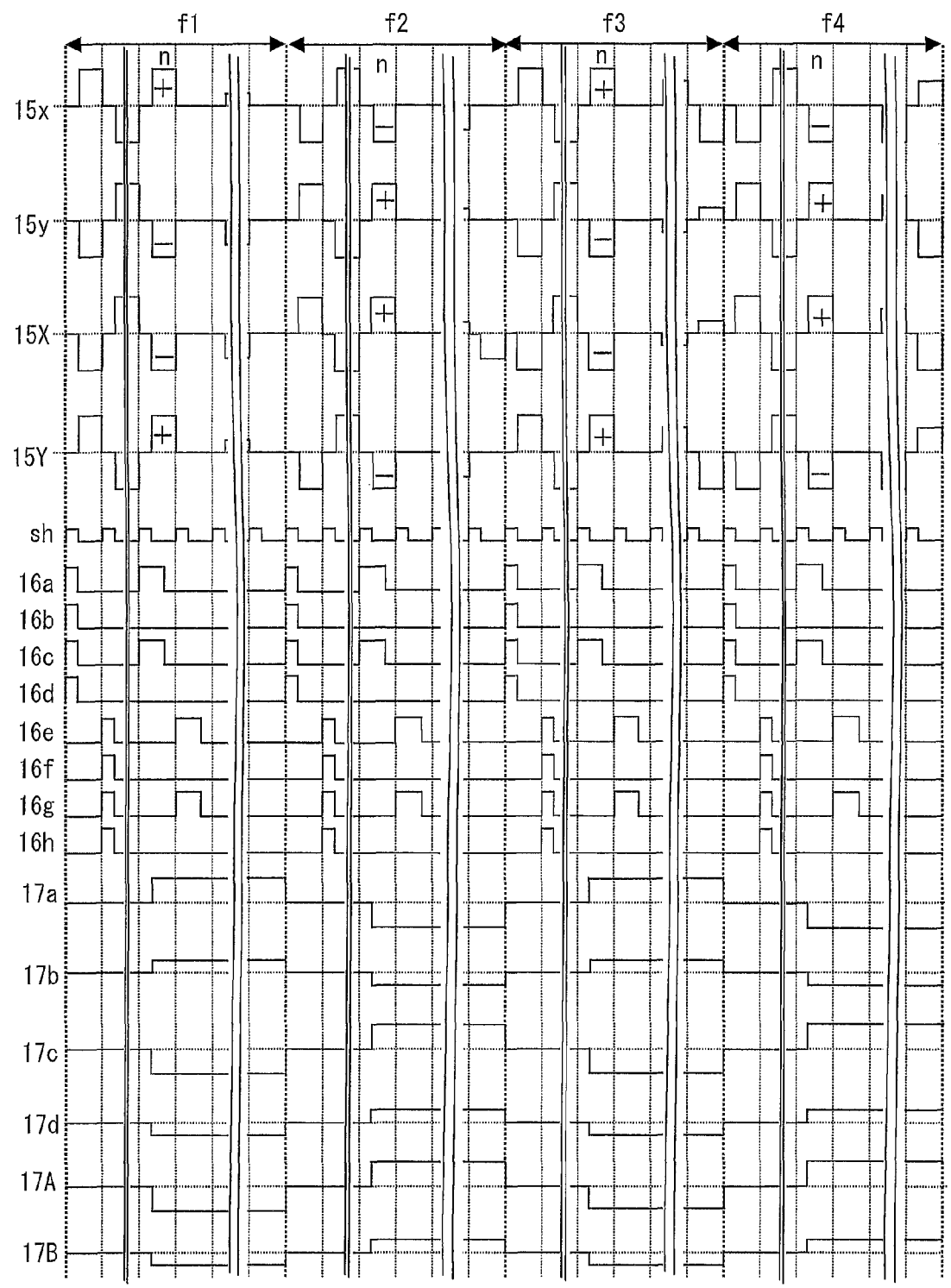
FIG. 45 is a timing chart illustrating a further driving method for Embodiments 2 through 4.
Figure 46:
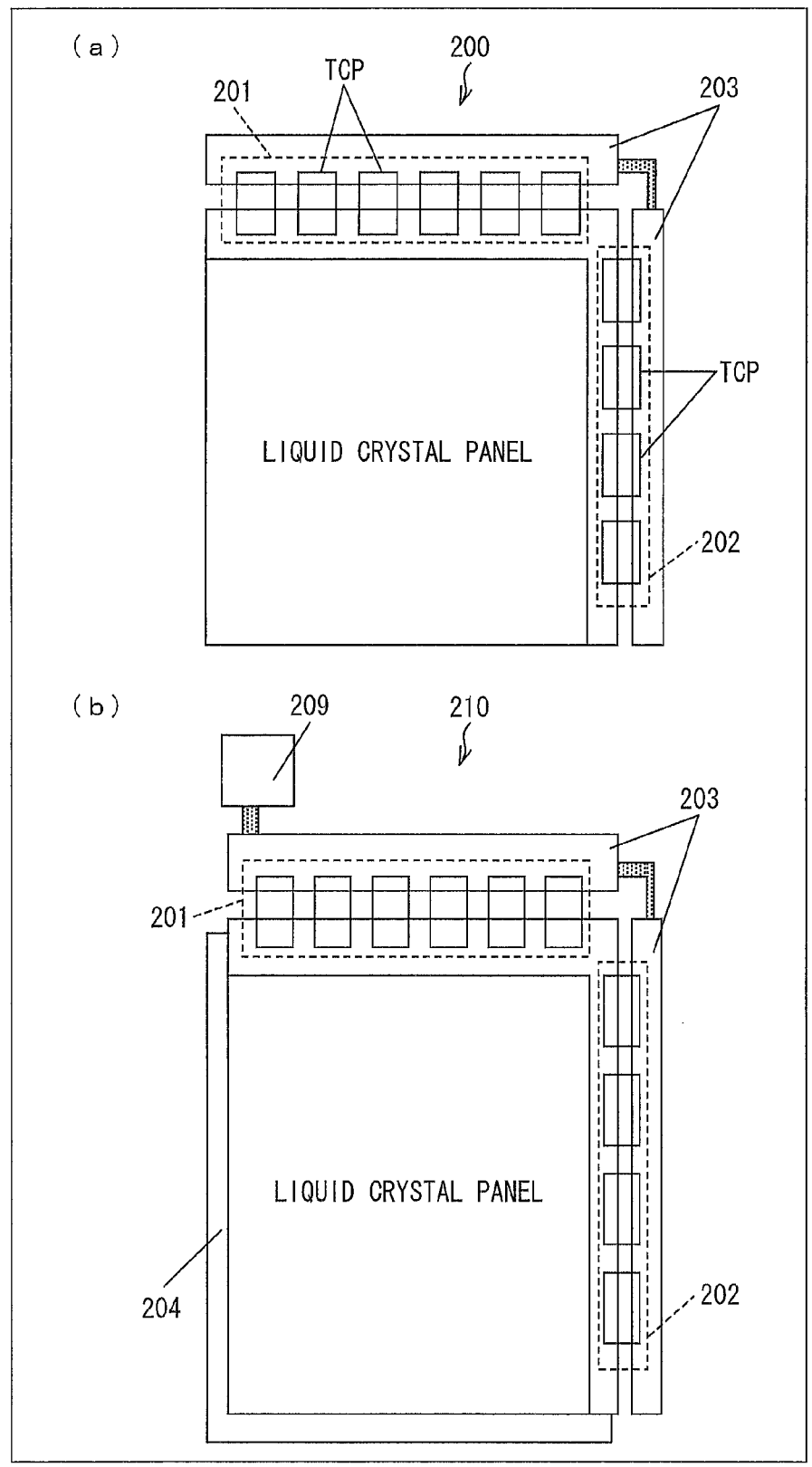
FIG. 46 (*a*) is a view schematically illustrating a configuration of a liquid crystal display unit of the present invention. (*b*) of FIG. 46 is a view schematically illustrating a configuration of a liquid crystal display device of the present invention.

It should be noted that, in the present embodiment, it is possible to drive the liquid crystal panel 5b shown in FIG. 19 in such a manner as shown in FIG. 28 or FIG. 45.

Embodiment 3

Figure 29:
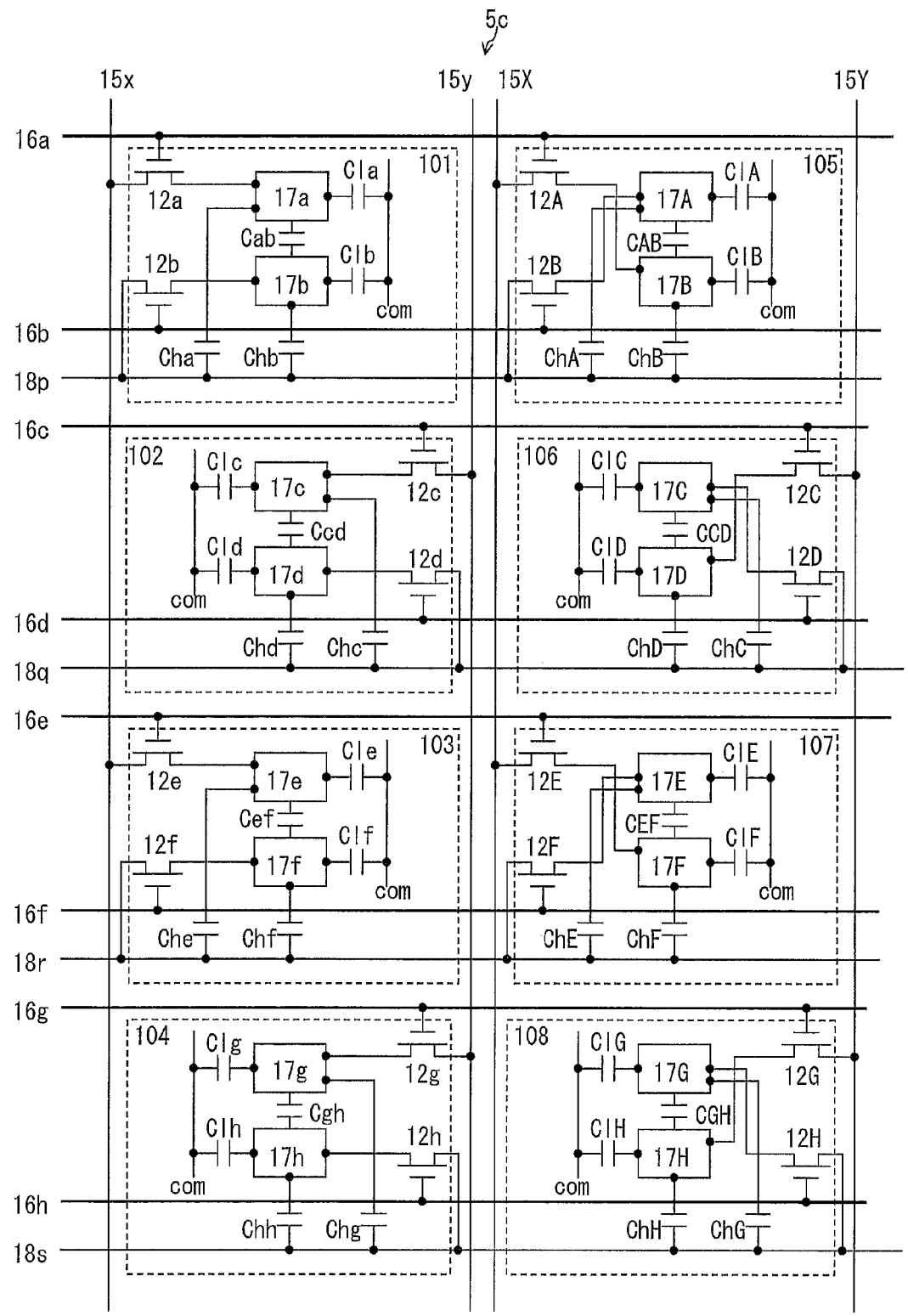
FIG. 29 is a circuit diagram illustrating a configuration of a liquid crystal panel in accordance with Embodiment 3.

FIG. 29 is a configuration of a liquid crystal panel 5c which is used in Embodiment 3. The liquid crystal panel 5c is the same as the liquid crystal panel 5a (refer to FIG. 1) except that the source electrode of each of the transistors 12b and 12B which are connected to the scanning signal line 16b is connected to the retention capacitor wire 18p, the source electrode of each of the transistors 12d and 12D which are connected to the scanning signal line 16d is connected to the retention capacitor wire 18q, the source electrode of each of the transistors 12f and 12F which are connected to the scanning signal line 16f is connected to a retention capacitor wire 18r, and the source electrode of the transistors 12h and 12H which are connected to the scanning signal line 16h is connected to a retention capacitor wire 18s.

Figure 30:
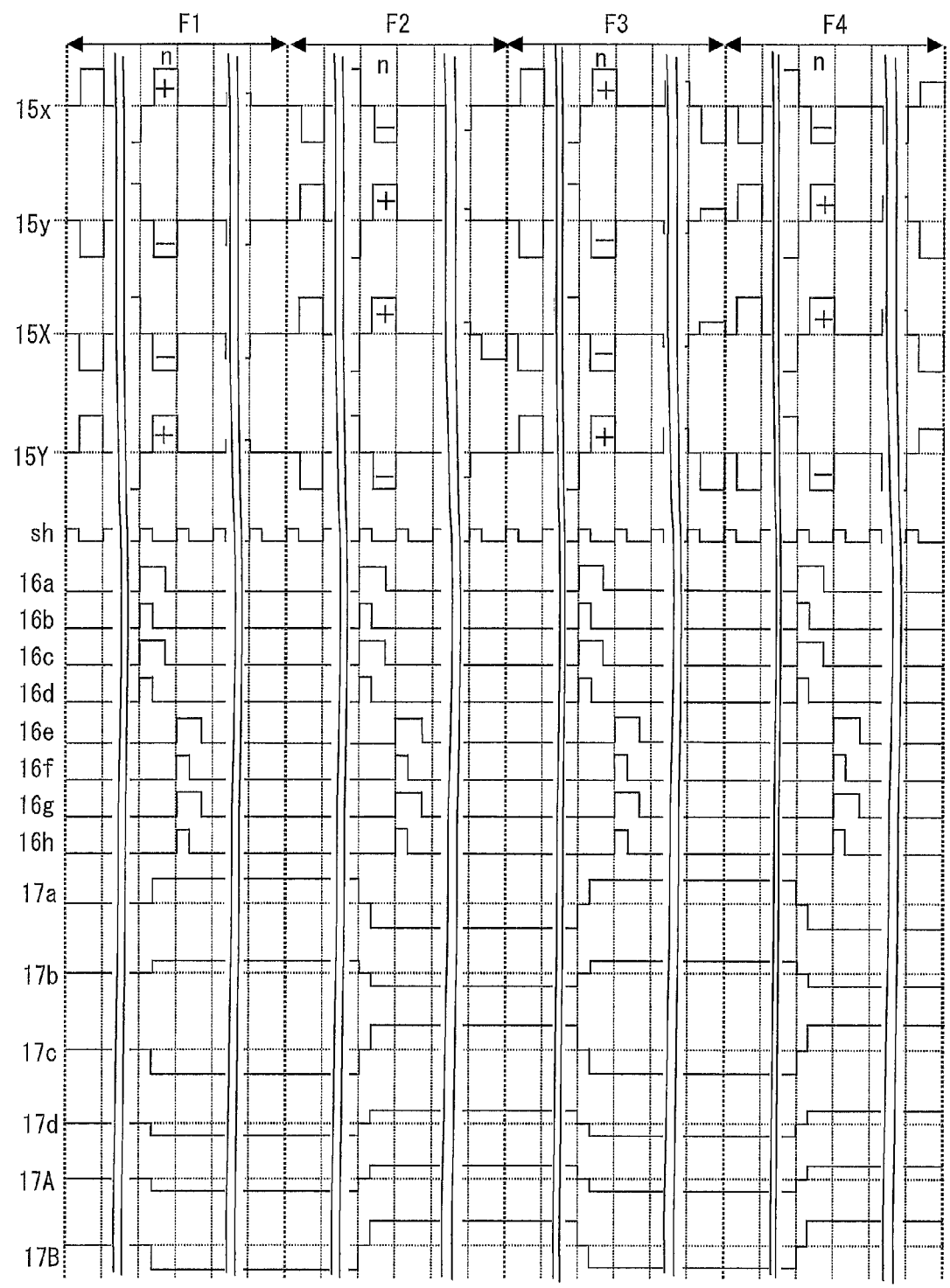
FIG. 30 is a timing chart illustrating a method of driving the liquid crystal panel shown in FIG. 29.

In Embodiment 3, the liquid crystal panel 5c is driven in such a manner as shown in FIG. 30. In FIG. 30, 15x, 15y, 15X and 15Y denote data signals supplied to the data signal lines 15x, 15y, 15X and 15Y, respectively, sh denotes a signal that defines a pre-charge period, 16a to 16h denote signals (active High) supplied to the scanning signal lines 16a to 16h, respectively, and 17a to 17d, and 17A and 17B denote electric potentials of the pixel electrodes 17a to 17d, and 17A and 17B, respectively. Further, FIGS. 31 and 32 each describe a driving in F1 (first frame) in FIG. 30, and FIGS. 33 and 34 each describe a driving in F2 (second frame) in FIG. 30.

According to the driving method shown in FIG. 30, in each frame, (i) one of two scanning signal lines that correspond to one of two adjacent rows of pixels and (ii) one of two scanning signal lines that correspond to the other one of the two adjacent rows of pixels are selected simultaneously (the same two scanning signal lines are selected in each frame) so that data signals are written simultaneously to the two rows of pixels. In this case, light and dark of each subpixel are not switched.

Further, (i) a data signal line connected via a transistor to each of pixel electrodes included in one of two pixels adjacent to each other in the column direction and (ii) a data signal line connected via a transistor to each of pixel electrodes included in the other one of the two pixels are supplied with data signals having respective opposite polarities.

For example, in F1, the data signal line 15x, which is connected via the respective transistors (12a and 12b) to the pixel electrodes (17a and 17b) included in the pixel 101, is supplied with a data signal having a positive polarity, and the data signal line 15y, which is connected via the respective transistors (12c and 12d) to the pixel electrodes (17c and 17d) included in the pixel 102 adjacent to the pixel 101 in the column direction, is supplied with a data signal having a negative polarity.

Further, (i) a data signal line connected via a transistor to each of pixel electrodes included in one of two pixels adjacent to each other in the row direction and (ii) a data signal line connected via a transistor to each of pixel electrodes included in the other one of the two pixels are supplied with data signals having respective opposite polarities.

For example, the data signal line 15x, which is connected via the respective transistors (12a and 12b) to the pixel electrodes (17a and 17b) included in the pixel 101, is supplied with a data signal having a positive polarity, and the data signal line 15X, which is connected via the respective transistors (12A and 12B) to the pixel electrodes (17A and 17B) included in the pixel 105 adjacent to the pixel 101 in the row direction, is supplied with a data signal having a negative polarity.

Further, a polarity of a data signal that is supplied to an identical data signal line is reversed for every one (1) frame. That is, a polarity of each pixel is reversed for every one (1) frame.

For example, in F1, the data signal lines 15x and 15Y are each supplied with a data signal having a positive polarity and the data signal lines 15y and 15X are each supplied with a data signal having a negative polarity, and, in F2, the data signal lines 15x and 15Y are each supplied with a data signal having a negative polarity and the data signal lines 15y and 15X are each supplied with a data signal having a positive polarity.

Further, each horizontal scanning period includes a pre-charge period during which a certain electric potential (here, a common electrode electric potential VC) is supplied to each data signal line. During a pre-charge period during simultaneous selection, scanning signal lines, out of four scanning signal lines that correspond to the two rows of pixel areas (to which data signals are to be written simultaneously), that are not being selected simultaneously are each turned ON and OFF.

Figure 31:
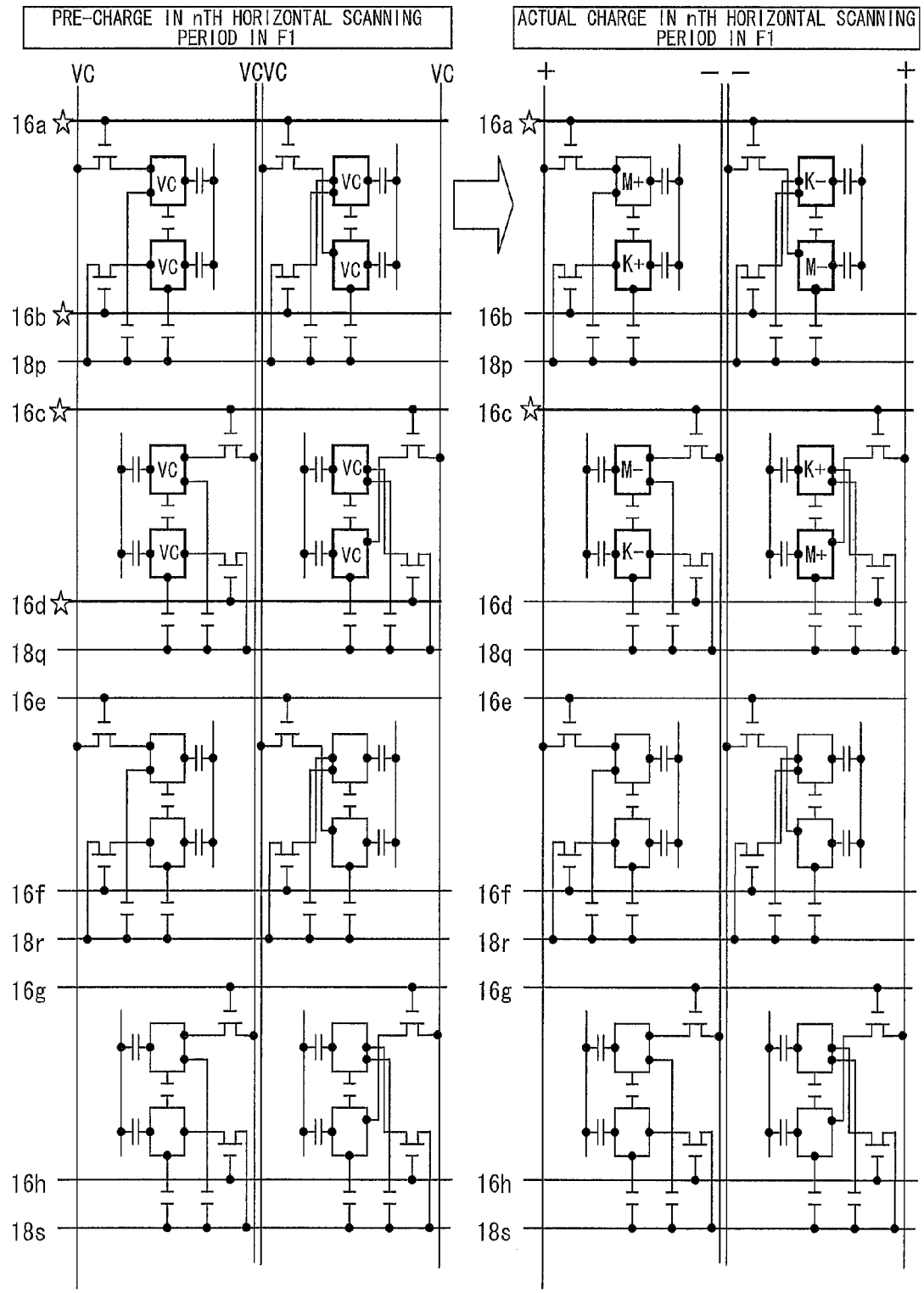
FIG. 31 is a view schematically describing a driving method in F1 (nth horizontal scanning period) for the liquid crystal panel shown in FIG. 29.

For example, as illustrated in FIGS. 29 to 31, in the nth horizontal scanning period in F1, during a pre-charge period during which the scanning signal lines 16a and 16c are being selected simultaneously, out of four scanning signal lines (16a, 16b, 16c and 16d) that correspond to the row of pixels including the pixels 101 and 105 and the row of pixels including the pixels 102 and 106, scanning signal lines (16b and 16d) that are not being selected simultaneously are each turned ON and OFF (i.e., caused to be active and thereafter caused to be inactive). This causes the pixel electrodes 17b and 17A, each of which is connected via a transistor to the scanning signal line 16b, and the pixel electrodes 17d and 17C, each of which is connected via a transistor to the scanning signal line 16d, to be connected to a retention capacitor wire, and thus to be discharged.

Then, after the pre-charge period, data signals are written to the pixel electrodes 17a and 17B, each of which is connected via a transistor to the scanning signal line 16a, and to the pixel electrodes 17c and 17D, each of which is connected via a transistor to the scanning signal line 16c.

As a result, (i) in the pixel 101, the subpixel including the pixel electrode 17a serves as a light subpixel having a positive polarity (M+) and the subpixel including the pixel electrode 17b serves as a dark subpixel having a positive polarity (K+), (ii) in the pixel 105, the subpixel including the pixel electrode 17A serves as a dark subpixel having a negative polarity (K−) and the subpixel including the pixel electrode 17B serves as a light subpixel having a negative polarity (M−), (iii) in the pixel 102, the subpixel including the pixel electrode 17c serves as a light subpixel having a negative polarity (M−) and the subpixel including the pixel electrode 17d serves as a dark subpixel having a negative polarity (K−) and (iv) in the pixel 106, the subpixel including the pixel electrode 17C serves as a dark subpixel having a positive polarity (K+) and the subpixel including the pixel electrode 17D serves as a light subpixel having a positive polarity (M+).

Figure 32:
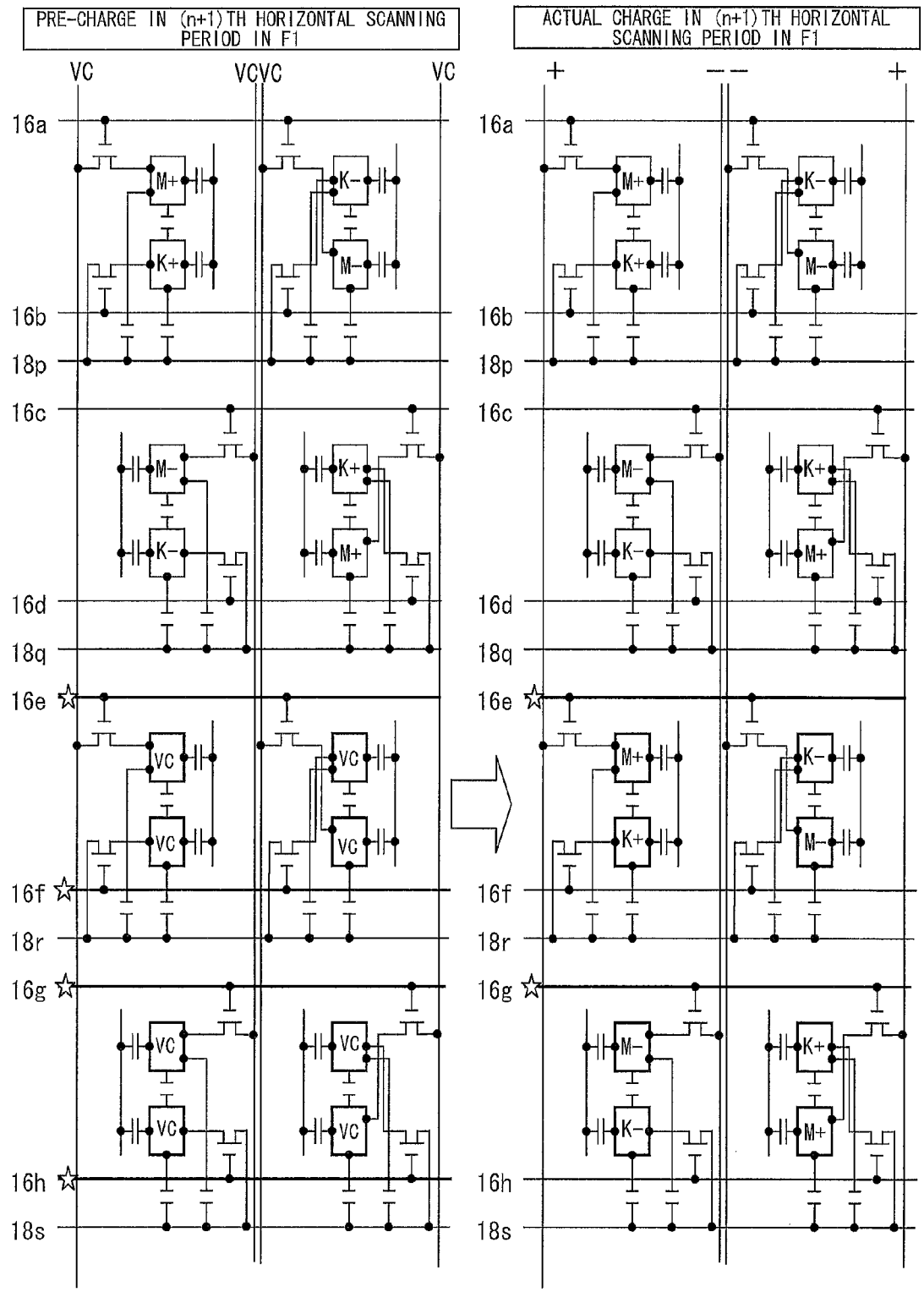
FIG. 32 is a view schematically describing a driving method in F1 ((n+1)th horizontal scanning period) for the liquid crystal panel shown in FIG. 29.

Further, as illustrated in FIGS. 29, 30 and 32, in the (n+1)th horizontal scanning period in F1, during a pre-charge period during which the scanning signal lines 16e and 16g are being selected simultaneously, out of four scanning signal lines (16e, 16f, 16g and 16h) that correspond to the row of pixels including the pixels 103 and 107 and the row of pixels including the pixels 104 and 108, scanning signal lines (16f and 16h) that are not being selected simultaneously are each turned ON and OFF. This causes the pixel electrodes 17f and 17E, each of which is connected via a transistor to the scanning signal line 16f, and the pixel electrodes 17h and 17G, each of which is connected via a transistor to the scanning signal line 16h, to be connected to a retention capacitor wire, and thus to be discharged.

Then, after the pre-charge period, data signals are written to the pixel electrodes 17e and 17F, each of which is connected via a transistor to the scanning signal line 16e, and to the pixel electrodes 17g and 17H, each of which is connected via a transistor to the scanning signal line 16g.

As a result, (i) in the pixel 103, the subpixel including the pixel electrode 17e serves as a light subpixel having a positive polarity (M+) and the subpixel including the pixel electrode 17f serves as a dark subpixel having a positive polarity (K+), (ii) in the pixel 107, the subpixel including the pixel electrode 17E serves as a dark subpixel having a negative polarity (K−) and the subpixel including the pixel electrode 17F serves as a light subpixel having a negative polarity (M−), (iii) in the pixel 104, the subpixel including the pixel electrode 17g serves as a light subpixel having a negative polarity (M−) and the subpixel including the pixel electrode 17h serves as a dark subpixel having a negative polarity (K−) and (iv) in the pixel 108, the subpixel including the pixel electrode 17G serves as a dark subpixel having a positive polarity (K+) and the subpixel including the pixel electrode 17H serves as a light subpixel having a positive polarity (M+).

Further, in F2, polarities of data signals to be supplied to the data signal lines are reversed, and the same scanning as in F1 is repeated.

Figure 33:
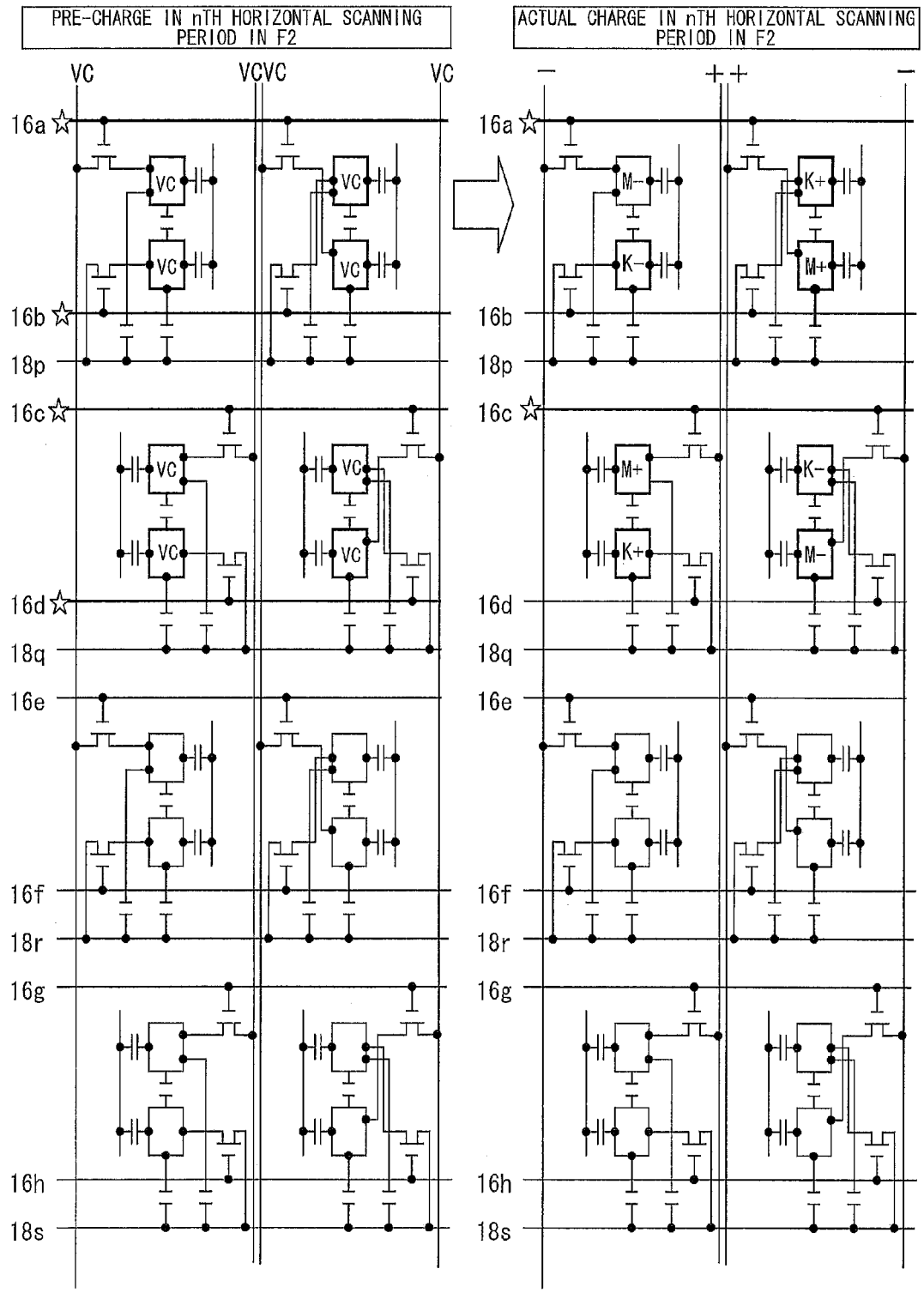
FIG. 33 is a view schematically describing a driving method in F2 (nth horizontal scanning period) for the liquid crystal panel shown in FIG. 29.

Specifically, as illustrated in FIGS. 29, 30 and 33, in the nth horizontal scanning period in F2, during a pre-charge period during which the scanning signal lines 16a and 16c are being selected simultaneously, out of four scanning signal lines (16a, 16b, 16c and 16d) that correspond to the row of pixels including the pixels 101 and 105 and the row of pixels including the pixels 102 and 106, scanning signal lines (16b and 16d) that are not being selected simultaneously are each turned ON and OFF (i.e., caused to be active and thereafter caused to be inactive). This causes the pixel electrodes 17b and 17A, each of which is connected via a transistor to the scanning signal line 16b, and the pixel electrodes 17d and 17C, each of which is connected via a transistor to the scanning signal line 16d, to be connected to a retention capacitor wire, and thus to be discharged.

Then, after the pre-charge period, data signals are written to the pixel electrodes 17a and 17B, each of which is connected via a transistor to the scanning signal line 16a, and to the pixel electrodes 17c and 17D, each of which is connected via a transistor to the scanning signal line 16c.

Figure 34:
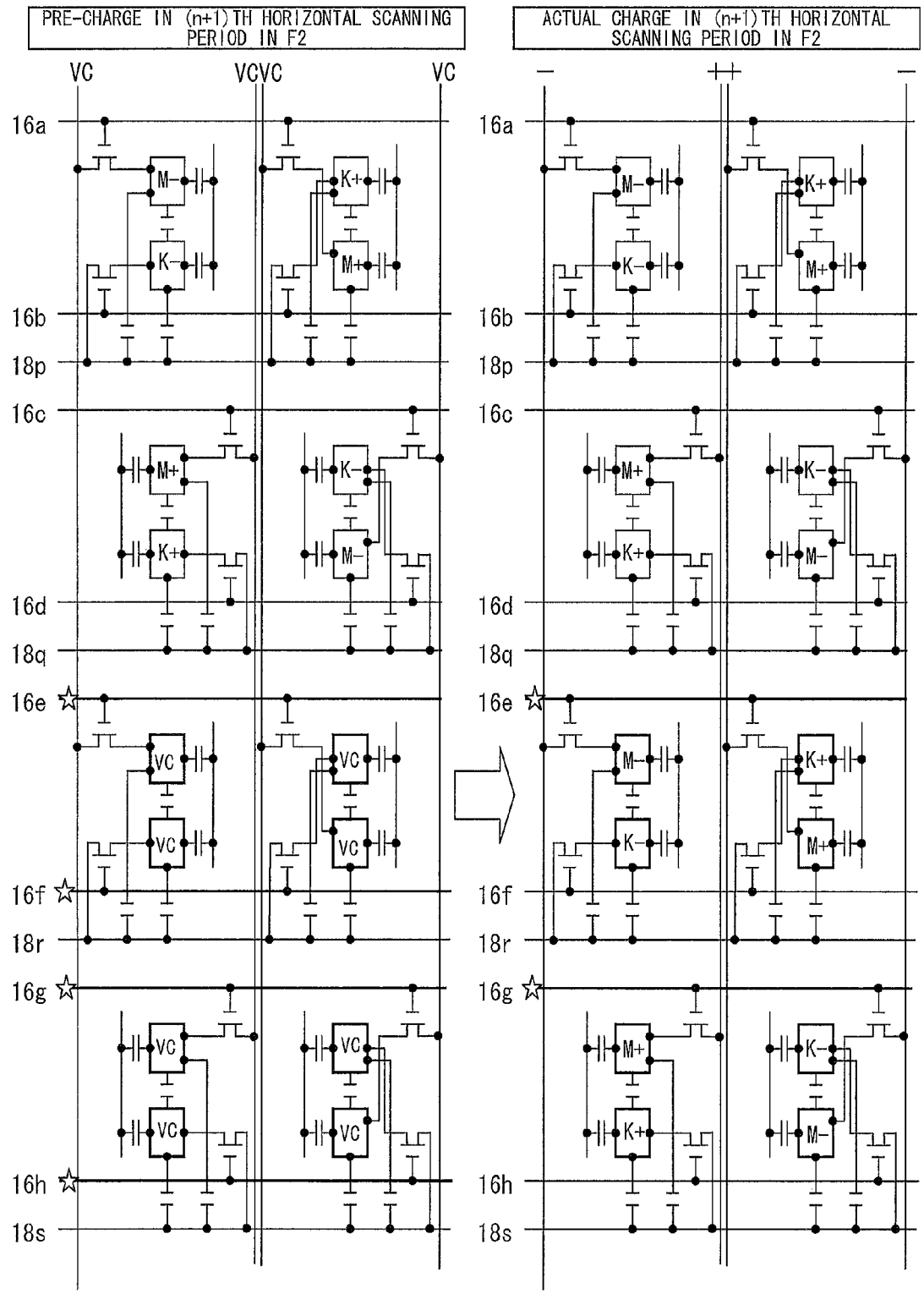
FIG. 34 is a view schematically describing a driving method in F2 ((n+1)th horizontal scanning period) for the liquid crystal panel shown in FIG. 29.

Further, as illustrated in FIGS. 29, 30 and 34, in the (n+1)th horizontal scanning period in F2, during a pre-charge period during which the scanning signal lines 16e and 16g are being selected simultaneously, out of four scanning signal lines (16e, 16f, 16g and 16h) that correspond to the row of pixels including the pixels 103 and 107 and the row of pixels including the pixels 104 and 108, scanning signal lines (16f and 16h) that are not being selected simultaneously are each turned ON and OFF. This causes the pixel electrodes 17f and 17E, each of which is connected via a transistor to the scanning signal line 16f, and the pixel electrodes 17h and 17G, each of which is connected via a transistor to the scanning signal line 16h, to be connected to a retention capacitor wire, and thus to be discharged.

Then, after the pre-charge period, data signals are written to the pixel electrodes 17e and 17F, each of which is connected via a transistor to the scanning signal line 16e, and to the pixel electrodes 17g and 17H, each of which is connected via a transistor to the scanning signal line 16g.

According to Embodiment 3, one of two pixel electrodes included in a pixel is connected via a transistor to a data signal line, and the other one of the two pixel electrodes is connected via a transistor to a retention capacitor wire (that is, pixel electrodes do not electrically float). Therefore, it is possible to suppress image sticking in pixels etc. which has been a problem for a capacitively-coupled type pixel-division system.

Further, since a light subpixel and a dark subpixel are alternately arranged in the row direction and in the column direction (i.e., light and dark subpixels are arranged checkerwise) in each frame, it is possible to achieve a natural-looking display with little feeling of roughness. Furthermore, since a data signal supplied to a single data signal line has an identical polarity over two vertical periods, it is possible to reduce power consumption of a source driver as compared to a case where a polarity of a data signal is reversed for every one (1) horizontal scanning period. Note that, since polarity distribution of data signals to be written in each frame is dot-reversed, it is also possible to suppress flickers on a screen. Moreover, since a pre-charge period is included in each horizontal scanning period, it is possible to reduce variations in waveforms and values of charging rates resulting from a gray scale in an earlier frame (for example, in cases where a gray level 0 changes to a gray level 100 and a gray level 100 changes to a gray level 100 in a 256 gray scale display).

Figure 35:
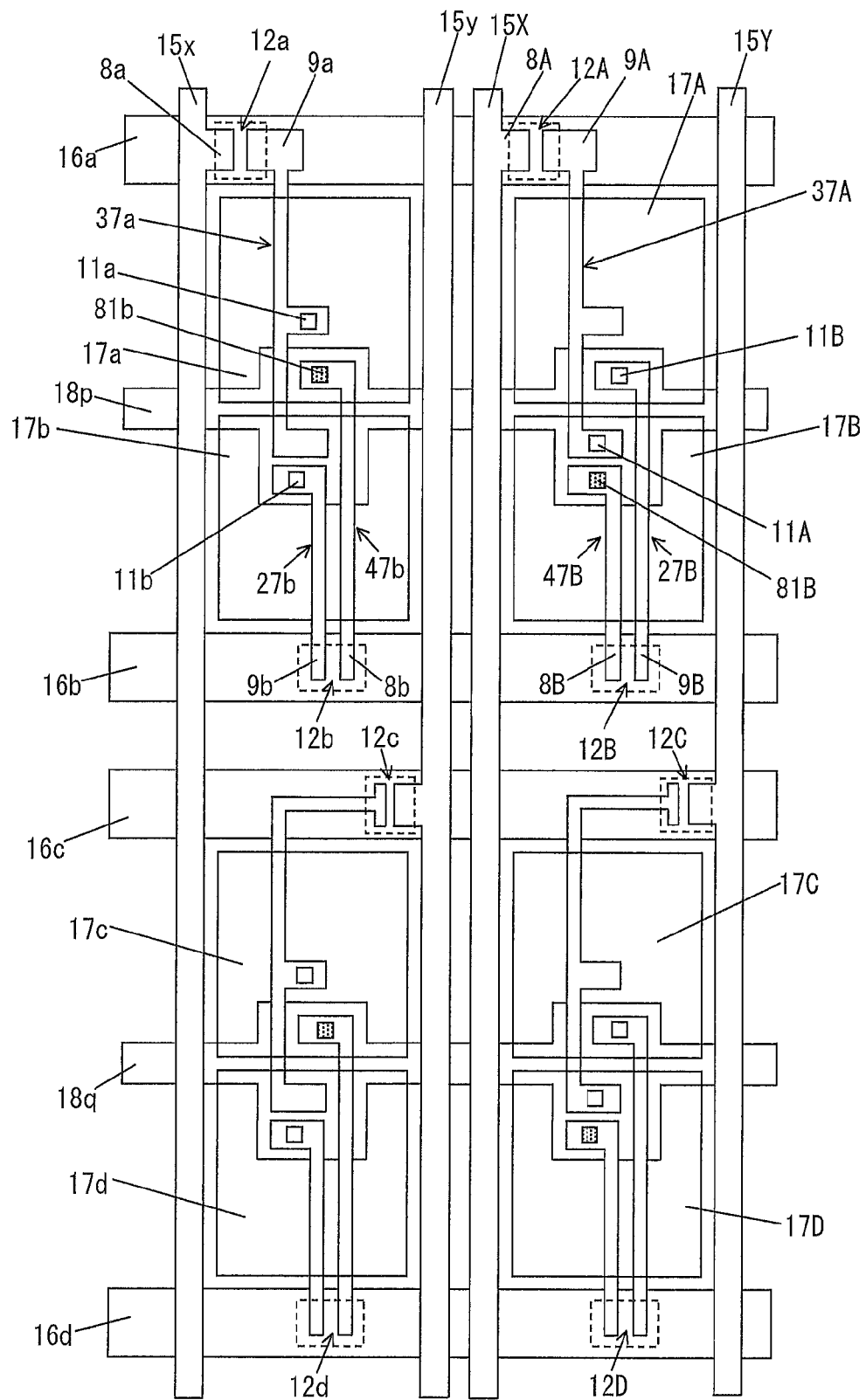
FIG. 35 is a plan view illustrating a configuration of the liquid crystal panel shown in FIG. 29.

FIG. 35 is a plan view illustrating a specific example of the liquid crystal panel 5c shown in FIG. 29. The configurations of each data signal line, each scanning signal line and each retention capacitor wire in FIG. 35 are the same as those in FIG. 13. The scanning signal line 16a serves as a gate electrode of each of the transistors 12a and 12A, the scanning signal line 16b serves as a gate electrode of each of the transistors 12b and 12B, the scanning signal line 16c serves as a gate electrode of each of the transistors 12c and 12C, and the scanning signal line 16d serves as a gate electrode of each of the transistors 12d and 12D. Further, a source electrode of the transistor 12a is connected to the data signal line 15x and a source electrode of the transistor 12c is connected to the data signal line 15y, and a source electrode of the transistor 12A is connected to the data signal line 15X and a source electrode of the transistor 12C is connected to the data signal line 15Y.

Further, the drain electrode 9a of the transistor 12a is connected to the capacitor electrode 37a, the capacitor electrode 37a and the pixel electrode 17a are connected to each other via the contact hole 11a, and the capacitor electrode 37a has a part that overlaps the retention capacitor wire 18p via a gate insulation film and a part that overlaps the pixel electrode 17b via an inter-layer insulation film. On the other hand, a source electrode 8b of the transistor 12b is connected to a relay electrode 47b, and the relay electrode 47b and the retention capacitor wire 18p are connected to each other via a contact hole 81b. Further, the drain electrode 9b of the transistor 12b is connected to a extraction electrode 27b, the extraction electrode 27b and the pixel electrode 17b are connected to each other via the contact hole 11b, and the extraction electrode 27b has a part that overlaps the retention capacitor wire 18p via a gate insulation film.

It should be noted here that a coupling capacitor Cab (refer to FIG. 29) is formed in a part where the capacitor electrode 37a and the pixel electrode 17b overlap each other, most of a retention capacitor Cha (refer to FIG. 29) is formed in a part where the capacitor electrode 37a and the retention capacitor wire 18p overlap each other, and most of a retention capacitor Chb (refer to FIG. 29) is formed in a part where the extraction electrode 27b and the retention capacitor wire 18p overlap each other.

Further, the drain electrode 9A of the transistor 12A is connected to the capacitor electrode 37A, the capacitor electrode 37A and the pixel electrode 17B are connected to each other via the contact hole 11A, and the capacitor electrode 37A has a part that overlaps the retention capacitor wire 18p via a gate insulation film and a part that overlaps the pixel electrode 17A via an inter-layer insulation film. On the other hand, a source electrode 8B of the transistor 12B is connected to a relay electrode 47B, and the relay electrode 47B and the retention capacitor wire 18p are connected to each other via a contact hole 81B. Further, the drain electrode 9B of the transistor 12B is connected to an extraction electrode 27B, the extraction electrode 27B and the pixel electrode 17A are connected to each other via the contact hole 11B, and the extraction electrode 27B has a part that overlaps the retention capacitor wire 18p via a gate insulation film.

It should be noted here that a coupling capacitor CAB (refer to FIG. 29) is formed in a part where the capacitor electrode 37A and the pixel electrode 17A overlap each other, most of a retention capacitor ChB (refer to FIG. 29) is formed in a part where the extraction electrode 37A and the retention capacitor wire 18p overlap each other, and most of a retention capacitor ChA (refer to FIG. 29) is formed in a part where the extraction electrode 27B and the retention capacitor wire 18p overlap each other.

It should be noted that the liquid crystal panel 5c shown in FIG. 29 can be driven in such a manner as shown in FIG. 44. That is, during a pre-charge period that comes before a start of simultaneous selection, four scanning signal lines that correspond to the two rows of pixel areas (to which data signals are to be written simultaneously) are each turned ON and OFF in synchronization with one another. In this case, the four scanning signal lines can be each turned ON and OFF in synchronization with one another ½ to ⅕ vertical scanning period before the simultaneous selection. This causes a black display in the two rows of pixel areas for ½ to ⅕ vertical scanning period, and thus brings about an effect of so-called black insertion. Accordingly, it is possible to suppress a feeling that a moving image etc. leaves trails.

Figure 36:
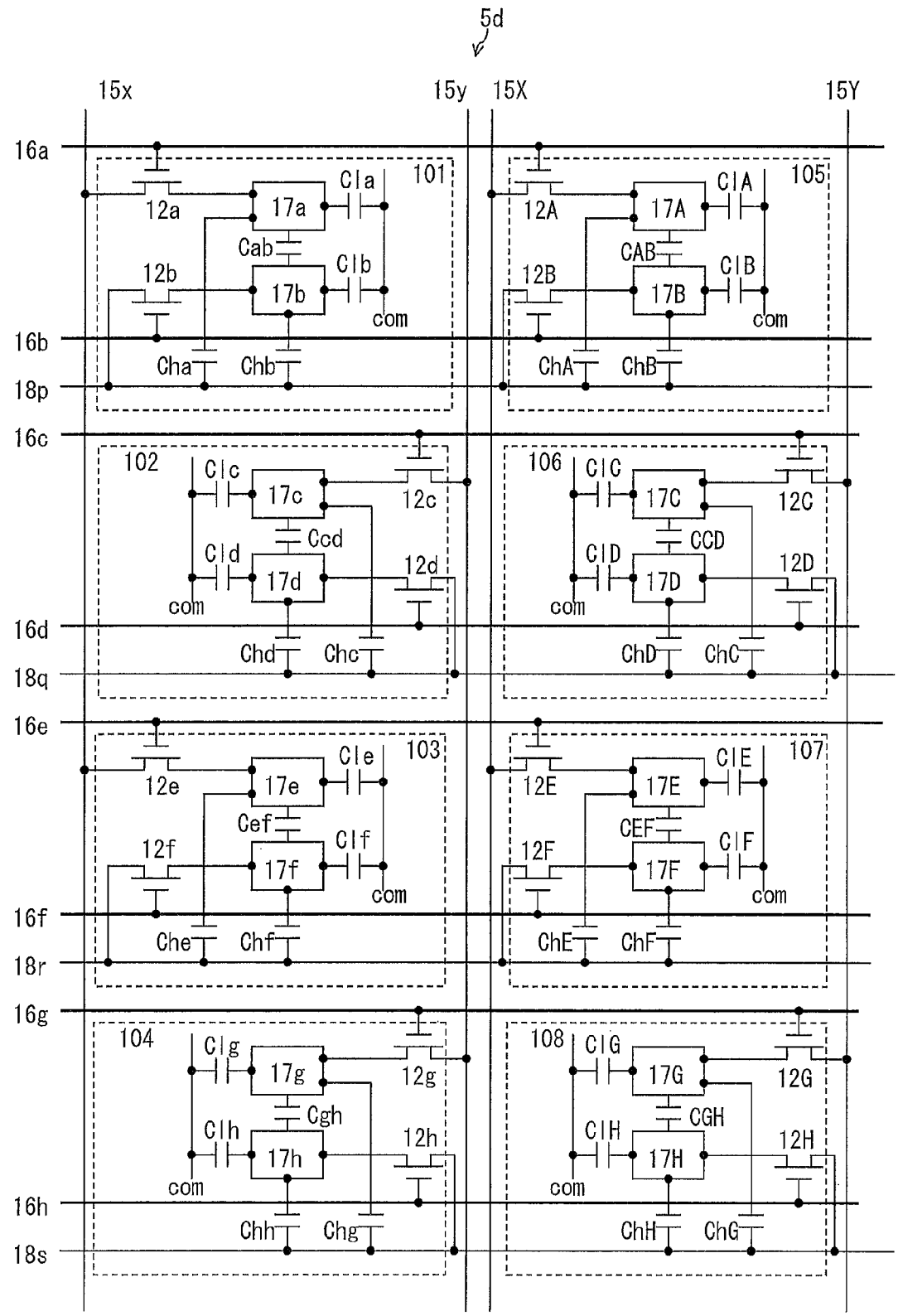
FIG. 36 is a circuit diagram illustrating another configuration of a liquid crystal panel in accordance with Embodiment 3.

Further, according to Embodiment 3, a liquid crystal panel 5d shown in FIG. 36 can be driven in such a manner as shown in FIG. 28 or FIG. 45. Note that the liquid crystal panel 5d is the same as the liquid crystal panel 5b (refer to FIG. 19) except that the source electrode of each of the transistors 12b and 12B which are connected to the scanning signal line 16b is connected to the retention capacitor wire 18p, the source electrode of each of the transistors 12d and 12D which are connected to the scanning signal line 16d is connected to the retention capacitor wire 18q, the source electrode of each of the transistors 12f and 12F which are connected to the scanning signal line 16f is connected to the retention capacitor wire 18r, and the source electrode of each of the transistors 12h and 12H which are connected to the scanning signal line 16h is connected to the retention capacitor wire 18s.

Embodiment 4

Figure 37:
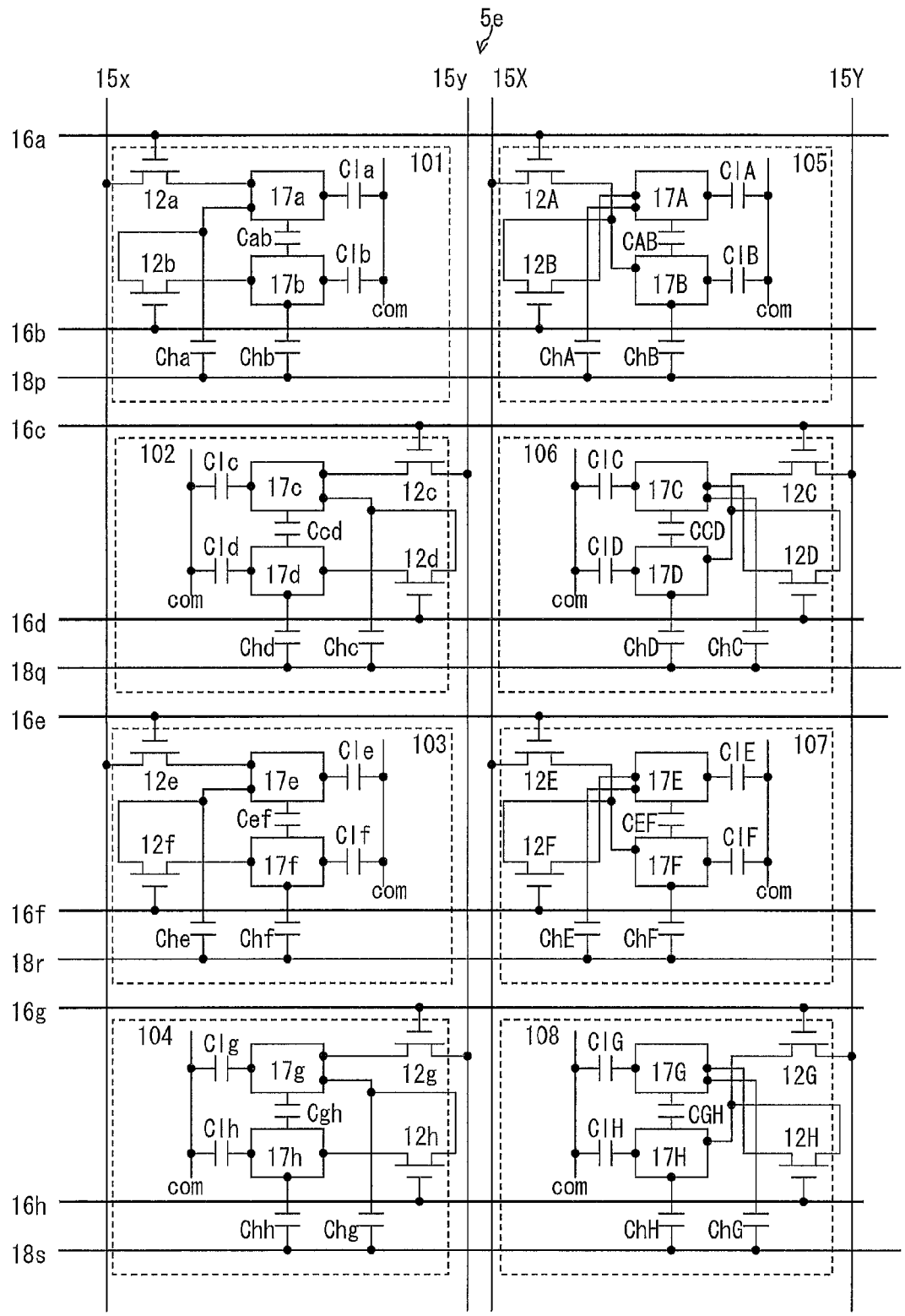
FIG. 37 is a circuit diagram illustrating a configuration of a liquid crystal panel in accordance with Embodiment 4.

FIG. 37 is a configuration of a liquid crystal panel 5e which is used in Embodiment 4. The liquid crystal panel 5e is the same as the liquid crystal panel 5a (refer to FIG. 1) except that the source electrode of the transistor 12b which is connected to the scanning signal line 16b is connected to the pixel electrode 17a, the source electrode of the transistor 12B which is connected to the scanning signal line 16b is connected to the pixel electrode 17B, the source electrode of the transistor 12d which is connected to the scanning signal line 16d is connected to the pixel electrode 17c, the source electrode of the transistor 12D which is connected to the scanning signal line 16d is connected to the pixel electrode 17D, the source electrode of the transistor 12f which is connected to the scanning signal line 16f is connected to the pixel electrode 17e, the source electrode of the transistor 12F which is connected to the scanning signal line 16f is connected to the pixel electrode 17F, the source electrode of the transistor 12h which is connected to the scanning signal line 16h is connected to the pixel electrode 17g, and the source electrode of the transistor 12H which is connected to the scanning signal line 16h is connected to the pixel electrode 17H.

Figure 38:
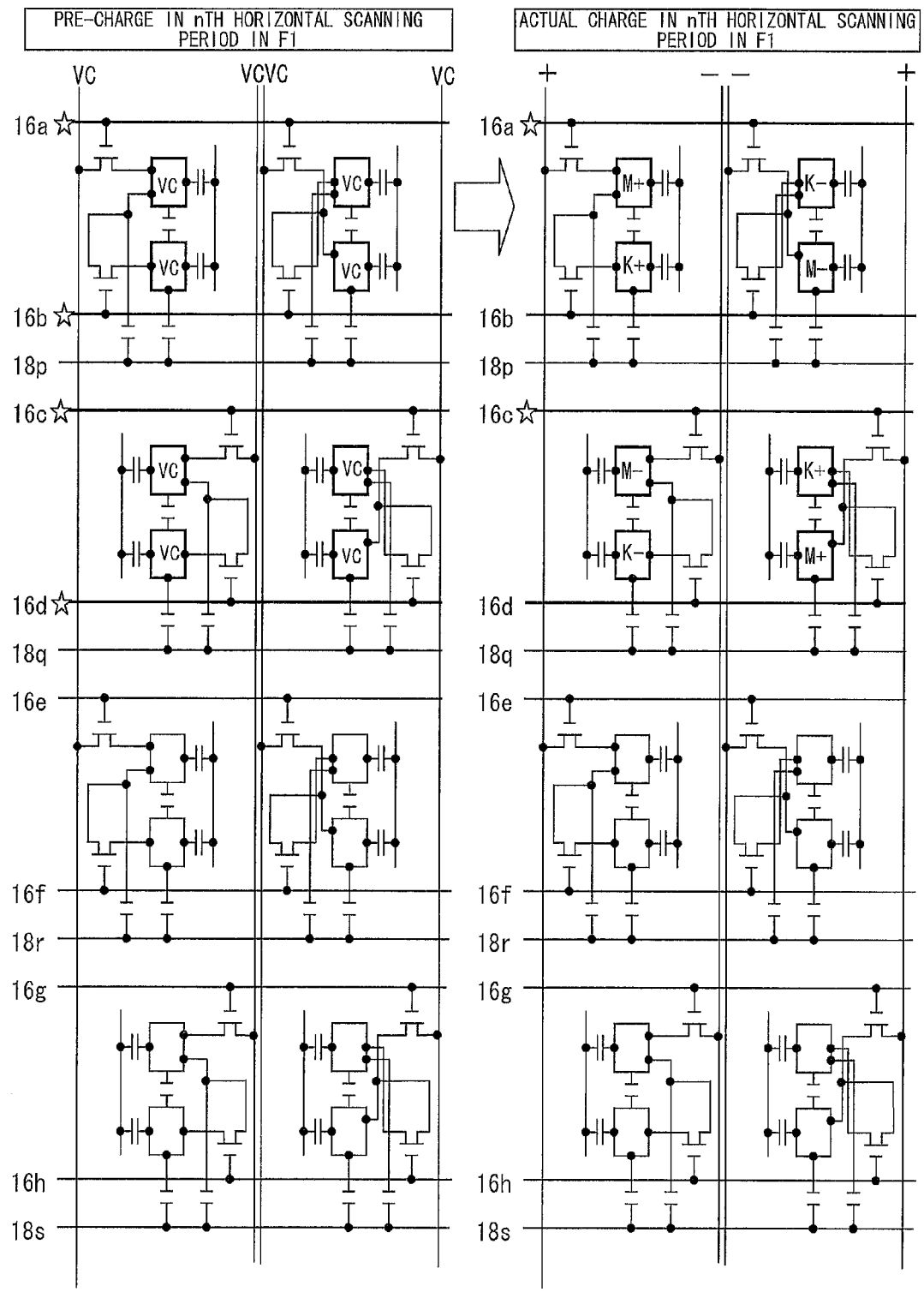
FIG. 38 is a view schematically describing a driving method in F1 (nth horizontal scanning period) for the liquid crystal panel shown in FIG. 37.
Figure 39:
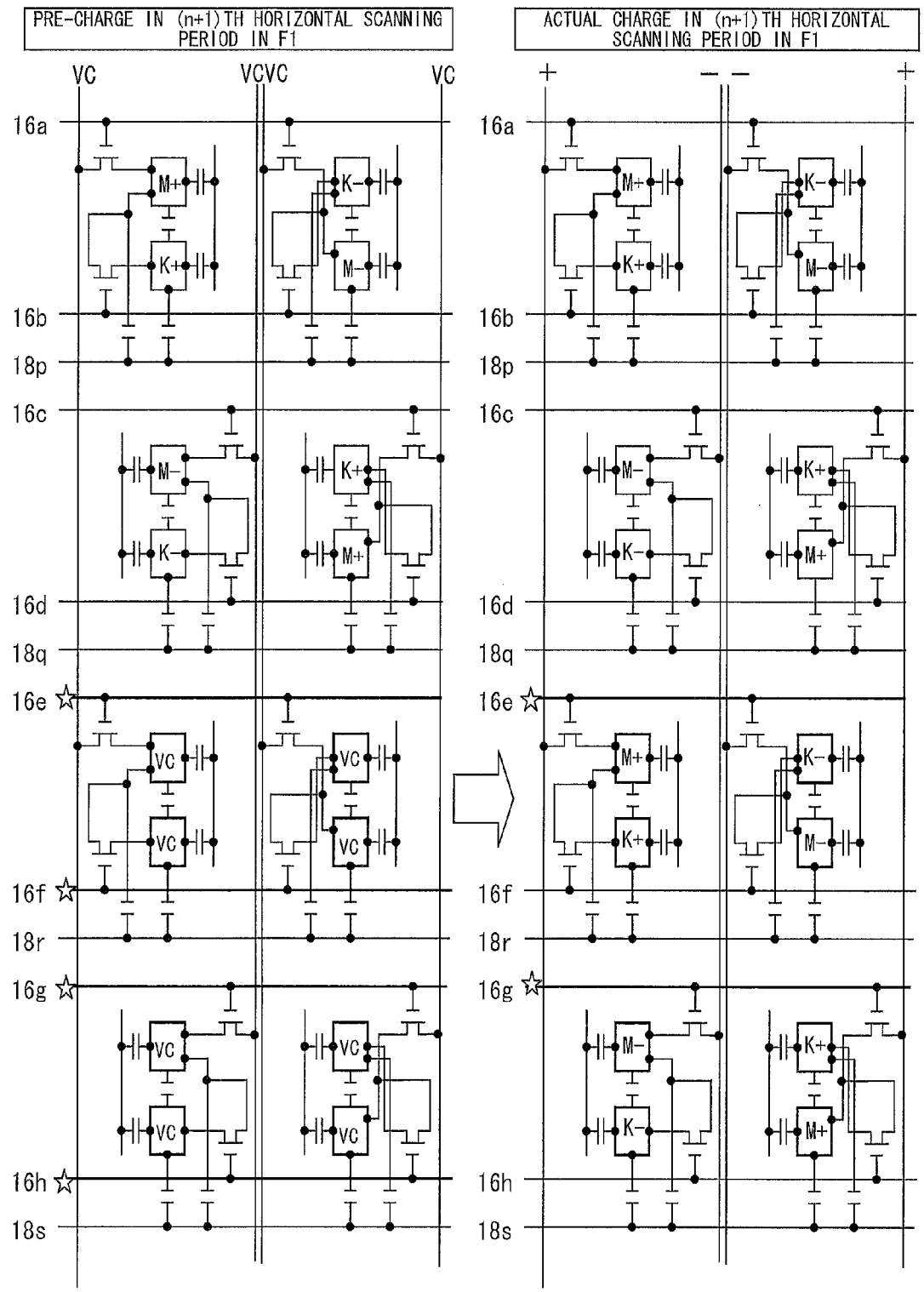
FIG. 39 is a view schematically describing a driving method in F1 ((n+1)th horizontal scanning period) for the liquid crystal panel shown in FIG. 37.

According to Embodiment 4, the liquid crystal panel 5e is driven in such a manner as shown in FIG. 30. FIGS. 38 and 39 each describe a driving in F1 (first frame) in FIG. 30, and FIGS. 40 and 41 each describe a driving in F2 (second frame) in FIG. 30.

For example, as illustrated in FIGS. 30, 37 and 38, in the nth horizontal scanning period in F1, during a pre-charge period during which the scanning signal lines 16a and 16c are being selected simultaneously, out of four scanning signal lines (16a, 16b, 16c and 16d) that correspond to the row of pixels including the pixels 101 and 105 and the row of pixels including the pixels 102 and 106, scanning signal lines (16b and 16d) that are not being selected simultaneously are each turned ON and OFF (i.e., caused to be active and thereafter caused to be inactive). This causes the pixel electrode 17b which is connected via the transistor 12b to the scanning signal line 16b to be connected to the pixel electrode 17a, the pixel electrode 17A which is connected via the transistor 12B to the scanning signal line 16b to be connected to the pixel electrode 17B, the pixel electrode 17d which is connected via the transistor 12d to the scanning signal line 16d to be connected to the pixel electrode 17c, the pixel electrode 17C which is connected via the transistor 12D to the scanning signal line 16d to be connected to the pixel electrode 17D, and thus the pixel electrodes 17b, 17A, 17d and 17C to be discharged.

Then, after the pre-charge period, data signals are written to the pixel electrodes 17a and 17B, each of which is connected via a transistor to the scanning signal line 16a, and to the pixel electrodes 17c and 17D, each of which is connected via a transistor to the scanning signal line 16c.

As a result, (i) in the pixel 101, the subpixel including the pixel electrode 17a serves as a light subpixel having a positive polarity (M+) and the subpixel including the pixel electrode 17b serves as a dark subpixel having a positive polarity (K+), (ii) in the pixel 105, the subpixel including the pixel electrode 17A serves as a dark subpixel having a negative polarity (K−) and the subpixel including the pixel electrode 17B serves as a light subpixel having a negative polarity (M−), (iii) in the pixel 102, the subpixel including the pixel electrode 17c serves as a light subpixel having a negative polarity (M−) and the subpixel including the pixel electrode 17d serves as a dark subpixel having a negative polarity (K−) and (iv) in the pixel 106, the subpixel including the pixel electrode 17C serves as a dark subpixel having a positive polarity (K+) and the subpixel including the pixel electrode 17D serves as a light subpixel having a positive polarity (M+).

Further, as illustrated in FIGS. 30, 37 and 39, in the (n+1)th horizontal scanning period in F1, during a pre-charge period during which the scanning signal lines 16e and 16g are being selected simultaneously, out of four scanning signal lines (16e, 16f, 16g and 16h) that correspond to the row of pixels including the pixels 103 and 107 and the row of pixels including the pixels 104 and 108, scanning signal lines (16f and 16h) that are not being selected simultaneously are each turned ON and OFF. This causes the pixel electrode 17f which is connected via the transistor 12f to the scanning signal line 16f to be connected to the pixel electrode 17e, the pixel electrode 17E which is connected via the transistor 12F to the scanning signal line 16f to be connected to the pixel electrode 17F, the pixel electrode 17h which is connected via the transistor 12h to the scanning signal line 16h to be connected to the pixel electrode 17g, the pixel electrode 17G which is connected via the transistor 12H to the scanning signal line 16h to be connected to the pixel electrode 17H, and thus the pixel electrodes 17f, 17E, 17h and 17G to be discharged.

Then, after the pre-charge period, data signals are written to the pixel electrodes 17e and 17F, each of which is connected via a transistor to the scanning signal line 16e, and to the pixel electrodes 17g and 17H, each of which is connected via a transistor to the scanning signal line 16g.

As a result, (i) in the pixel 103, the subpixel including the pixel electrode 17e serves as a light subpixel having a positive polarity (M+) and the subpixel including the pixel electrode 17f serves as a dark subpixel having a positive polarity (K+), (ii) in the pixel 107, the subpixel including the pixel electrode 17E serves as a dark subpixel having a negative polarity (K−) and the subpixel including the pixel electrode 17F serves as a light subpixel having a negative polarity (M−), (iii) in the pixel 104, the subpixel including the pixel electrode 17g serves as a light subpixel having a negative polarity (M−) and the subpixel including the pixel electrode 17h serves as a dark subpixel having a negative polarity (K−) and (iv) in the pixel 108, the subpixel including the pixel electrode 17G serves as a dark subpixel having a positive polarity (K+) and the subpixel including the pixel electrode 17H serves as a light subpixel having a positive polarity (M+).

Further, in F2, polarities of data signals to be supplied to the data signal lines are reversed, and the same scanning as in F1 is repeated.

Figure 40:
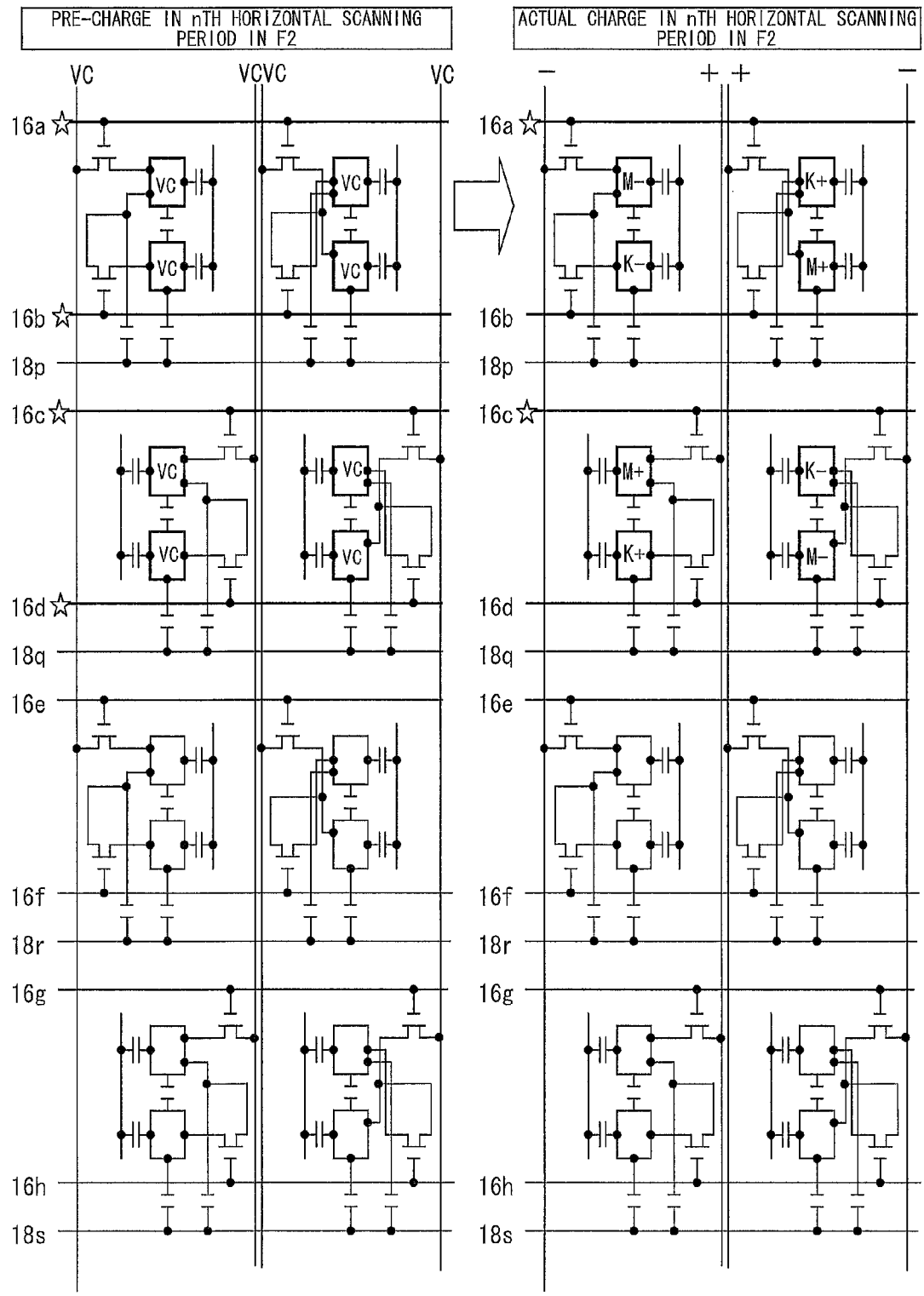
FIG. 40 is a view schematically describing a driving method in F2 (nth horizontal scanning period) for the liquid crystal panel shown in FIG. 37.

Specifically, as illustrated in FIGS. 30, 37 and 40, in the nth horizontal scanning period in F2, during a pre-charge period during which the scanning signal lines 16a and 16c are being selected simultaneously, out of four scanning signal lines (16a, 16b, 16c and 16d) that correspond to the row of pixels including the pixels 101 and 105 and the row of pixels including the pixels 102 and 106, scanning signal lines (16b and 16d) that are not being selected simultaneously are each turned ON and OFF (i.e., caused to be active and thereafter caused to be inactive). This causes the pixel electrode 17b which is connected via the transistor 12b to the scanning signal line 16b to be connected to the pixel electrode 17a, the pixel electrode 17A which is connected via the transistor 12B to the scanning signal line 16b to be connected to the pixel electrode 17B, the pixel electrode 17d which is connected via the transistor 12d to the scanning signal line 16d to be connected to the pixel electrode 17c, the pixel electrode 17C which is connected via the transistor 12D to the scanning signal line 16d to be connected to the pixel electrode 17D, and thus the pixel electrodes 17b, 17A, 17d and 17C to be discharged.

Then, after the pre-charge period, data signals are written to the pixel electrodes 17a and 17B, each of which is connected via a transistor to the scanning signal line 16a, and to the pixel electrodes 17c and 17D, each of which is connected via a transistor to the scanning signal line 16c.

Figure 41:
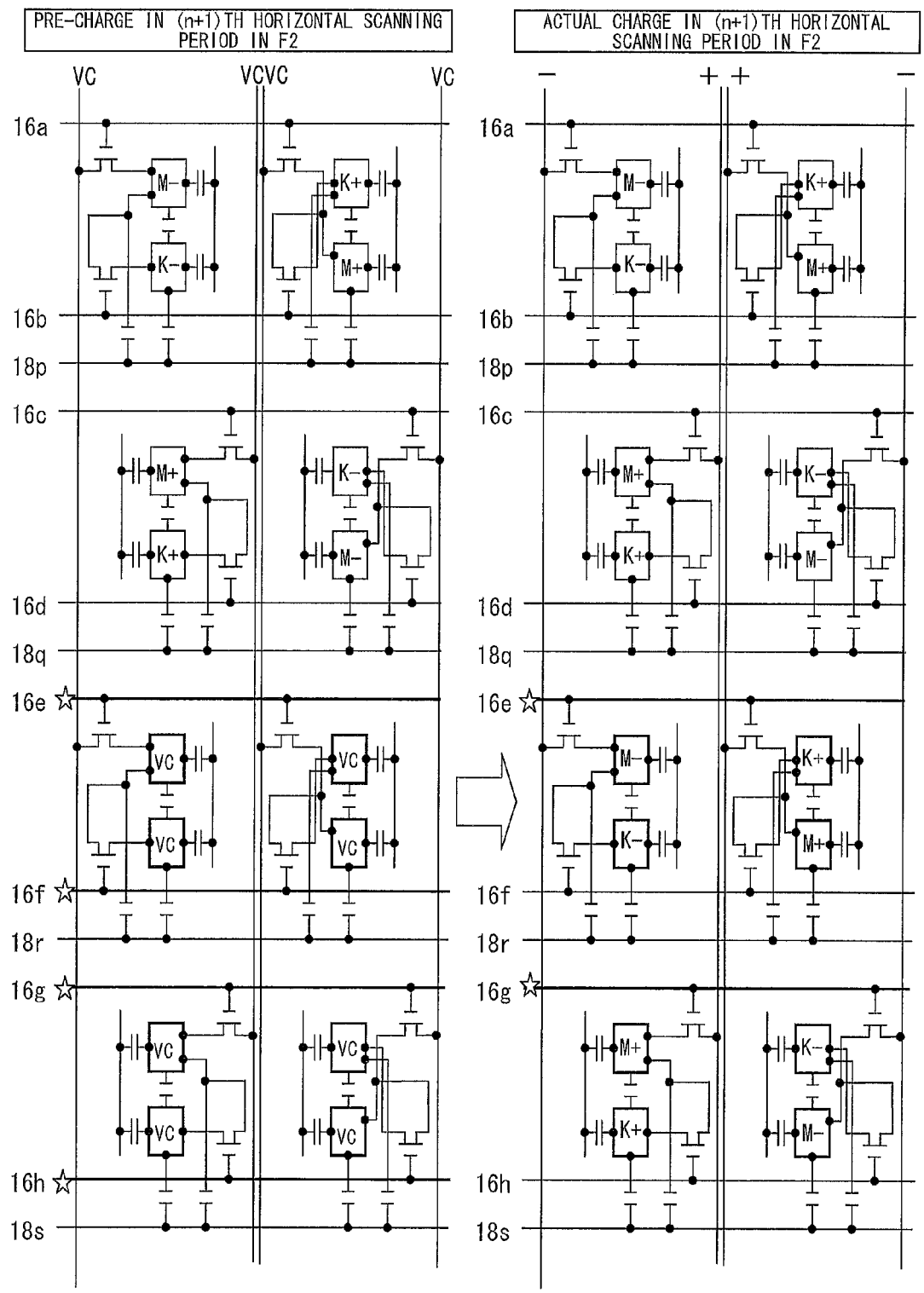
FIG. 41 is a view schematically describing a driving method in F2 ((n+1)th horizontal scanning period) for the liquid crystal panel shown in FIG. 37.

Further, as illustrated in FIGS. 30, 37 and 41, in the (n+1)th horizontal scanning period in F2, during a pre-charge period during which the scanning signal lines 16e and 16g are being selected simultaneously, out of four scanning signal lines (16e, 16f, 16g and 16h) that correspond to the row of pixels including the pixels 103 and 107 and the row of pixels including the pixels 104 and 108, scanning signal lines (16f and 16h) that are not being selected simultaneously are each turned ON and OFF. This causes the pixel electrode 17f which is connected via the transistor 12f to the scanning signal line 16f to be connected to the pixel electrode 17e, the pixel electrode 17E which is connected via the transistor 12F to the scanning signal line 16f to be connected to the pixel electrode 17F, the pixel electrode 17h which is connected via the transistor 12h to the scanning signal line 16h to be connected to the pixel electrode 17g, the pixel electrode 17G which is connected via the transistor 12H to the scanning signal line 16h to be connected to the pixel electrode 17H, and thus the pixel electrodes 17f, 17E, 17h and 17G to be discharged.

Then, after the pre-charge period, data signals are written to the pixel electrodes 17e and 17F, each of which is connected via a transistor to the scanning signal line 16e, and to the pixel electrodes 17g and 17H, each of which is connected via a transistor to the scanning signal line 16g.

According to Embodiment 4, two pixel electrodes included in a pixel are connected via a transistor to each other, and each of the two pixel electrodes is connected to a data signal line during a pre-charge period (that is, the two pixel electrodes do not electrically float). Therefore, it is possible to suppress image sticking in pixels etc. which has been a problem a capacitively-coupled type pixel-division system.

Further, since a light subpixel and a dark subpixel are alternately arranged in the row direction and the column direction (i.e., light and dark subpixels are arranged checkerwise) in each frame, it is possible to achieve a natural-looking display with little feeling of roughness. Furthermore, since a data signal supplied to a single data signal line has an identical polarity over two vertical periods, it is possible to reduce power consumption of a source driver as compared to a case where a polarity of a data signal is reversed for every one (1) horizontal scanning period. Note that, since polarity distribution of data signals to be written in each frame is dot-reversed, it is also possible to suppress flickers on a screen. Moreover, since a pre-charge period is included in each horizontal scanning period, it is possible to reduce variations in waveforms and values of charging rates resulting from a gray scale in an earlier frame (for example, in cases where a gray level 0 changes to a gray level 100 and a gray level 100 changes to a gray level 100 in a 256 gray scale display).

Figure 42:
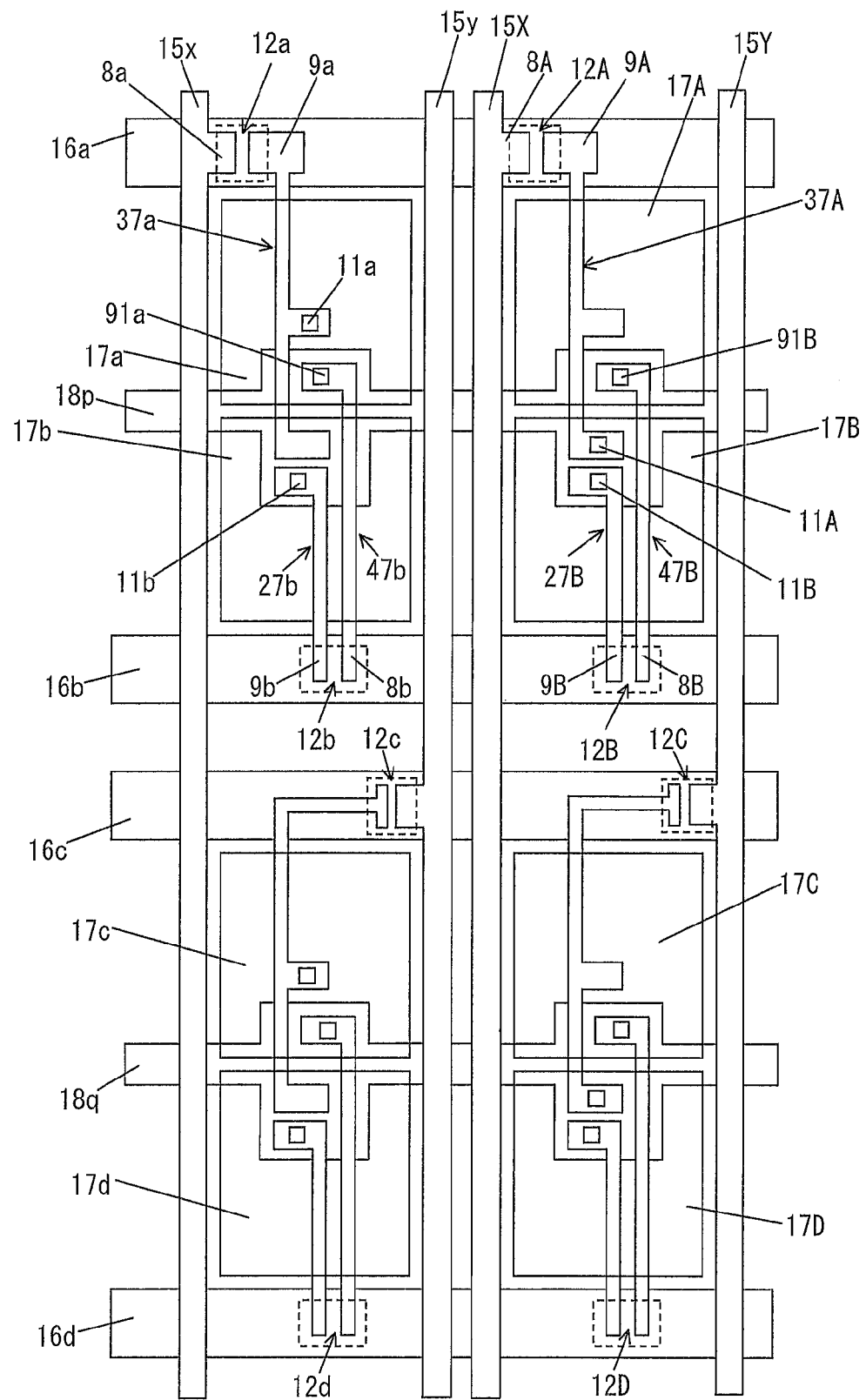
FIG. 42 is a plan view illustrating a configuration of the liquid crystal panel shown in FIG. 37.

FIG. 42 is a plan view illustrating a specific example of the liquid crystal panel 5e shown in FIG. 37. The configurations of each data signal line, each scanning signal line and each retention capacitor wire and each transistor in FIG. 42 are the same as those in FIG. 35. The drain electrode 9a of the transistor 12a is connected to the capacitor electrode 37a, the capacitor electrode 37a and the pixel electrode 17a are connected to each other via the contact hole 11a, and the capacitor electrode 37a has a part that overlaps the retention capacitor wire 18p via a gate insulation film and a part that overlaps the pixel electrode 17b via an inter-layer insulation film. On the other hand, the source electrode 8b of the transistor 12b is connected to the relay electrode 47b, the relay electrode 47b and the pixel electrode 17a are connected to each other via a contact hole 91a, and the relay electrode 47b has a part that overlaps the retention capacitor wire 18p via a gate insulation film and a part that overlaps the pixel electrode 17b via an inter-layer insulation film. Further, the drain electrode 9b of the transistor 12b is connected to the extraction electrode 27b, the extraction electrode 27b and the pixel electrode 17b are connected via the contact hole 11b to each other, and the extraction electrode 27b has a part that overlaps the retention capacitor wire 18p via a gate insulation film.

It should be noted here that a coupling capacitor Cab (refer to FIG. 37) is formed in a part where the capacitor electrode 37a and the pixel electrode 17b overlap each other and in a part where the relay electrode 47b and the pixel electrode 17b overlap each other, most of a retention capacitor Cha (refer to FIG. 37) is formed in a part where the capacitor electrode 37a and the retention capacitor wire 18p overlap each other and a part where the relay electrode 47b and the retention capacitor wire 18p overlap each other, and most of a retention capacitor Chb (refer to FIG. 37) is formed in a part where the extraction electrode 27b and the retention capacitor wire 18p overlap each other.

Further, the drain electrode 9A of the transistor 12A is connected to the capacitor electrode 37A, the capacitor electrode 37A and the pixel electrode 17B are connected via the contact hole 11A to each other, and the capacitor electrode 37A has a part that overlaps the retention capacitor wire 18p via a gate insulation film and a part that overlaps the pixel electrode 17A via an inter-layer insulation film. On the other hand, the source electrode 8B of the transistor 12B is connected to the relay electrode 47B, the relay electrode 47B and the pixel electrode 17A are connected to each other via a contact hole 91B, and the relay electrode 47B has a part that overlaps the retention capacitor wire 18p via a gate insulation film and a part that overlaps the pixel electrode 17B via an inter-layer insulation film. Further, the drain electrode 9B of the transistor 12B is connected to the extraction electrode 27B, the extraction electrode 27B and the pixel electrode 17B are connected via the contact hole 11B to each other, and the extraction electrode 27B has a part that overlaps the retention capacitor wire 18p via a gate insulation film.

It should be noted here that a coupling capacitor CAB (refer to FIG. 37) is formed in a part where the capacitor electrode 37A and the pixel electrode 17B overlap each other and in a part where the relay electrode 47B and the pixel electrode 17B overlap each other, most of a retention capacitor ChA (refer to FIG. 37) is formed in a part where the relay electrode 47B and the retention capacitor wire 18p overlap each other, and most of a retention capacitor ChB (refer to FIG. 37) is formed in a part where the capacitor electrode 37A and the retention capacitor wire 18p overlap each other and in a part where the extraction electrode 27b and the retention capacitor wire 18p overlap each other.

It should be noted that the liquid crystal panel 5e shown in FIG. 37 can be driven in such a manner as shown in FIG. 44. Specifically, during a pre-charge period that comes before a start of simultaneous selection, four scanning signal lines that correspond to the two rows of pixel areas (to which data signals are to be written simultaneously) are each turned ON and OFF in synchronization with one another. In this case, the four scanning signal lines can be each turned ON and OFF in synchronization with one another ½ to ⅕ vertical scanning period before the simultaneous selection. This causes a black display in the two rows of pixel areas for ½ to ⅕ vertical scanning period, and thus brings about an effect of so-called black insertion. Accordingly, it is possible to suppress a feeling that a moving image etc. leave trails.

Figure 43:
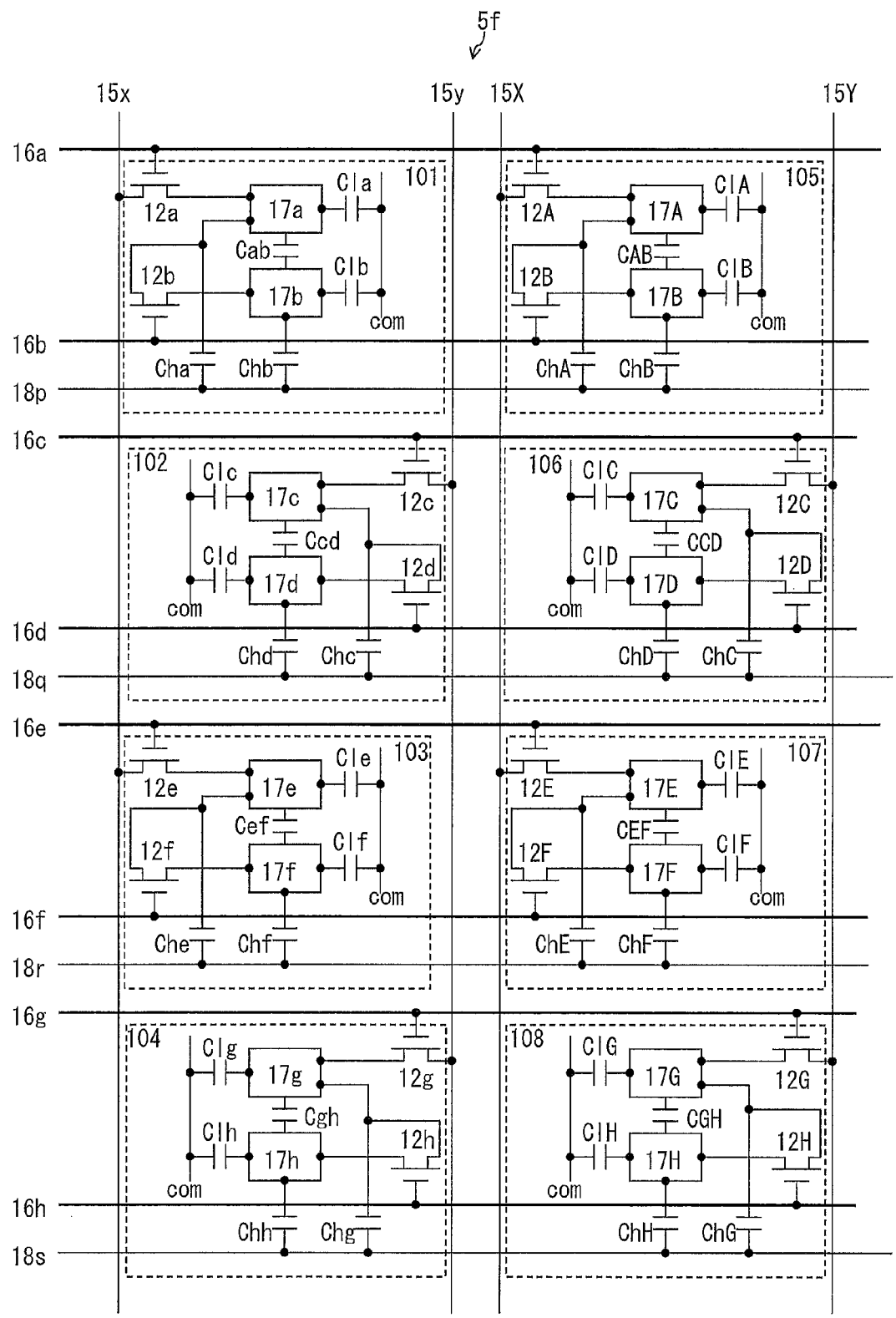
FIG. 43 is a circuit diagram illustrating another configuration of a liquid crystal panel in accordance with Embodiment 4.

Further, according to Embodiment 4, a liquid crystal panel 5f shown in FIG. 43 can be driven in such a manner as shown in FIG. 28 or FIG. 45. The liquid crystal panel 5f is the same as the liquid crystal panel 5b (refer to FIG. 19) except that the source electrode of the transistor 12b which is connected to the scanning signal line 16b is connected to the pixel electrode 17a, the source electrode of the transistor 12B which is connected to the scanning signal line 16b is connected to the pixel electrode 17B, the source electrode of the transistor 12d which is connected to the scanning signal line 16d is connected to the pixel electrode 17c, the source electrode of the transistor 12D which is connected to the scanning signal line 16d is connected to the pixel electrode 17D, the source electrode of the transistor 12f which is connected to the scanning signal line 16f is connected to the pixel electrode 17e, the source electrode of the transistor 12F which is connected to the scanning signal line 16f is connected to the pixel electrode 17F, the source electrode of the transistor 12h which is connected to the scanning signal line 16h is connected to the pixel electrode 17g, and the source electrode of the transistor 12H which is connected to the scanning signal line 16h is connected to the pixel electrode 17H.

According to the present embodiment, a liquid crystal display unit and a liquid crystal display device of the present embodiment are configured as below. Specifically, two polarizing plates A and B are bonded to the both surfaces of a liquid crystal panel (5a to 5f) so that the polarization axis of the polarizing plate A is orthogonal to the polarization axis of the polarizing plate B. Note here that, on each of the polarizing plates, a layer of an optical compensation sheet etc. can be stacked as needed. Next, as shown in (a) of FIG. 46, drivers (a gate driver 202, a source driver 201) are connected. Note that, in the following, as an example, the drivers are connected using TCPs (Tape Carrier Packages). First, an ACF (Anisotropic Conductive Film) is attached to terminals of the liquid crystal panel by preliminary compression. Subsequently, the TCPs carrying the drivers are punched out of the carrier tape, aligned with panel terminal electrodes, and heated for complete compression/attachment. Thereafter, the input terminals of the TCPs are connected to a circuit board 203 (PWB: Printed Wiring Board) using an ACF. The circuit board 203 is provided to couple the driver TCPs together. This completes a liquid crystal display unit 200. After that, as shown in (b) of FIG. 46, a display control circuit 209 is connected via the circuit board 203 to the drivers (201, 202) of the liquid crystal display unit, and a lighting system (backlight unit) 204 is attached to complete the manufacture of a liquid crystal display device 210.

Figure 47:
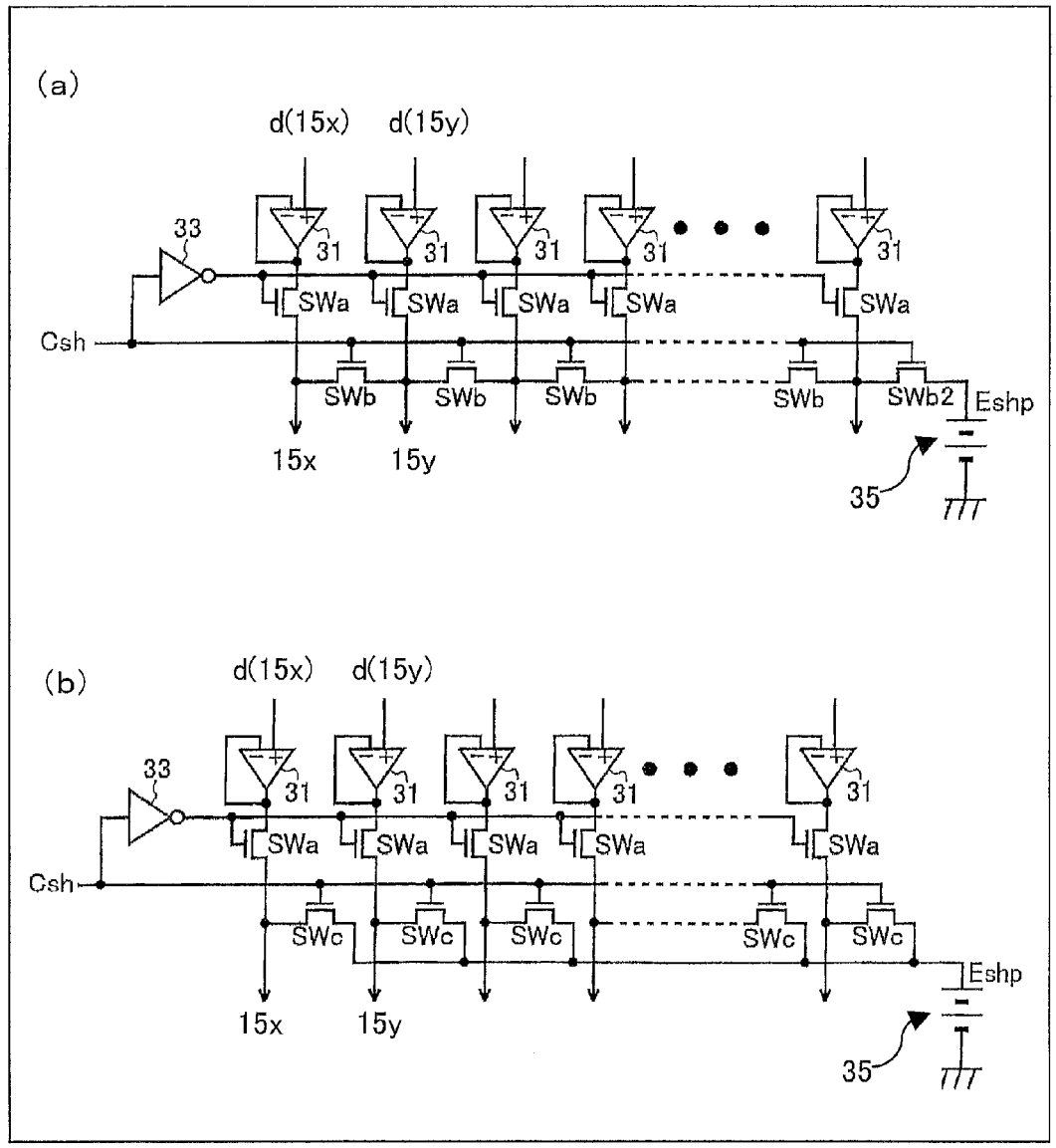
FIGS. 47 (*a*) and (*b*) are a circuit diagram illustrating a configuration of a source driver.

(a) of FIG. 47 shows a configuration of a source driver for providing a pre-charge period. As shown in (a) of FIG. 47, the source driver in such a case includes a buffer 31, a data output switch SWa and a pre-charge switch SWb in such a way as to correspond to each data signal line. The buffer 31 is supplied with corresponding data d, and an output of the buffer 31 is connected to an output terminal to the data signal line via the data output switch SWa. Further, output terminals that correspond to respective two adjacent data signal lines are connected to each other via a pre-charge switch SWb. That is, pre-charge switches SWb are connected in series with one another, and an end of the series of the pre-charge switches SWb is connected to a pre-charge electric potential supply source 35 (Vcom). Note here that a charge share signal (sh) is supplied to a gate terminal of the data output switch SWa via an inverter 33, and the sh signal is supplied to a gate terminal of the pre-charge switch SWb.

It should be noted that the source driver shown in (a) of FIG. 47 can be arranged as shown in (b) of FIG. 47. That is, pre-charge switches SWc are each connected only to a corresponding data signal line and the pre-charge electric potential supply source 35 (Vcom), and are not connected in series with one another. This makes it possible to quickly supply a pre-charge electric potential to each data signal line.

As described above, since a pre-charge period (for example, a period during which a charge sharing is carried out) is included in each horizontal scanning period and a pre-charge electric potential (e.g., Vcom) is supplied to each data signal line during the pre-charge period, it is possible, in for example a large, high-definition or high-speed drive liquid crystal display device which is difficult to fully charge, to suppress variation in electric potentials (charging rate) reached within a current horizontal scanning period, which variation results from a difference in levels of signal electric potentials supplied to the same data signal lines in a previous horizontal scanning period. Accordingly, a liquid crystal panel of the present invention is suitable even for a liquid crystal display device that includes 2160 scanning signal lines and meets the digital cinema standard or a liquid crystal display device that includes 4320 scanning signal lines and meets the super high vision standard.

The "polarity of an electric potential" in the subject application means an electric potential equal to or higher (positive) than a reference electric potential or an electric potential equal to or lower (negative) than a reference electric potential. The reference electric potential may be a Vcom (common electric potential) which is an electric potential of a common electrode (counter electrode) or may be any other electric potential.

Figure 48:
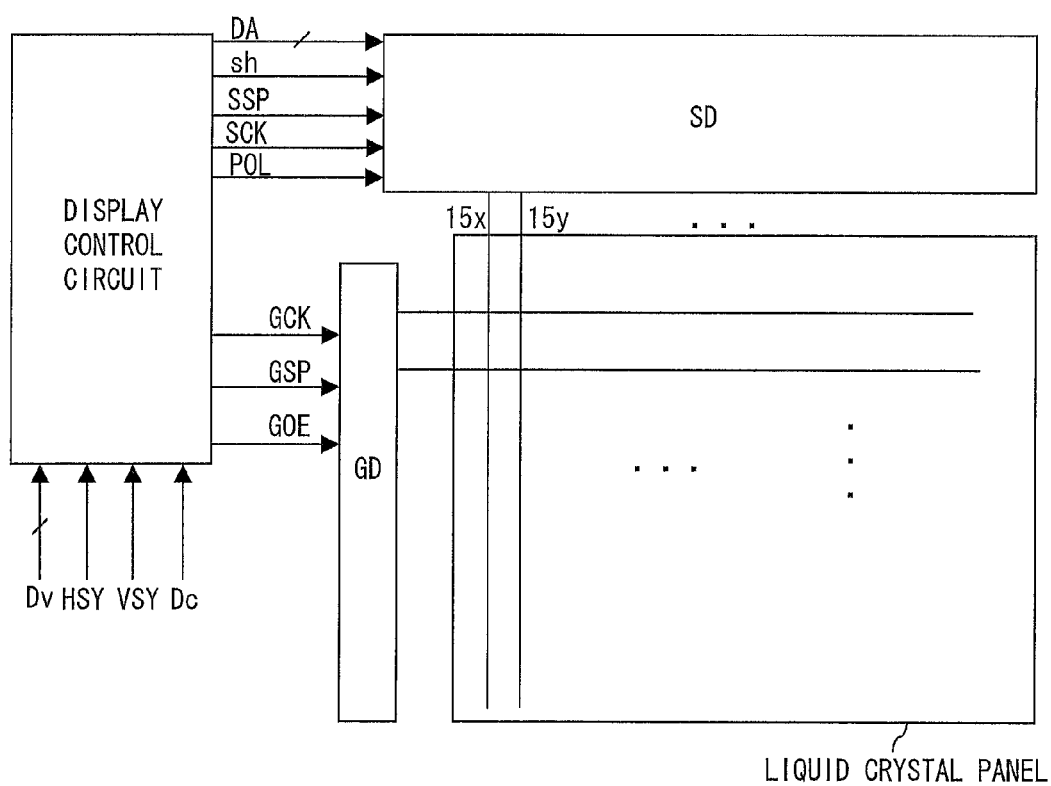
FIG. 48 is a block diagram illustrating an overall configuration of a liquid crystal display device of the present invention.

FIG. 48 is a block diagram illustrating a configuration of a liquid crystal display device of the present invention. As illustrated in FIG. 48, the liquid crystal display device includes a display section (liquid crystal panel), a source driver (SD), a gate driver (GD) and a display control circuit. The source driver drives data signal lines, the gate driver drives scanning signal lines, and the display control circuit controls the source driver and the gate driver.

The display control circuit receives, from external signal sources (e.g., a tuner), a digital video signal Dv indicative of an image to be displayed; a horizontal sync signal HSY and a vertical sync signal VSY which correspond to the digital video signal Dv; and a control signal Dc for controlling a display operation. Further, in response to the signals Dv, HSY, VSY and Dc, the display control circuit generates and outputs the following signals which cause the image, corresponding to the digital video signal Dv, to be displayed on the display section: a data start pulse signal SSP; a data clock signal SCK; a charge share signal sh; a digital image signal DA corresponding to an image to be displayed (equivalent to the video signal Dv); a gate start pulse signal GSP; a gate clock signal GCK; and a gate driver output control signal (a scanning signal output control signal) GOE.

More specifically, after timing of the digital video signal Dv is adjusted etc. according to need in an internal memory, the digital video signal Dv is outputted as a digital image signal DA from the display control circuit. Then, a data clock signal SCK, a data start pulse signal SSP, a gate start pulse signal GSP, a gate clock signal GCK, a charge share signal sh, and a gate driver output control signal GOE are generated. The data clock signal SCK is a signal that is made of a pulse corresponding to each pixel and that is of an image indicated by the digital image signal DA. The data start pulse signal SSP is a signal that becomes a high level (H level) based on the horizontal sync signal HSY only in a predetermined period in each one horizontal scanning period. The gate start pulse signal GSP is a signal that becomes the H level based on the vertical sync signal VSY only in a predetermined period in each one frame period (one vertical scanning period). The gate clock signal GCK is generated based on the horizontal sync signal HSY. The charge share signal sh and the gate driver output control signal GOE are generated based on the horizontal sync signal HSY and the control signal Dc.

Out of signals generated in the display control circuit as above, the digital image signal DA, the charge share signal sh, the signal POL for controlling the polarity of a signal electric potential (data signal electric potential), the data start pulse signal SSP, and the data clock signal SCK are supplied to the source diver. The gate start pulse signal GSP, the gate clock signal GCK, and the gate driver output control signal GOE are supplied to the gate driver.

The source driver sequentially generates data signals as analog electric potentials (signal electric potentials) based on the digital image signal DA, the data clock signal SCK, the charge share signal sh, the data start pulse SSP, and the polarity reversal signal POL in every one horizontal scanning period. The analog electric potentials correspond to pixel values that are of an image indicated by the digital image signal DA and of each scanning signal line. The source driver supplies these data signals to data signal lines (e.g., 15x and 15y).

The gate driver generates gate-on pulse signals based on the gate start pulse signal GSP and the gate clock signal GCK and the gate driver output control signal GOE, and supplies these gate-on pulse signals to the scanning signal lines. In this way, the gate driver sequentially scans the scanning signal lines two by two.

Figure 49:
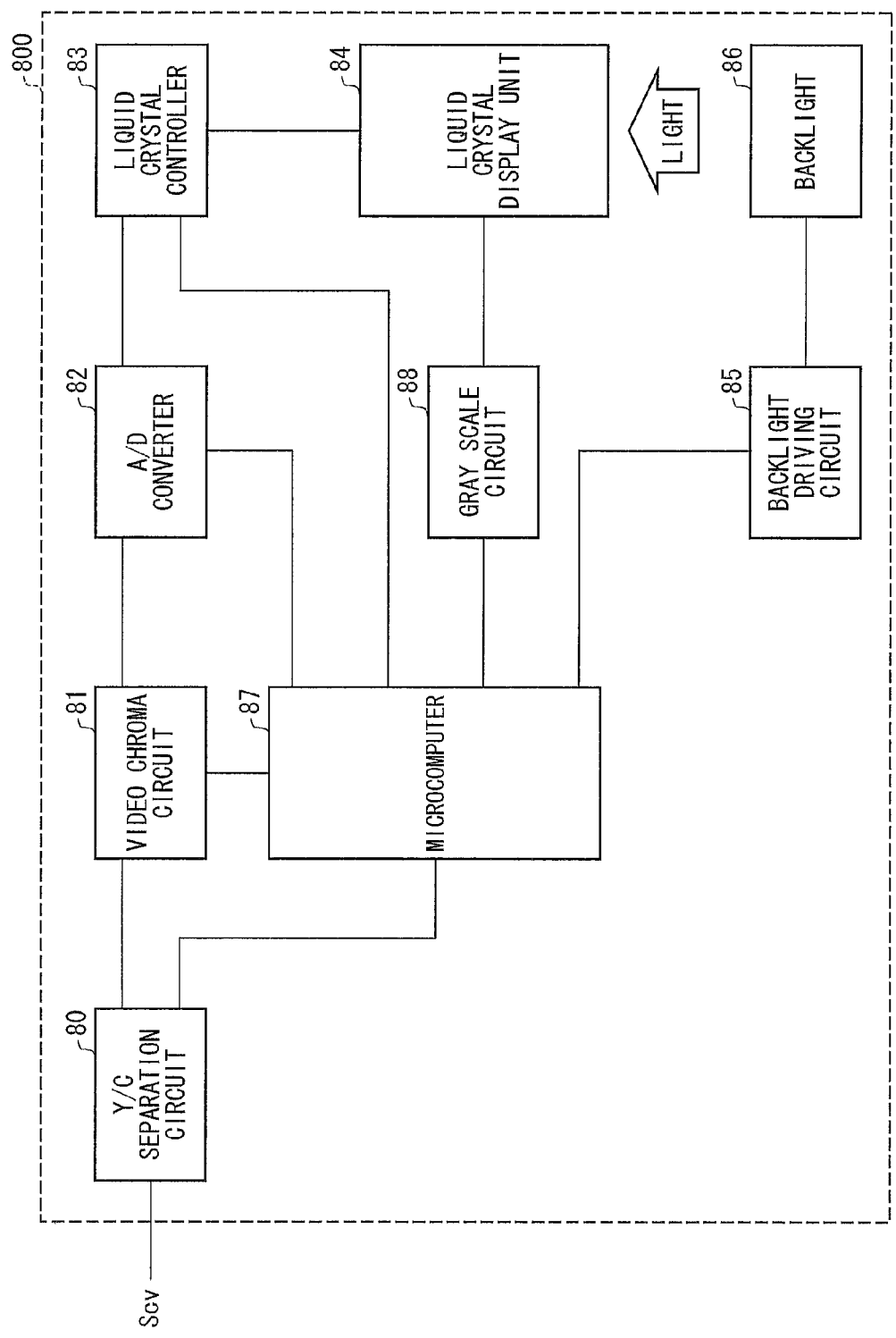
FIG. 49 is a block diagram describing functions of a liquid crystal display device of the present invention.

The following description discusses an example of a configuration of a liquid crystal display device of the present invention which is applied to a television receiver. FIG. 49 is a block diagram illustrating a configuration of a liquid crystal display device 800 for such a television receiver. The liquid crystal display device 800 includes: a liquid crystal display unit 84; a Y/C separation circuit 80; a video chroma circuit 81; an A/D converter 82; a liquid crystal controller 83; a backlight driving circuit 85; a backlight 86; a microcomputer 87; and a gray scale circuit 88. The liquid crystal display unit 84 includes: a liquid crystal panel; and a source driver and a gate driver for driving the liquid crystal panel.

According to the liquid crystal display device 800 configured as above, first, a composite color video signal Scv, serving as a television signal, is externally supplied to the Y/C separation circuit 80. Then, the Y/C separation circuit 80 separates the composite color video signal Scv to a brightness signal and a color signal. The brightness signal and the color signal are converted, in the video chroma circuit 81, to an analog RGB signal corresponding to three primary colors of light. The analog RGB signal is further converted to a digital RGB signal by the A/D converter 82. The digital RGB signal is then supplied to the liquid crystal controller 83. Meanwhile, the Y/C separation circuit 80 extracts horizontal and vertical sync signals from the composite color video signal Scv which is externally supplied. The horizontal and vertical sync signals are also supplied to the liquid crystal controller 83 via the microcomputer 87.

The liquid crystal controller 83 supplies digital RGB signals to the liquid crystal display unit 84 together with the timing control signals based on the foregoing sync signals, at predetermined timings. The gray scale circuit 88 generates gray scale electric potentials for the respective three primary colors R, G, B of a color display, and then supplies the gray scale electric potentials to the liquid crystal panel 84. The liquid crystal display unit 84 causes (i) its incorporated members such as the source driver and the gate driver to generate drive signals (a data signal=signal electric potential, scanning signal, etc.), in response to the RGB signals, the timing signals, and the gray scale electric potentials and (ii) its incorporated display section to display a color image in response to the drive signals. In order for the liquid crystal display unit 84 to display an image, the liquid crystal panel in the liquid crystal display unit has to be backlit. According to the liquid crystal display device 800, the microcomputer 87 controls the backlight driving circuit 85 to drive the backlight 86 so that a back surface of the liquid crystal panel is irradiated with light. The microcomputer 87 carries out not only the above processes but also the control of a whole system. In addition, the video signal (composite color video signal) which is externally supplied is not limited to a video signal of television broadcasting, and can therefore be a video signal such as a video signal taken with a camera or a video signal supplied over the Internet. The liquid crystal display device 800 is thus capable of displaying an image based on a variety of video signals.

Figure 50:
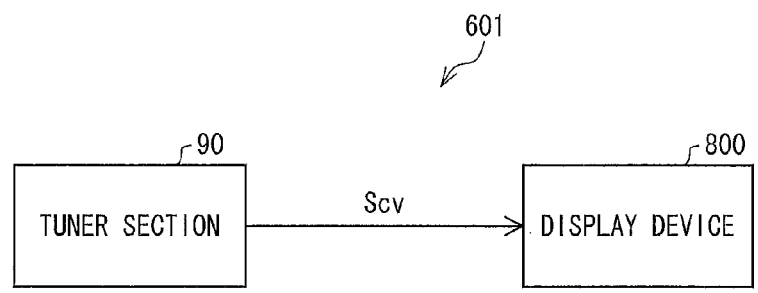
FIG. 50 is a block diagram describing functions of a television receiver of the present invention.

In a case where the liquid crystal display device 800 displays an image based on the television broadcasting, the liquid crystal display device 800 is connected with a tuner section 90 (see FIG. 50) to configure a television receiver 601 of the present invention. The tuner section 90 extracts, from a wave (a high-frequency signal) received via an antenna (not illustrated), a signal of a channel to be received. The tuner section 90 then converts the signal to an intermediate frequency signal. Then, the tuner section 90 detects the intermediate frequency signal so as to extract the composite color video signal Scv serving as the television signal. The composite color video signal Scv is supplied to the liquid crystal display device 800 as described earlier. The liquid crystal display device 800 then displays an image based on the composite color video signal Scv.

Figure 51:
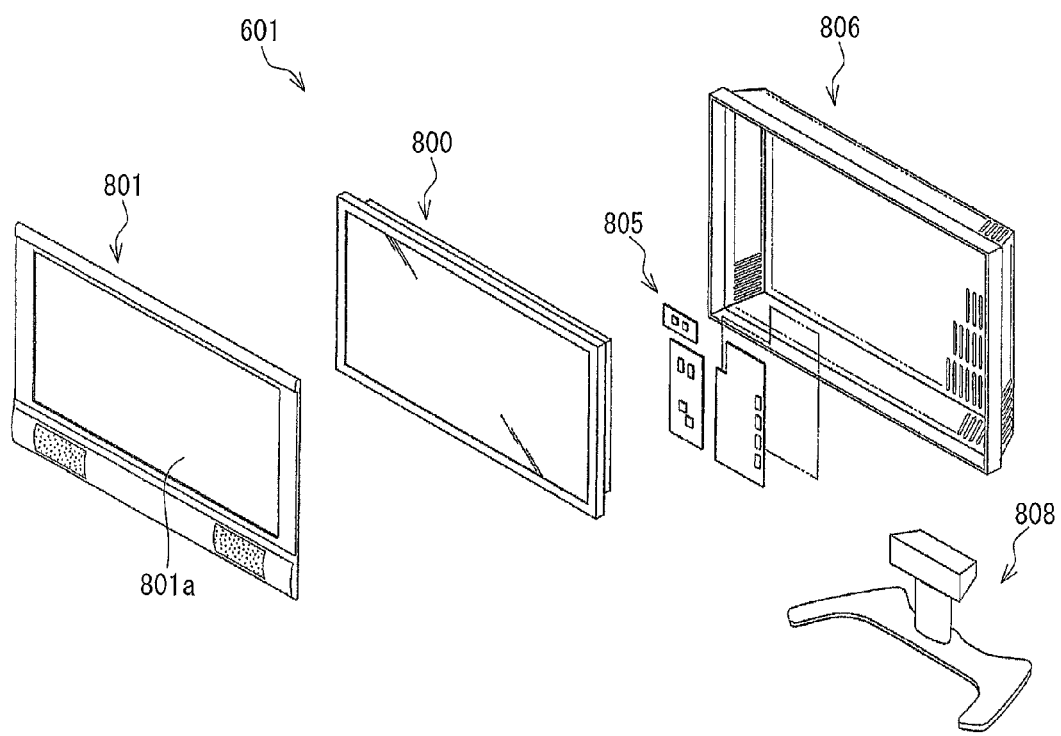
FIG. 51 is an exploded perspective view illustrating a configuration of a television receiver of the present invention.
Figure 52:
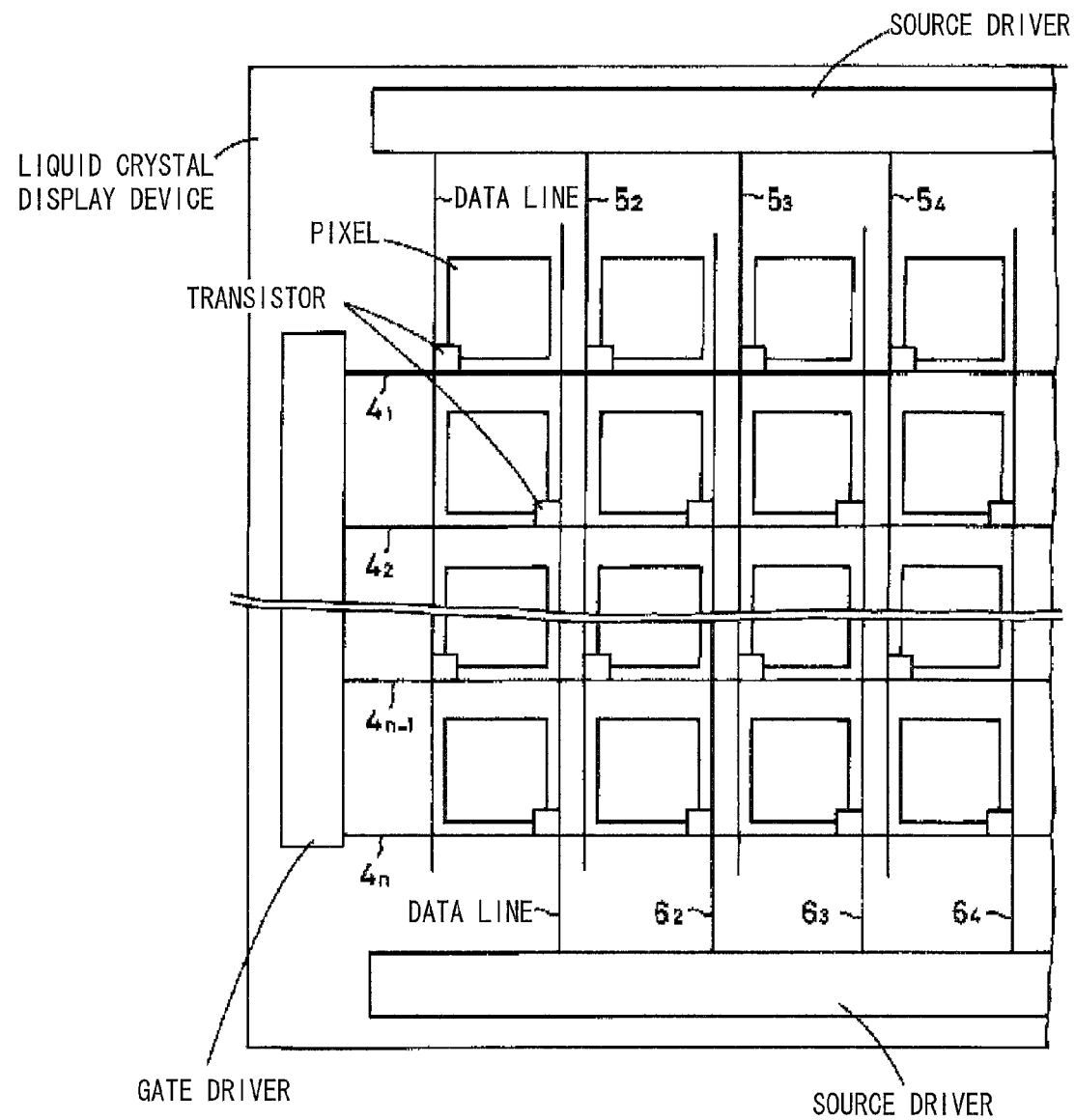
FIG. 52 is a view schematically illustrating a configuration of a conventional liquid crystal panel.

FIG. 51 is an exploded perspective view illustrating an example of a configuration of a television receiver of the present invention. As illustrated in FIG. 51, the television receiver 601 is constituted by the liquid crystal display device 800, a first housing 801, and a second housing 806. The liquid crystal display device 800 is arranged so as to be sandwiched between and held by the first housing 801 and the second housing 806. The first housing 801 has an opening 801a for transmitting an image to be displayed on the liquid crystal display device 800. The second housing 806 covers a backside of the liquid crystal display device 800, and includes an operation circuit 805 for handling the liquid crystal display device 800. Further, the second housing 806 is supported by a support member 808 at the bottom.

An active matrix substrate in accordance with the present invention is an active matrix substrate including pixel areas, wherein: the pixel areas (i) each include two pixel electrodes connected to each other via a capacitor and (ii) are arranged in a row direction and a column direction, the column direction being a direction in which each data signal line extends, two data signal lines are provided in such a way as to correspond to a column of pixel areas and two scanning signal lines are provided in such a way as to correspond to a row of pixel areas, and in respect to a pixel area that belongs to the column of pixel areas and to the row of pixel areas, a transistor connected to one of the two scanning signal lines is electrically connected to one of two pixel electrodes included in the pixel area, a transistor connected to the other one of the two scanning signal lines is electrically connected to the other one of the two pixel electrodes, and each of these transistors is electrically connected to an identical data signal line that is one of the two data signal lines.

First, according to the active matrix substrate, two data signal lines are provided in such a way as to correspond to a column of pixel areas. Therefore, a liquid crystal display device including the active matrix substrate is capable of writing data signals simultaneously to two rows of pixels by selecting simultaneously two scanning signal lines.

Further, according to the configuration, capacitively-coupled two pixel electrodes in each pixel area are each connected via a transistor to a data signal line. Therefore, each pixel electrode does not float electrically. This suppresses image sticking in pixels etc. in the liquid crystal display device including the active matrix substrate, and thus achieves high display quality.

An active matrix substrate in accordance with the present invention is an active matrix substrate including pixel areas, wherein: the pixel areas (i) each include two pixel electrodes connected to each other via a capacitor and (ii) are arranged in a row direction and a column direction, the column direction being a direction in which each data signal line extends, two data signal lines are provided in such a way as to correspond to a column of pixel areas and two scanning signal lines are provided in such a way as to correspond to a row of pixel areas, and in respect to a pixel area that belongs to the column of pixel areas and to the row of pixel areas, a transistor connected to one of the two scanning signal lines is electrically connected to one of two pixel electrodes included in the pixel area and to one of the two data signal lines, and a transistor connected to the other one of the two scanning signal lines is electrically connected to the other one of the two pixel electrodes and to a retention capacitor wire.

First, according to the active matrix substrate, two data signal lines are provided in such a way as to correspond to a column of pixel areas. Therefore, a liquid crystal display device including the active matrix substrate is capable of writing data signals simultaneously to two rows of pixels by selecting simultaneously two scanning signal lines.

Further, according to the configuration, one of capacitively-coupled two pixel electrodes in each pixel area is connected via a transistor to a data signal line, and the other is connected via a transistor to a retention capacitor wire. Therefore, each pixel electrode does not float electrically. This suppresses image sticking in pixels etc. in the liquid crystal display device including the active matrix substrate, and thus achieves high display quality.

An active matrix substrate in accordance with the present invention is an active matrix substrate including pixel areas, wherein: the pixel areas (i) each include two pixel electrodes connected to each other via a capacitor and (ii) are arranged in a row direction and a column direction, the column direction being a direction in which each data signal line extends, two data signal lines are provided in such a way as to correspond to a column of pixel areas and two scanning signal lines are provided in such a way as to correspond to a row of pixel areas, and in respect to a pixel area that belongs to the column of pixel areas and to the row of pixel areas, a transistor connected to one of the two scanning signal lines is electrically connected to one of two pixel electrodes included in the pixel area and to one of the two data signal lines, and a transistor connected to the other one of the two scanning signal lines is electrically connected to each of the two pixel electrodes.

First, according to the active matrix substrate, two data signal lines are provided in such a way as to correspond to a column of pixel areas. Therefore, a liquid crystal display device including the active matrix substrate is capable of writing data signals simultaneously to two rows of pixels by selecting simultaneously two scanning signal lines.

Further, according to the configuration, capacitively-coupled two pixel electrodes in each pixel area are connected via a transistor to each other. Therefore, each pixel electrode does not float electrically. This suppresses image sticking in pixels etc. in the liquid crystal display device including the active matrix substrate, and thus achieves high display quality.

The active matrix substrate can be configured such that (i) a data signal line connected via a transistor to each of pixel electrodes included in one of two pixel areas adjacent to each other in the column direction and (ii) a data signal line connected via a transistor to each of pixel electrodes included in the other one of the two pixel areas are different data signal lines.

The active matrix substrate can be configured such that: two pixel electrodes are arranged in the column direction in a pixel area; and (i) a transistor electrically connected to one of two pixel electrodes that are included in respective two pixel areas adjacent to each other in the row direction, that are each connected via a transistor to a data signal line, and that diagonally face each other and (ii) a transistor electrically connected to the other one of the two pixel electrodes are connected to an identical scanning signal line.

The active matrix substrate can be configured such that a pixel area includes: a first capacitor electrode that is electrically connected to one of two pixel electrodes included in the pixel area and that overlaps the other one of the two pixel electrodes via an inter-layer insulation film; and a second capacitor electrode that overlaps said one of the two pixel electrodes via the inter-layer insulation film and that is electrically connected to said other one of the two pixel electrodes.

The active matrix substrate can be configured such that two scanning signal lines that correspond to a row of pixel areas are arranged on both sides of the row or are arranged so as to overlap both edges of the row.

The active matrix substrate can be configured such that each of the first and second capacitor electrodes overlaps a retention capacitor wire via a gate insulation film.

The active matrix substrate can be configured such that the first capacitor electrode electrically connected to said one of the two pixel electrodes included in the pixel area and the second capacitor electrode electrically connected to said other one of the two pixel electrodes are symmetrically arranged with respect to a point.

The active matrix substrate can be configured such that: the inter-layer insulation film is constituted by an inorganic insulation film and an organic insulation film; and at least part of each of areas of the organic insulation film, which areas overlap the respective first and second capacitor electrodes, is removed or is small in thickness.

A liquid crystal display device of the present invention is a liquid crystal display device including the foregoing active matrix substrate, wherein: in a predetermined frame, (i) one of two scanning signal lines that correspond to one of two rows of pixel areas and (ii) one of two scanning signal lines that correspond to the other one of the two rows of pixel areas are selected simultaneously so that data signals are written simultaneously to the two rows of pixel areas; and in a frame other than the predetermined frame, (a) the other one of the two scanning signal lines that correspond to said one of the two rows of pixel areas and (b) the other one of the two scanning signal lines that correspond to said other one of the two rows of pixel areas are selected simultaneously so that data signals are written simultaneously to the two rows of pixel areas.

The liquid crystal display device can be configured such that the two rows of pixel areas are adjacent to each other.

The liquid crystal display device can be configured such that (i) a data signal line connected via a transistor to each of pixel electrodes included in one of two pixel areas that are adjacent to each other in the column direction and (ii) a data signal line connected via a transistor to each of pixel electrodes included in the other one of the two pixel areas are different data signal lines, and are supplied with data signals having respective opposite polarities.

The liquid crystal display device can be configured such that (i) a data signal line connected via a transistor to each of pixel electrodes included in one of two pixel areas that are adjacent to each other in the row direction and (ii) a data signal line connected via a transistor to each of pixel electrodes included in the other one of the two pixel areas are supplied with data signals having respective opposite polarities.

The liquid crystal display device can be configured such that: in an odd-numbered frame, (i) one of two scanning signal lines that correspond to one of two rows of pixel areas and (ii) one of two scanning signal lines that correspond to the other one of the two rows of pixel areas are selected simultaneously; and in an even-numbered frame, (a) the other one of the two scanning signal lines that correspond to said one of the two rows of pixel areas and (b) the other one of the two scanning signal lines that correspond to said other one of the two rows of pixel areas are selected simultaneously.

The liquid crystal display device can be configured such that a polarity of a data signal supplied to an identical data signal line is reversed for every two frames.

The liquid crystal display device can be configured such that: in each of first two successive frames, (i) one of two scanning signal lines that correspond to one of two rows of pixel areas and (ii) one of two scanning signal lines that correspond to the other one of the two rows of pixel areas are selected simultaneously; and in each of second two successive frames subsequent to the first two successive frames, (a) the other one of the two scanning signal lines that correspond to said one of the two rows of pixel areas and (b) the other one of the two scanning signal lines that correspond to said other one of the two rows of pixel areas are selected simultaneously.

The liquid crystal display device can be configured such that a polarity of a data signal supplied to an identical data signal line is reversed for every one frame.

The liquid crystal display device can be configured such that: each horizontal scanning period includes a pre-charge period during which a certain electric potential is supplied to each data signal line; and during a pre-charge period during simultaneous selection, scanning signal lines, out of four scanning signal lines that correspond to the two rows of pixel areas, that are not being selected simultaneously are each turned ON and OFF.

The liquid crystal display device can be configured such that: each horizontal scanning period includes a pre-charge period during which a certain electric potential is supplied to each data signal line; and during a pre-charge period that comes before simultaneous selection, four scanning signal lines that correspond to the two rows of pixel areas are each turned ON and OFF in synchronization with one another.

A liquid crystal display device of the present invention can be a liquid crystal display device including the foregoing active matrix substrate, wherein: (i) one of two scanning signal lines that correspond to one of two rows of pixel areas and (ii) one of two scanning signal lines that correspond to the other one of the two rows of pixel areas are selected simultaneously so that data signals are written simultaneously to the two rows of pixel areas.

The liquid crystal display device can be configured such that the two rows of pixel areas are adjacent to each other.

The liquid crystal display device can be configured such that (i) a data signal line connected via a transistor to each of pixel electrodes included in one of two pixel areas that are adjacent to each other in the column direction and (ii) a data signal line connected via a transistor to each of pixel electrodes included in the other one of the two pixel areas are different data signal lines, and are supplied with data signals having respective opposite polarities.

The liquid crystal display device can be configured such that (i) a data signal line connected via a transistor to each of pixel electrodes included in one of two pixel areas that are adjacent to each other in the row direction and (ii) a data signal line connected via a transistor to each of pixel electrodes included in the other one of the two pixel areas are supplied with data signals having respective opposite polarities.

The liquid crystal display device can be configured such that: each horizontal scanning period includes a pre-charge period during which a certain electric potential is supplied to each data signal line; and during a pre-charge period during simultaneous selection, scanning signal lines, out of four scanning signal lines that correspond to the two rows of pixel areas, that are not being selected simultaneously are each turned ON and OFF.

The liquid crystal display device can be configured such that: each horizontal scanning period includes a pre-charge period during which a certain electric potential is supplied to each data signal line; and during a pre-charge period that comes before simultaneous selection, four scanning signal lines that correspond to the two rows of pixel areas are each turned ON and OFF in synchronization with one another.

A liquid crystal panel of the present invention includes the foregoing active matrix substrate. A liquid crystal display unit of the present invention includes: the foregoing liquid crystal panel; and a driver. A liquid crystal display device of the present invention includes: the foregoing liquid crystal display unit; and a light source device. A television receiver of the present invention includes: the foregoing liquid crystal display device; and a tuner section for receiving television broadcasting.

As has been described, according to the present invention, it is possible to improve display quality of a liquid crystal display device which employs a capacitively-coupled type pixel-division system and carries out simultaneous selection of two lines.

The invention is not limited to the foregoing embodiments. An embodiment altered as appropriate based on the common general technical knowledge and an embodiment derived from a combination thereof are also encompassed in the embodiments of the invention.

INDUSTRIAL APPLICABILITY

A liquid crystal panel in accordance with the present invention is suitable for a liquid crystal television, for example.

REFERENCE SIGNS LIST 5a through 5f Liquid crystal panel
12a through 12h, 12A through 12H Transistor
15x, 15y, 15X, 15Y Data signal line
16a through 16h Scanning signal line
17a through 17h Pixel electrode
17A through 17H Pixel electrode
18p through 18s Retention capacitor wire
22 Gate insulation film
24 Semiconductor layer
25 Inorganic insulation film
26 Organic insulation film
37a, 37b, 37A, 37B Capacitor electrode
84 Liquid crystal display unit
101 though 108 Pixel
601 Television receiver
800 Liquid crystal display device

The invention claimed is:

1. An active matrix substrate comprising pixel areas, wherein:
the pixel areas (i) each include two pixel electrodes connected to each other via a capacitor and (ii) are arranged in a row direction and a column direction, the column direction being a direction in which each data signal line extends,
two data signal lines are provided in such a way as to correspond to a column of pixel areas and two scanning signal lines are provided in such a way as to correspond to a row of pixel areas,
in respect to a pixel area that belongs to the column of pixel areas and to the row of pixel areas, a transistor connected to one of the two scanning signal lines is electrically connected to one of two pixel electrodes included in the pixel area, a transistor connected to the other one of the two scanning signal lines is electrically connected to the other one of the two pixel electrodes, and each of these transistors is electrically connected to an identical data signal line that is one of the two data signal lines,
one of the pixel areas includes:
a first capacitor electrode that is electrically connected to one of the two pixel electrodes included in the pixel area and that overlaps the other one of the two pixel electrodes via an inter-layer insulation film; and
a second capacitor electrode that overlaps said one of the two pixel electrodes via the inter-layer insulation film and that is electrically connected to said other one of the two pixel electrodes, and
each of the first and second capacitor electrodes overlaps a retention capacitor wire via a gate insulation film.

2. The active matrix substrate according to claim 1, wherein (i) a data signal line connected via a transistor to each of pixel electrodes included in one of two pixel areas adjacent to each other in the column direction and (ii) a data signal line connected via a transistor to each of pixel electrodes included in the other one of the two pixel areas are different data signal lines.

3. The active matrix substrate according to claim 1, wherein:
the two pixel electrodes are arranged in the column direction in each pixel area;
each pixel area includes the two pixel electrodes electrically connected to respective ones of two transistors included in the pixel areas;
in two of the pixel areas which are adjacent to each other in the row direction, a first one of the two transistors in a first one of the two adjacent pixel areas and a first one of the two transistors in a second one of the two adjacent pixel areas are connected to an identical scanning signal line; and
the first one of the two transistors in the first one of the two adjacent pixel areas and the first one of the two transistors in the second one of the two adjacent pixel areas are positioned to diagonally face each other.

4. The active matrix substrate according to claim 1, wherein two scanning signal lines that correspond to a row of pixel areas are arranged on both sides of the row or are arranged so as to overlap both edges of the row.

5. The active matrix substrate according to claim 1, wherein the first capacitor electrode electrically connected to said one of the two pixel electrodes included in the pixel area and the second capacitor electrode electrically connected to said other one of the two pixel electrodes are symmetrically arranged with respect to a point.

6. The active matrix substrate according to claim 1, wherein:
the inter-layer insulation film is constituted by an inorganic insulation film and an organic insulation film; and
at least part of each of areas of the organic insulation film, which areas overlap the respective first and second capacitor electrodes, is removed or is small in thickness.

7. A liquid crystal display device comprising an active matrix substrate recited in claim 1, wherein:
in a predetermined frame, (i) one of two scanning signal lines that correspond to one of two rows of pixel areas and (ii) one of two scanning signal lines that correspond to the other one of the two rows of pixel areas are selected simultaneously so that data signals are written simultaneously to the two rows of pixel areas; and
in a frame other than the predetermined frame, (a) the other one of the two scanning signal lines that correspond to said one of the two rows of pixel areas and (b) the other one of the two scanning signal lines that correspond to said other one of the two rows of pixel areas are selected simultaneously so that data signals are written simultaneously to the two rows of pixel areas.

8. The liquid crystal display device according to claim 7, wherein the two rows of pixel areas are adjacent to each other.

9. The liquid crystal display device according to claim 8, wherein (i) a data signal line connected via a transistor to each of pixel electrodes included in one of two pixel areas that are adjacent to each other in the column direction and (ii) a data signal line connected via a transistor to each of pixel electrodes included in the other one of the two pixel areas are different data signal lines, and are supplied with data signals having respective opposite polarities.

10. The liquid crystal display device according to claim 7, wherein (i) a data signal line connected via a transistor to each of pixel electrodes included in one of two pixel areas that are adjacent to each other in the row direction and (ii) a data signal line connected via a transistor to each of pixel electrodes included in the other one of the two pixel areas are supplied with data signals having respective opposite polarities.

11. The liquid crystal display device according to claim 7, wherein:
in an odd-numbered frame, (i) one of two scanning signal lines that correspond to one of two rows of pixel areas and (ii) one of two scanning signal lines that correspond to the other one of the two rows of pixel areas are selected simultaneously; and
in an even-numbered frame, (a) the other one of the two scanning signal lines that correspond to said one of the two rows of pixel areas and (b) the other one of the two scanning signal lines that correspond to said other one of the two rows of pixel areas are selected simultaneously.

12. The liquid crystal display device according to claim 11, wherein a polarity of a data signal supplied to an identical data signal line is reversed for every two frames.

13. The liquid crystal display device according to claim 7, wherein:
in each of first two successive frames, (i) one of two scanning signal lines that correspond to one of two rows of pixel areas and (ii) one of two scanning signal lines that correspond to the other one of the two rows of pixel areas are selected simultaneously; and
in each of second two successive frames subsequent to the first two successive frames, (a) the other one of the two scanning signal lines that correspond to said one of the two rows of pixel areas and (b) the other one of the two scanning signal lines that correspond to said other one of the two rows of pixel areas are selected simultaneously.

14. The liquid crystal display device according to claim 13, wherein a polarity of a data signal supplied to an identical data signal line is reversed for every one frame.

15. The liquid crystal display device according to claim 7, wherein:
each horizontal scanning period includes a pre-charge period during which a certain electric potential is supplied to each data signal line; and
during a pre-charge period during simultaneous selection, scanning signal lines, out of four scanning signal lines that correspond to the two rows of pixel areas, that are not being selected simultaneously are each turned ON and OFF.

16. The liquid crystal display device according to claim 7, wherein:
each horizontal scanning period includes a pre-charge period during which a certain electric potential is supplied to each data signal line; and
during a pre-charge period that comes before simultaneous selection, four scanning signal lines that correspond to the two rows of pixel areas are each turned ON and OFF in synchronization with one another.

17. A liquid crystal display device comprising an active matrix substrate recited in claim 1, wherein:
(i) one of two scanning signal lines that correspond to one of two rows of pixel areas and (ii) one of two scanning signal lines that correspond to the other one of the two rows of pixel areas are selected simultaneously so that data signals are written simultaneously to the two rows of pixel areas.

18. The liquid crystal display device according to claim 17, wherein the two rows of pixel areas are adjacent to each other.

19. The liquid crystal display device according to claim 18, wherein (i) a data signal line connected via a transistor to each of pixel electrodes included in one of two pixel areas that are adjacent to each other in the column direction and (ii) a data signal line connected via a transistor to each of pixel electrodes included in the other one of the two pixel areas are different data signal lines, and are supplied with data signals having respective opposite polarities.

20. The liquid crystal display device according to claim 17, wherein (i) a data signal line connected via a transistor to each of pixel electrodes included in one of two pixel areas that are adjacent to each other in the row direction and (ii) a data signal line connected via a transistor to each of pixel electrodes included in the other one of the two pixel areas are supplied with data signals having respective opposite polarities.

21. The liquid crystal display device according to claim 17, wherein:
each horizontal scanning period includes a pre-charge period during which a certain electric potential is supplied to each data signal line; and during a pre-charge period during simultaneous selection, scanning signal lines, out of four scanning signal lines that correspond to the two rows of pixel areas, that are not being selected simultaneously are each turned ON and OFF.

22. The liquid crystal display device according to claim 17, wherein:
    each horizontal scanning period includes a pre-charge period during which a certain electric potential is supplied to each data signal line; and
    during a pre-charge period that comes before simultaneous selection, four scanning signal lines that correspond to the two rows of pixel areas are each turned ON and OFF in synchronization with one another.

23. A liquid crystal panel comprising an active matrix substrate recited in claim 1.

24. A liquid crystal display unit comprising:
    a liquid crystal panel recited in claim 23; and
    a driver.

25. A liquid crystal display device comprising:
    a liquid crystal display unit recited in claim 24; and
    a light source device.

26. A television receiver comprising:
    a liquid crystal display device recited in claim 25; and
    a tuner section for receiving television broadcasting.

* * * * *